(12) United States Patent
Blackburn et al.

(10) Patent No.: US 11,216,772 B2
(45) Date of Patent: Jan. 4, 2022

(54) USE OF BLOCKCHAIN-BASED DISTRIBUTED LEDGER AND SMART CONTRACTS FOR A CONSTRUCTION PROJECT

(71) Applicant: Scientia Potentia Est, LLC., Charleston, SC (US)

(72) Inventors: Jeremy Blackburn, Charleston, SC (US); Tim McVicker, Charleston, SC (US); Justin Southward, Charleston, SC (US); W. Kurt Taylor, N. Charleston, SC (US); Karl David, Charleston, SC (US); Austi Critchfield, Clearwater, FL (US); Michael Lu, N. Charleston, SC (US)

(73) Assignee: SCIENTIA POTENTIA EST., LLC, Charleston, SC (US)

(*) Notice: Subject to any disclaimer, the term of this patent is extended or adjusted under 35 U.S.C. 154(b) by 162 days.

(21) Appl. No.: 16/510,642

(22) Filed: Jul. 12, 2019

(65) Prior Publication Data

US 2020/0410439 A1 Dec. 31, 2020

Related U.S. Application Data

(63) Continuation-in-part of application No. 16/452,076, filed on Jun. 25, 2019.

(51) Int. Cl.
*G06Q 10/08* (2012.01)
*G06Q 50/08* (2012.01)
(Continued)

(52) U.S. Cl.
CPC ....... *G06Q 10/0833* (2013.01); *G06Q 20/065* (2013.01); *G06Q 20/407* (2013.01);
(Continued)

(58) Field of Classification Search
CPC ............... G06Q 50/08; G06Q 10/0631; G06Q 10/0833; G06Q 20/065; G06Q 20/407;
(Continued)

(56) References Cited

U.S. PATENT DOCUMENTS

| 10,121,112 B1* | 11/2018 | Vasquez, Jr. ....... G06Q 30/0207 |
| 2019/0149952 A1* | 5/2019 | Parks, Jr. ............... H04W 4/029 |
| | | 705/26.82 |

(Continued)

FOREIGN PATENT DOCUMENTS

WO WO-2018163044 A1 * 9/2018 ........... G06Q 20/065

OTHER PUBLICATIONS

Hughes, Dave, The Impact of Blockchain Technology on the Construction Industry:, Feb. 19, 2017; medium.com, 8 pages. (Year: 2017).*

(Continued)

*Primary Examiner* — John P Go
*Assistant Examiner* — Freda A Nelson
(74) *Attorney, Agent, or Firm* — Kim and Lahey Law Firm LLC; Douglas W. Kim

(57) ABSTRACT

Exemplary embodiments may reference a record of a construction project on a blockchain-based distributed ledger. Materials arriving to the project may be recorded as part of the permanent record. The exemplary embodiments may receive or determine a construction schedule that contains full project details and sequencing, including the specification of dependencies. Smart contracts may be provided that use the blockchain-based distributed ledger for each step or task of the construction schedule. Via smart contract, exemplary embodiments may place and terminate insurance coverage based on the construction schedule and contracts. The exemplary embodiments may build a complete record of plans, the actual "as builts" including make, model, serial (Continued)

number or other identification of for every component in the home resulting from the construction project. The record may include a complete record of who completed the work, who inspected the work and how the project was insured and funded.

14 Claims, 55 Drawing Sheets

(51) Int. Cl.
  *G06Q 20/06* (2012.01)
  *H04L 9/06* (2006.01)
  *G06Q 20/40* (2012.01)

(52) U.S. Cl.
  CPC ............ *G06Q 50/08* (2013.01); *H04L 9/0637* (2013.01); *G06Q 2220/00* (2013.01); *H04L 2209/38* (2013.01)

(58) Field of Classification Search
  CPC .............. G06Q 2220/00; H04L 9/0637; H04L 2209/38
  USPC .......................... 705/7.15, 7.23, 32, 333; 1/1
  See application file for complete search history.

(56) References Cited

U.S. PATENT DOCUMENTS

2019/0333169 A1* 10/2019 Povar ...................... G06F 16/27
2019/0377904 A1* 12/2019 Sinha .................... H04L 9/0637
2020/0034766 A1* 1/2020 Borges ............. G06Q 10/06313

OTHER PUBLICATIONS

Blockchain Technology in the Construction Industry: Digital Transformation for High Productivity, Dec. 2018; Ice: Institution of Civil Engineers, 52 pages. (Year: 2018).*
Ghanem, et al., "A Case Study for Improving Construction Project Management", 2015, 51st ASC Annual International Conference Proceedings, 9 pages. (Year: 2015).*
David Barista, "'BIM for all' platform pays off for contractor", Dec. 4, 2013, bdcnetwork.com (Year: 2013).*
David McGlothlin,"Technology shakes up how projects are planned, scheduled and built" Jul. 24, 2017, azbigmedia.com, 13 pages ( Year: 2017).*
Penzes, Balint, Blockchain Technology in the Construction Industry, Dec. 2018; ICE: Institution of Civil Engineers., 53 page (Year: 2018).*
Murvold et al., "Experiences From the Use of BIM-Stations", Aug. 2016; Conference: Proc. 24th Ann. Conf. of the Int'l. Group for Lean Construction, 11 pages (Year: 2016).*

* cited by examiner

USE OF BLOCKCHAIN-BASED DISTRIBUTED LEDGER AND SMART CONTRACTS FOR A CONSTRUCTION PROJECT

RELATED APPLICATIONS

The present application is a continuation in part of U.S. patent application Ser. No. 16/452,076, entitled "Site Supervisor System for Construction Sites," filed on Jun. 25, 2019, which priority is claimed, and which is expressly incorporated by reference herein.

BACKGROUND

Control and accountability at a construction site affect efficiency, productivity, and ultimately costs and profitability. Security, access control, automated process management, centralized real time records and data, and accountability at construction sites are often lacking or lax.

In many instances, individuals may come and go from construction sites freely. Moreover, there often are no security mechanisms for protecting the construction sites after hours. Access to a given construction site is typically controlled by the presence of supervisors at the site. Unfortunately, such supervisors may find it difficult to monitor and control access of all of the individuals coming and leaving from the construction site, and any one supervisor is not present on the site twenty-four hours a day, seven days a week. With a human supervisor, there is not a continuum of information or effective transfer without loss of data and information. Construction sites have multiple stakeholders who may be present at the same time or at different times, which further complicates control and accountability. Moreover, records of individuals and materials entering and leaving from the construction sites are not typically recorded on an ongoing basis and are seldom part of a record for all current and future stakeholders.

Control and confirmation of deliveries at construction sites is limited, requiring the mere signature or sign off of any individual on the construction site in order for the deliveries to be accepted, or in many cases, deliveries are made to unattended sites with delivery drivers' self-verification. Unattended deliveries are in jeopardy of theft. Deliveries may arrive unscheduled, out of sequence, and/or delayed to sites creating delays, and the records of deliveries may be limited, often consisting of paper receipts. The deliveries may be made regardless of weather conditions, resulting in some materials being subject to rain and other weather conditions that may affect the materials that are delivered. This can result in legacy issues for warranties and quality. At large sites, errors may occur with deliveries to the wrong location or wrong contractor as different trades may use common materials.

Construction sites are some of the most dangerous places to work. They are difficult to control, secure, and provide accountability and coordination between the multiple stakeholders over a complex and complicated process. Access to controlled areas of a construction site is difficult to set, maintain, and monitor. Despite regulations and best efforts, many of the workers may not be covered by Workers Compensation Insurance. Safety briefings, appropriate individual safety equipment, disclosure lists of dangerous or hazardous materials with corresponding emergency procedures are difficult to locate on most construction sites, if they even exist. Use of tools and equipment by unlicensed, untrained, or uncertified workers is common, and may result in serious accidents.

Construction workers are the lifeblood of a construction site. Accounting for their comings and goings, verifying their licensure, confirming their payroll, and even confirming their location on the construction site is difficult. Confirmation of real time progress to optimize and improve efficiency and scheduling requires a constant and coordinated supervisory presence.

SUMMARY

Exemplary embodiments described herein may provide solutions to the problems identified above.

In accordance with an exemplary embodiment, a method is performed in a decentralized computing environment. Per the method, a planned bill of materials (BOM) for a construction project is referenced on a blockchain-based distributed ledger. For example, the planned BOM may be passed through a secure hash function, and the resulting hash value may be referenced on the blockchain-based distributed ledger. For example, a block on the blockchain-based distributed ledger may contain a hash value to a tree. The tree may be a Merkle tree with data content at the nodes. An actual BOM for the construction project may be created and updated as construction progresses to reflect actual materials used in the construction project. A final representation of the BOM when the construction project is completed is referenced on the blockchain-based distributed ledger, and a certificate of materials is created for an owner of a construction resulting from the construction project based on the final BOM.

In accordance with an exemplary embodiment, a method is performed in a decentralized computing environment, such as a peer-based network. Per this method, a construction schedule for a construction project is received. The construction schedule includes a sequence of tasks to be performed and specifies when the tasks are to be performed. Smart contracts are provided that use a blockchain-based distributed ledger for the sequence of tasks, where each smart contract specifies what is to be done per task under the contract, when it is to be done, a value of the contract and conditions to be satisfied for payment. Payment is realized via electronic currency through the smart contracts as tasks are completed and specified conditions are satisfied.

In accordance with an exemplary embodiment, a method is performed in a decentralized computing environment having at least one processor and access to a storage medium. The method includes obtaining an image and/or obtaining information from an electronic device regarding items delivered to a construction site by a supply company. A representation of the image and/or the obtained information are stored on a distributed ledger in the storage medium. Terms of a smart contract for the delivery are referenced on the distributed ledger in the storage medium. Determining whether the delivery satisfies the smart contract, and where the delivery satisfies the smart contract, electronic payment is provided for the delivery to the supply company.

In accordance with an exemplary embodiment, a method is performed in a decentralized computing environment. A smart contract that uses a blockchain-based distributed ledger is provided from a construction company that pertains to some portion of a construction project. Notes and/or a report from an inspector relating to the construction project are referenced on the distributed ledger. A notice is received that some of the construction project has been completed. Information is received regarding an inspection of the construction project, and information regarding an inspection of the construction project is referenced on the distributed ledger. The information regarding the inspection is accessed, and a determination is made whether inspection was approved, and where it is determined that the inspection was approved, the construction company is paid electronically per the smart contract.

In accordance with an exemplary embodiment, a method is performed in a decentralized computing environment. In the method, information regarding a workflow is referenced in a storage, wherein the workflow specifies labor needs per a schedule for a construction project.

Information regarding progress of construction is stored in a storage. Based on the information regarding the workflow and the information regarding the progress of construction, labor needs for a particular date at the construction site are determined, and a communication is generated and sent to a source of labor for the labor needs for the particular date.

In accordance with an exemplary embodiment, a method is performed. Per the method, information regarding a workflow is stored in a storage, wherein the workflow specifies what items are needed for a construction project. Information regarding progress of the construction is stored in the storage. Based on the information regarding the workflow and the information regarding the progress of the construction, a just in time date of delivery of items to a construction site of the construction project is determined by a computing device, and a communication is generated and sent by the computing device to a delivery source to deliver the items on the previously identified and determined data.

In accordance with an exemplary embodiment, a method is performed in a decentralized computing environment. In the method, a notice of a first event is received. It is programmatically determined that the first event is a lien triggering event for a construction project. An electronic communication is generated indicating that a lien relating to the construction project needs to be put in place. The electronic communication is sent to one or more parties.

In accordance with an exemplary embodiment, a method is performed in a decentralized computing environment. In the method, a smart contract is provided that uses a blockchain-based distributed ledger for a construction project, wherein an insurance provider agrees to provide worker's compensation insurance to an insured for workers at the construction project. Electronic payment for the worker's compensation insurance is held in escrow. Confirmation that workers to be insured by the worker's compensation insurance are on site at the construction project is received from an electronic site supervisor system Based on receiving the confirmation, per the smart contract, providing at least some of the electronic payment from escrow to the insurance provider and receiving an indication that the worker's compensation insurance is in place for the workers at the construction project for reference on the blockchain-based distributed ledger.

DETAILED DESCRIPTION

Figure 1A:
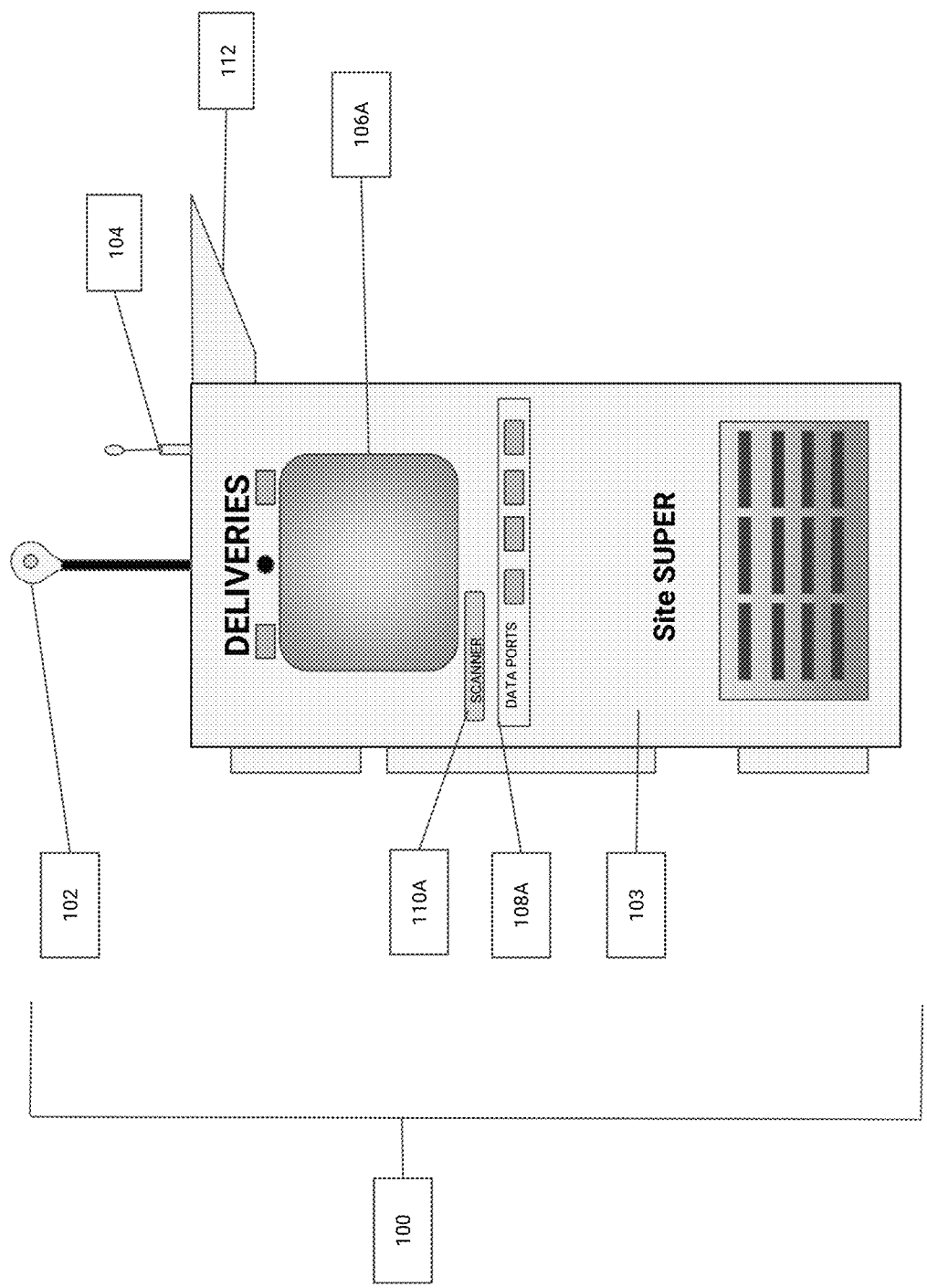
FIGS. 1A-1D depict various side views of an exemplary site supervisor system kiosk for an exemplary embodiment.

Exemplary embodiments provide a site supervisor system for providing security and controlling access to a construction site. The site supervisor system may monitor and record information regarding individuals entering and leaving the construction site. The site supervisor system may also monitor the perimeter of the construction site to provide security, especially during non-working hours. The site supervisor system may use biometric-based identification devices to confirm the identity of individuals entering or leaving the construction site. In addition, the biometric-based identification devices may also be used to identify individuals on the perimeter of the construction site.

Site supervisor systems at nearby construction sites may be interconnected using image capture devices, such as still cameras or video cameras, to provide security not only to the site on which it is stationed, but nearby sites as well. The processing of images from the multiple interconnected site supervisor systems may be performed via processing logic to identify security issues.

Confirmation of actual workers on site, and correspondingly, coverage by workers compensation insurance, licensing of workers, training for tools and jobs, and possession and usage of appropriate safety equipment is elusive. Onsite accident and claims management with immediate access to emergency care facilities and hazardous materials protocols is rare.

A system utilizing biometrics for verification of actual workers on the construction site to correspond with professional licenses and work certifications for verified payroll and insurance coverage would optimize processes and ensure coverage. Onsite verification of processes, inspections, completions and deliveries with automated adjustments and notifications with confirmation would ensure increased productivity. Real time construction plans with corresponding training and construction manuals would improve quality control and efficiency but rarely exist.

Automated verification of quantities, quality, and correct product deliveries along with after delivery tracking of materials with accountability is seldom used. Designated delivery areas with geofenced control and tracking of materials once delivered would help prevent loss. Confirmation of products integrated at a construction site provides transparency regarding sourcing, warranties, as well as future reference during the structure and individual products life of use.

The site supervisor system seeks to identify all individuals entering or leaving the construction site and persistently records this information in a storage, such as in a database. Such records may be useful in a number of different contexts. The biometric-based identification device may be a camera or other image capture device. Facial recognition may be performed on the captured facial image to attempt to identify the individual. Alternative biometric-based identification devices, such as voice recognition systems, retinal scans, fingerprint scanners, hand scanners, voice print devices and the like may be utilized in the alternative or in addition to other biometric devices. As a last resort, the computing logic may allow authorized individuals to manually enter the presence of another authorized individual.

The site supervisor system may record the time of arrival and the time of departure of individuals from the construction site. The site supervisor system may also record the date and current weather conditions. As such, the site supervisor system may confirm that the workers were at the construction site for the intended time windows and can record the hours that the workers worked to ensure that the workers are paid correctly. The site supervisor system may also compare the worker arrival and departure information to ensure that the worker arrives in a timely fashion and on the proper date. The weather information may be used to modify the schedule for workers so that workers are not working during inclement weather and to record the weather conditions at the time that the worker worked. Additionally, the processing logic may prevent work from being performed if said work would violate manufacturer guidelines for installation/application. The recorded information may also be useful in providing or disproving insurance claims or worker's compensation claims. The recorded information may also be useful to confirm installations or adherence to manufacturer specifications related to temperature or weather-related conditions.

If the site supervisor system determines that an unidentified individual attempted to enter the construction site, the site supervisor system may take the appropriate responses, such as sending notifications, triggering alarms and/or contacting law enforcement authorities or security personnel. The decision as to the appropriate response may be determined by, the date, the time current weather conditions, or related factor.

The site supervisor system may also control access to tools, equipment, materials and areas of the construction site. As to tools, equipment and materials, the site supervisor system may confirm the identity of an individual and grant access to certain tools and equipment using smart locks and/or other technology. The site supervisor system may limit the dates and duration of access to the tools/equipment such that the tools/equipment must be returned within the specified date/time window.

The smart locks may also be used to limit access to certain portions of the project under construction. An individual's right to a portion of the construction site may be dictated by permissions that are stored through each party involved in the construction process. This may eliminate keyed entry during the process and provide further verifications of individual or group access.

The individuals on the construction site may be prompted to wear certain wearables that provide useful information to the site supervisor system. For instance, individuals may be prompted to wear location tracking devices, such as GPS devices, Bluetooth, radio frequency identification (RFID) devices, ultra-high frequency (UHF) and/or beacon-based devices. The use of the wearables helps to perform geofencing within the construction site. The location tracking provided by the wearable helps the site supervisor system to monitor the location of individuals on the construction site on an ongoing basis. The permissions may define what portions of the construction site an individual may access. Ongoing monitoring may indicate that an individual is attempting to enter a location where the individual is not permitted. This may trigger a response, such as an alarm, a notification or even contacting of security or law enforcement officials. Individuals may be required to wear vests or other wearables that contain signaling capabilities. In such an instance, a signal may be sent to the vest or wearable to trigger a visual or audio cue that the individual is not in a permitted area. In addition, individuals may be requested to wear wearables that track biometric information, such as heart rate, body temperature, respiration rate and blood pressure. This information may be tracked and stored on an ongoing basis. When the biometric data gathered from these wearables are outside an acceptable range, which may indicate physical danger or injury, appropriate response actions may be taken such as notifying the individual, notifying a supervisor and/or contacting medical personnel. Collected data may be used to verify a multitude of factors such as reported accidents, incidents of theft, hours worked, and the like. The individuals on the construction site may be prompted to wear certain safety equipment related to their assigned tasks. The confirmation of the safety equipment may be useful in the prevention of accidents or in the prevention or lessening of injuries in the event of an accident.

The site supervisor system may track materials. When a delivery is made, the delivery person may enter delivery notes and the delivered materials may be scanned or read to confirm the quantity and nature of what has been delivered. This information may be recorded.

Additional information, such as current weather conditions may also be recorded. The site supervisor system may track the movement of materials, tools and equipment at the construction site. Scanning technology such as RFID readers, UHF readers and/or the like may be utilized to assist the location tracking for tools, equipment and materials. The tracking of materials helps reduce the risk of theft. For example, the tracking solution may indicate instances of possible theft, such as when the materials are leaving the construction site when the removal of the materials is not appropriate.

The site supervisor system may allow for the establishment of one or more geofenced delivery zone areas. These areas could be monitored and established with additional access restrictions to individuals to further prevent loss or damage of materials.

The site supervisor system may control access to power by individuals of the construction site. The site supervisor system may provide a number of power outlets and may grant access to the power outlets as warranted. The use of power may be recorded by the site supervisor system Different levels of voltage may be provided as required. Parties using the power outlets may be billed appropriate amounts based upon the recorded power usage.

The site supervisor system may also interface with the inspectors such that an inspector may enter notes and related details of an inspection. The site supervisor system may allow the inspector to capture images of notes, forms, and the like using various solutions.

Exemplary embodiments may reference a record of a construction project on a blockchain-based distributed ledger. The process of maintaining the record for the construction project may begin by the development of a Building Information Model (BIM) that contains 3D plans for the construction with full details. Based on the BIM, a Bill of Materials (BOM) may be determined. The BOM contains a complete itemization of materials needed for the construction project. The BOM includes information such as make, model, quantity, warranty information, hazardous material information or other safety details. The BOM may be updated as actual materials arrive to the site that includes serial numbers, bar codes, QR codes, RFID values or other component or product identifications.

Materials arriving to the project may be recorded as part of the permanent record. Both the BIM and BOM may be referenced on a blockchain-based distributed ledger in a secured and immutable fashion. In some instances, the BIM and BOM may be passed through a secure hash function (such as the MD5, SHAO, SHA-1, SHA-2, SHA-3 hash functions), and the resulting hash values may be referenced on the blockchain-based distributed ledger. Thus, by referencing the hash values on the blockchain-based distributed ledger, in this approach the BIM and BOM are referenced on the blockchain-based distributed ledger. Since the hash values are reflective of the contents of the BIM and BOM, one can make certain that the contents have not changed by recomputing the hash values given that the hash functions are deterministic.

The exemplary embodiments may receive or determine a construction schedule that contains full project details and sequencing, including the specification of dependencies. Smart contracts may be provided that use the blockchain-based distributed ledger for each step or task of the construction schedule. This information and the schedule may be augmented with worker or employee lists for each task. The smart contracts may set forth acceptance or inspection requirements for confirmation of completion and payment.

A worker's compensation insurance policy may be managed via smart contract. The smart contract may be interdependent on the BOM and other contracts. Via smart contract, exemplary embodiments may place and terminate insurance coverage based on the construction schedule and contracts.

The exemplary embodiments may confirm conditions at the construction site and may record/hash weather conditions at the time certain tasks are started, stopped, and/or marked as complete. The exemplary embodiments may record the weather conditions related to the materials on site.

The exemplary embodiments may build a complete record of plans, the actual "as builts" including make, model, serial number or other identification of for every component in the home resulting from the construction project. The record may include a complete record of who completed the work, who inspected the work and how the project was insured and funded. This record may be updated as any property management adds information like maintenance requests, maintenance completions, utility usage, rental history, etc.

FIGS. 1A-1D illustrate an example of a site supervisor system for an exemplary embodiment. In FIGS. 1A-1D, the site supervisor system is implemented as a kiosk 100. The kiosk 100 may be located at a construction site. One suitable approach is to pour a concrete slab and then position a kiosk on the slab in a secured manner.

FIG. 1A shows a first side of the site supervisor system kiosk 100. The kiosk 100 includes a camera 102 for obtaining images of individuals entering or leaving the construction site as well as images of individuals along a perimeter of the construction site. As will be explained in more detail below, the camera 102 may capture biometric images upon which biometric recognition may be performed. We may use many cameras on, in, or around the kiosk to achieve the needed data. These cameras may be placed on or around the kiosk 100. The cameras may have biometric recognition and motion detection capabilities. It should be noted that the kiosk 100 may include an addition to the camera 102 or instead of the camera 102, biometric-based identification devices that are used to confirm the identity of individuals entering, leaving or on the perimeter of the construction site. The kiosk 100 may include an antenna 104 for communicating with a wireless network, such as a WiFi network, Bluetooth or a 4G/5G cellular network. The kiosk 100 may include a housing 103 made of suitable weather resistant material, appropriately sealed to protect the internal hardware. The kiosk 100 may include a display 106A, such as a touchscreen display, upon which information may be displayed and entered. The display 106A may include an integrated camera that may be used to capture images and that may be used in performing facial recognition of individuals. The display may also include one or more integrated speakers for providing audio output. The kiosk 100 may include a scanner 110A for scanning items, such as deliveries, as will be explained in more detail below. The scanner 110A may be, for example, a QR scanner, an Optical Character Recognition (OCR) or a bar code scanner 110A in some instances. The side of the kiosk 100 shown in FIG. 1A is intended to be used for deliveries and inspections. Thus, a delivery person may scan delivered items via the scanner 110A and may interface with the kiosk using the touch screen display 106A, as will be described below. An inspector may scan or take images of inspection documents via the scanner 110A or camera and may interface with the kiosk using the touch screen display 106A, as will be described below. In some alternative embodiments, there may be fewer sides in which to interact with the kiosk for all authorized personnel. An overhang 112 may be provided to assist in decreasing glare and protecting some of the items on the kiosk from the weather.

Figure 1B:
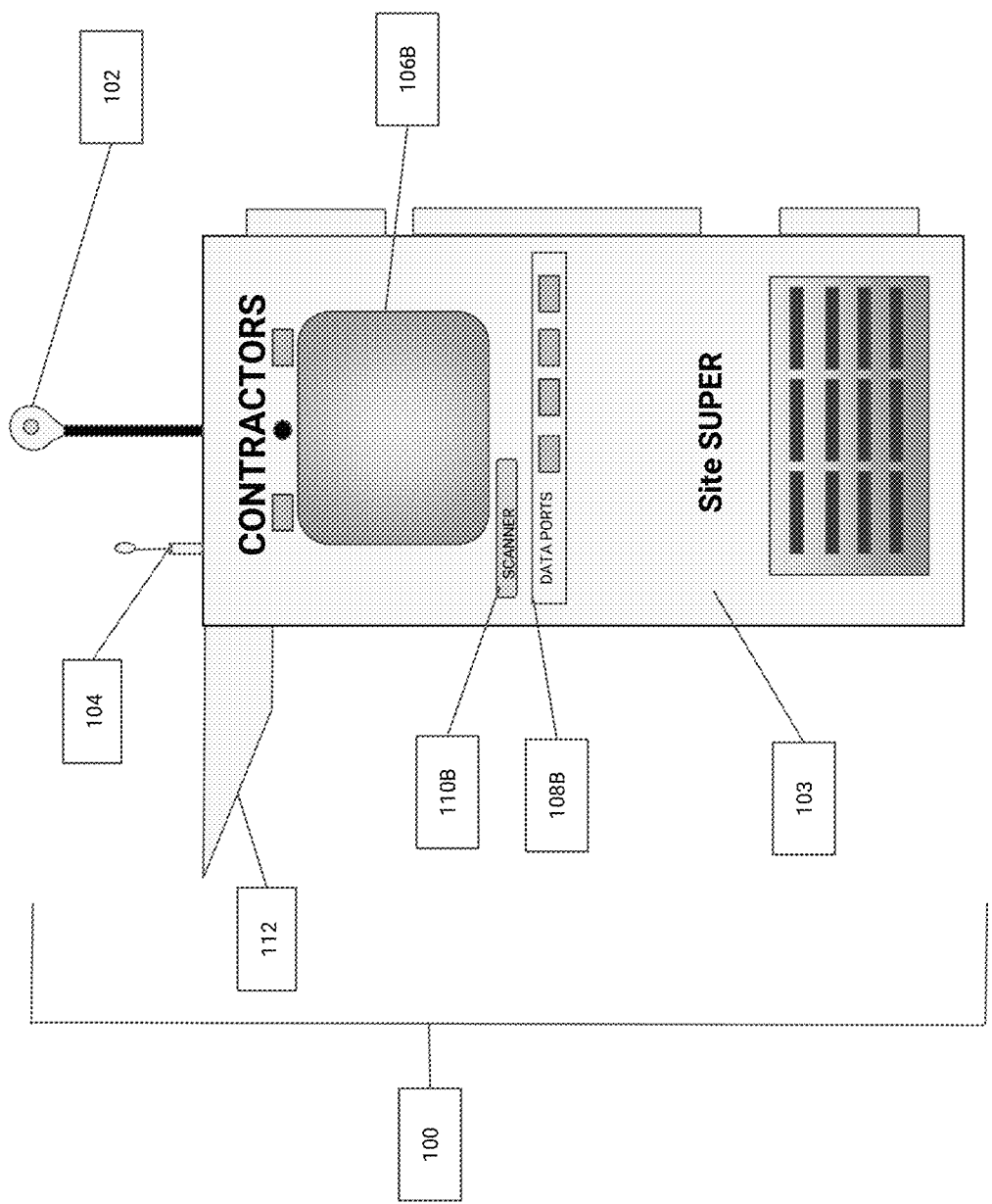

FIG. 1B depicts another side of the kiosk 100. This side also includes a touch screen display 106B as well as a scanner 110B. Like display 106A, display 106B may include an integrated camera for capturing images and speakers for providing audio output. Still further, this side of the kiosk 100 may include data ports 108B. This side of the kiosk is intended for use by contractors (e.g. workers and other construction related personnel). The kiosk 100 may be accessed to gain access to equipment, tools and to sign in or sign out when leaving or entering the construction site, as will be described below.

Figure 1C:
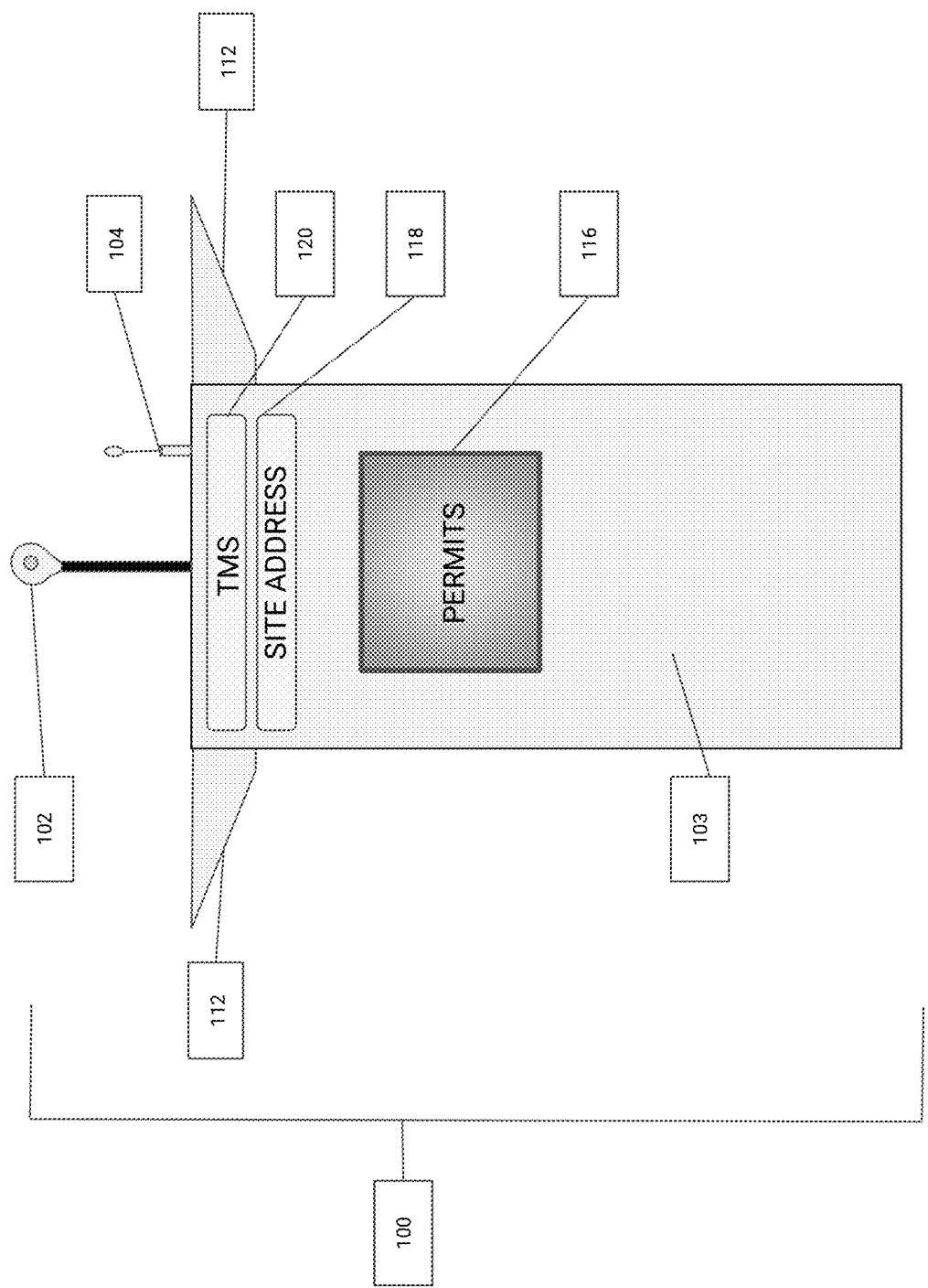

FIG. 1C shows a third side of the kiosk 100. This side has a location 116 in which permits may be displayed. In some alternative embodiments, the permits may assume electronic form so that a video display is provided in the area 116 of the kiosk 100. The tax map submap (TMS) number 120 for the construction site location may be displayed on the kiosk 100. In addition, the site address 118 may be displayed on the kiosk 100. The site address may refer to both the mailing address for the construction site and/or the GPS location.

Figure 1D:
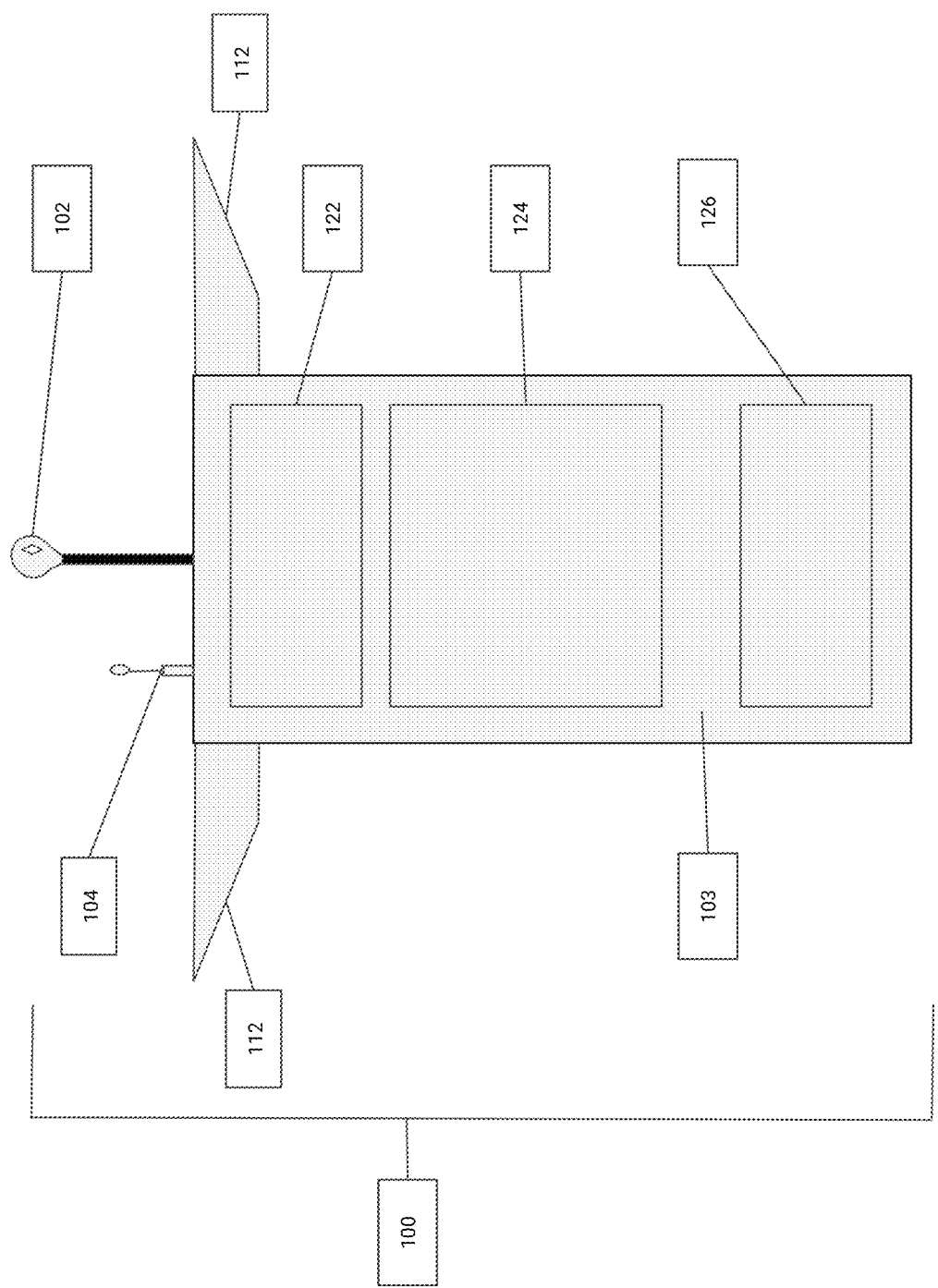

FIG. 1D shows the final side of the kiosk 100. An access panel 122 may be provided to access a breaker box for the kiosk 100. An additional access panel 124 may also be provided to access internal components of the kiosk 100. Still further, access panel 126 may be provided to gain access to power plugs for providing power at the construction site. The access panel 126 may be under programmatic control in some instances to regulate access to the power plugs. If access is granted, the panel is unlocked, whereas if access is denied, the access panel 126 is locked. In some embodiments, access to the power supply may be controlled by controlling the flow of power to the power plugs under programmatic control. These control mechanisms may be used separately or in conjunction.

It should be noted that in alternative embodiments, the supervisor system need not be implemented as a kiosk. Instead, separate components that are not housed in a common housing may be utilized in some alternative embodiments.

Figure 1E:
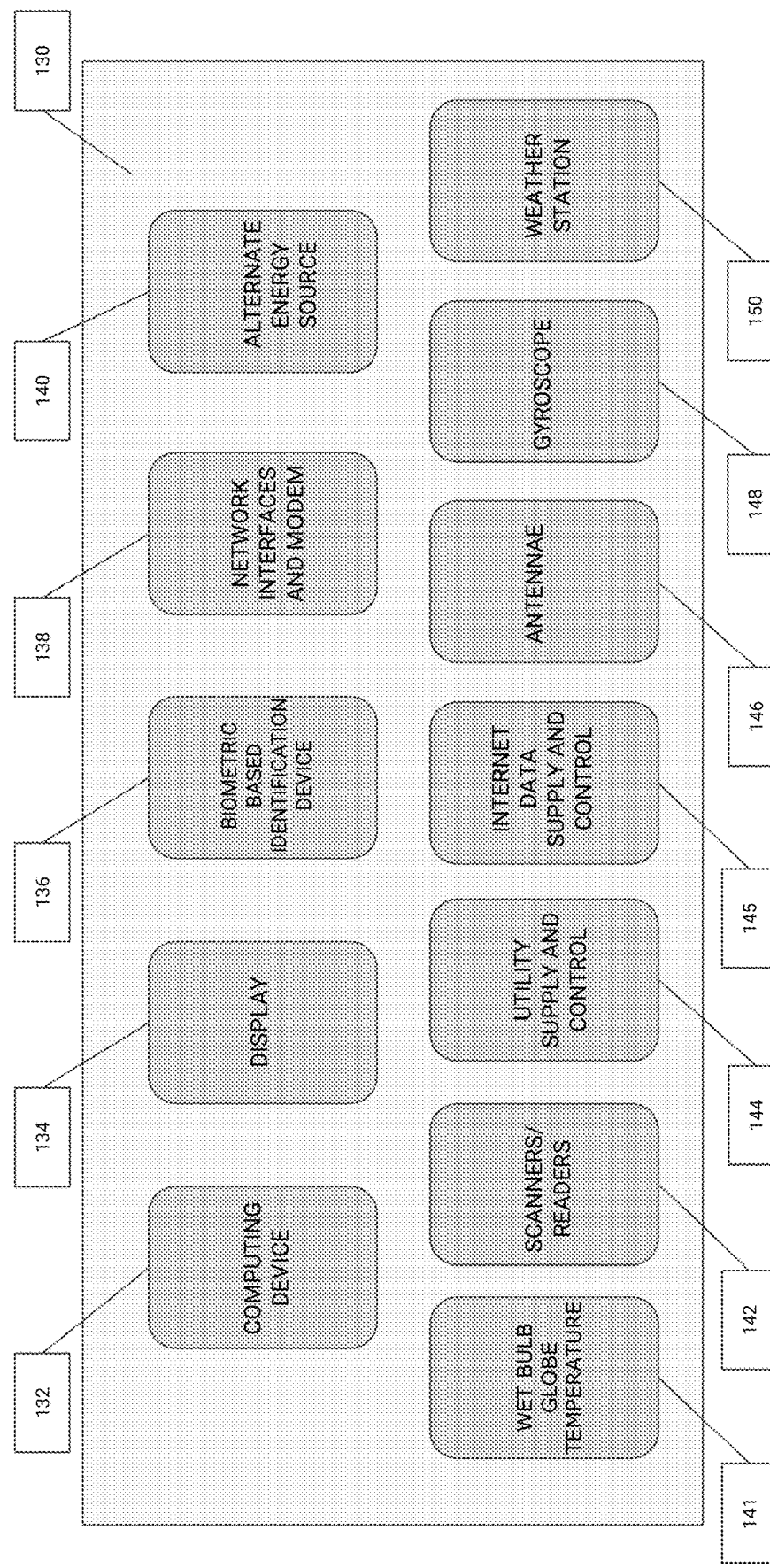
FIG. 1E depicts a block diagram of components that may be found in a site supervisor system in exemplary embodiments.

FIG. 1E depicts components that may be found in the site supervisor of exemplary embodiments even when not housed in a kiosk. The site supervisor may include a computing device 132. The computing device 132 may take many different forms indicating a desktop computing device, a laptop computing device, a mobile computing device, an embedded system, a smartphone or the like. A display 134 may be integrated with the computing device 132 or as a separate device, such as a liquid crystal display (LCD) device, a light emitting diode (LED) display device or other types of display devices on which computer information may be displayed. One or more biometric-based identification devices 136 may be provided. As will be explained in more detail below, multiple biometric-based identification devices may be used.

Network interfaces and a modem 138 may be provided. The network interfaces may interface the computing device 132 with a local area network or a wide area network. The network may be wired or wireless. A modem may be provided in order to communicate telephonically or over cable lines with remote computing devices.

The site supervisor system 130 may be implemented in a distributed fashion and may include an alternative energy source 140. For example, solar panels, wind turbine(s), a battery or the like may be used. In a kiosk implementation, the alternative energy source may be physically affixed to the kiosk. For example, solar panels or a cable to a wind power source could be affixed to the kiosk. Alternatively, a power line leading to the alternative energy source may be connected to the kiosk to provide power for the kiosk.

The site supervisor system 130 may include various scanners and readers 142, such as those described above relative to kiosk. The site supervisor system 130 may include a utility supply and control 144 and a mechanism for turning the utilities, such as power, gas and/or water, on and off under a programmatic control. The site supervisor system 130 may include an internet data supply control 145 and a mechanism for turning the access to this service on and off under a programmatic control. Programmatic control may be provided to grant or deny access to such resources. The site supervisor system 130 may include an antenna 146 for wireless communications signals to receive and transmit. The site supervisor system 130 may include a gyroscope 148 to monitor any moving of the system. The gyroscope 148 may indicate motion indicative of whether someone is trying to move or tilt the kiosk. Logic may be provided to send a notification in such an event where the gyroscope indicates substantial enough movement. The site supervisor system 130 may include a weather station 150 to measure current weather conditions, such as temperature, wind, precipitation, barometric pressure and the like. Input from the weather station 150 may be used to inform decision making by the site supervisor system in some instances. Alternatively, the weather may be collected via software, such as from a weather service or other weather source. Similarly, the site supervisor system 130 may include a wet bulb globe temperature device or a source of wet bulb globe temperature data 141. Wet bulb globe temperature is a measure of heat stress in direct sunlight, which accounts for temperature, humidity, wind speed, sun angle and cloud cover (solar radiation).

Figure 2A:
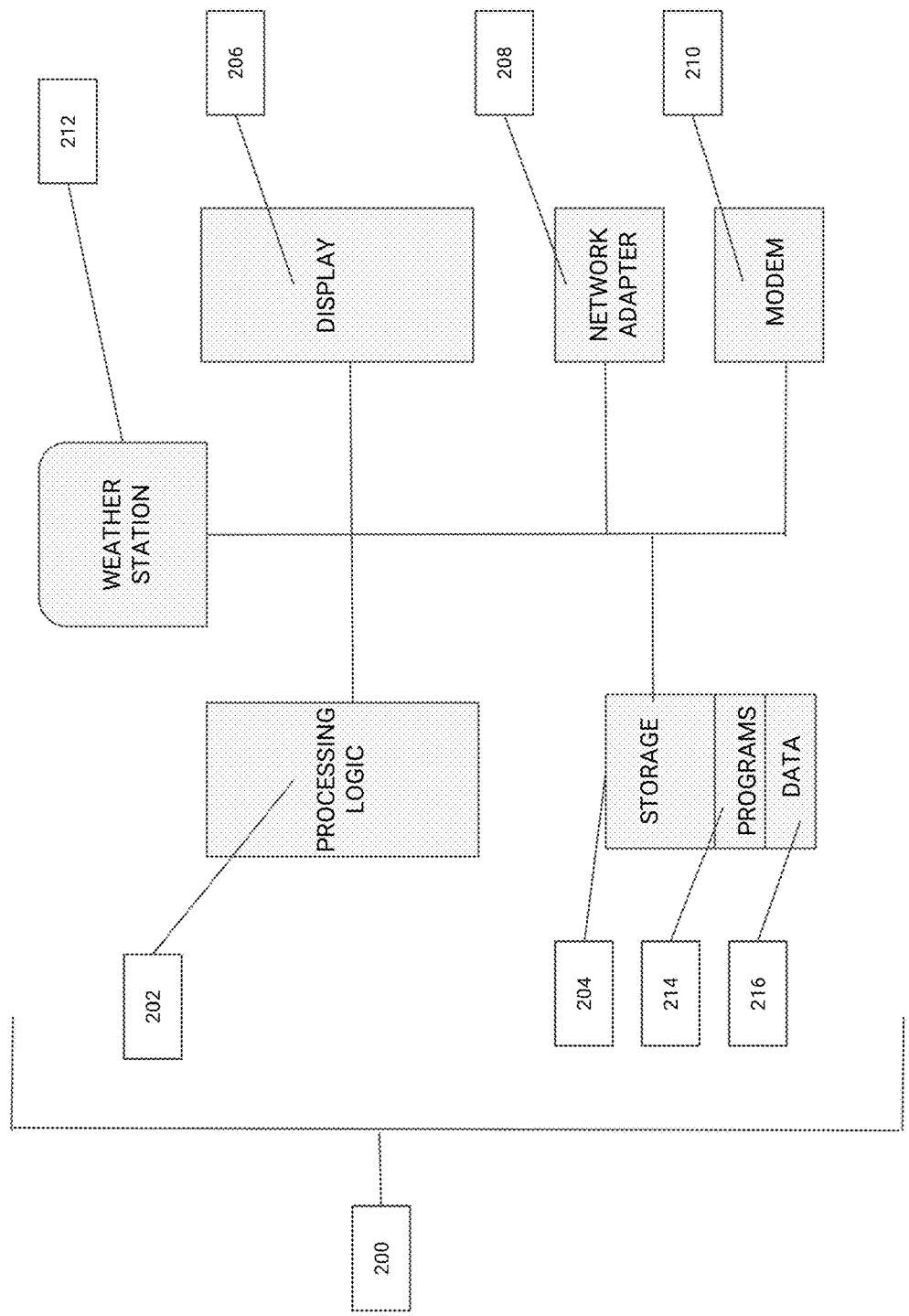
FIG. 2A depicts a block diagram of components that may be found in a computing device for a site supervisor system in an exemplary embodiment.

FIG. 2A shows an example of a computing device 200 for the site supervisor system. The computing system may include processing logic 202, such as microprocessors, controllers, field programmable gate arrays (FPGA), application specific integrated circuits (ASICs) electronic circuitry, and other types of logic. The processing logic 202 performs the operations of the computing device 132. A storage device 204 may also be provided. Storage capability 204 may take various forms, including magnetic storage, optical storage, etc. Storage capability 204 may include computer-readable media, including removable computer readable media, such as disks, thumb drives and the like, or disk drives, solid state memory, random access memory (RAM), read only memory (ROM) and other types of storage.

The computing device may include a display 206, such as an LCD display, an LED display or other types of display devices on which video information may be displayed. The computing device 200 may include a network adapter 208 for interfacing with networks and a modem 210 for communicating wirelessly, over telephone lines or cable lines with remote devices.

The processing logic 202 may use information stored in the storage device 204. In particular, the processing logic 202 may execute programs 214 stored in the storage and may access and store data 216 relative to the storage device 204. The computational functionality of the site supervisor system described herein may be realized by the processing logic 202 executing the programs 214.

Figure 2B:
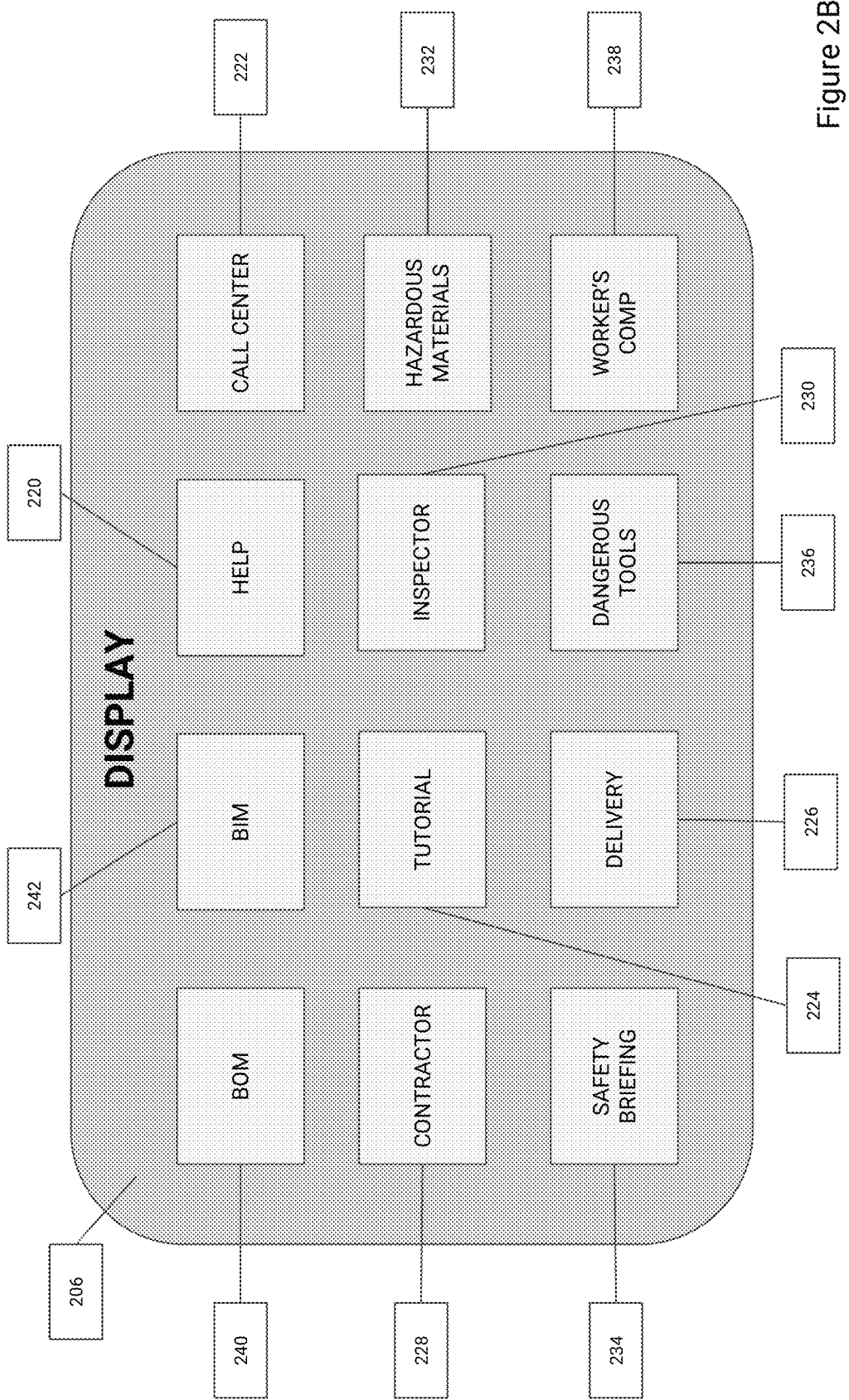
FIG. 2B depicts an illustrative user interface that may be shown on a display in the site supervisor system.

FIG. 2B shows an example of a user interface on display 206, such as found in the kiosk 100. The user interface may include activatable elements. A user may depress these activatable elements or select these activatable elements using an input device, such as a mouse, keyboard, touchscreen or the like, to activate the components. The display 206 may include a help element 220 that may be activated to obtain help information regarding use of the kiosk. It may also contain real time construction plans. It may also include "how to" assistance including videos related to the various processes and tasks performed on the specific site. The user interface on the display 206 may also include a call center activatable element 222. Selection of the call center activatable element 222 may cause a call to be initiated with a call center so that the individual using the kiosk 100 may have a telephone and or video conference with personnel at the call center. The user interface on display 206 may also include a tutorial activatable element 224. Selection of the tutorial activatable element 224 causes a tutorial to be displayed to teach the individual about operation of the kiosk.

Figure 2C:
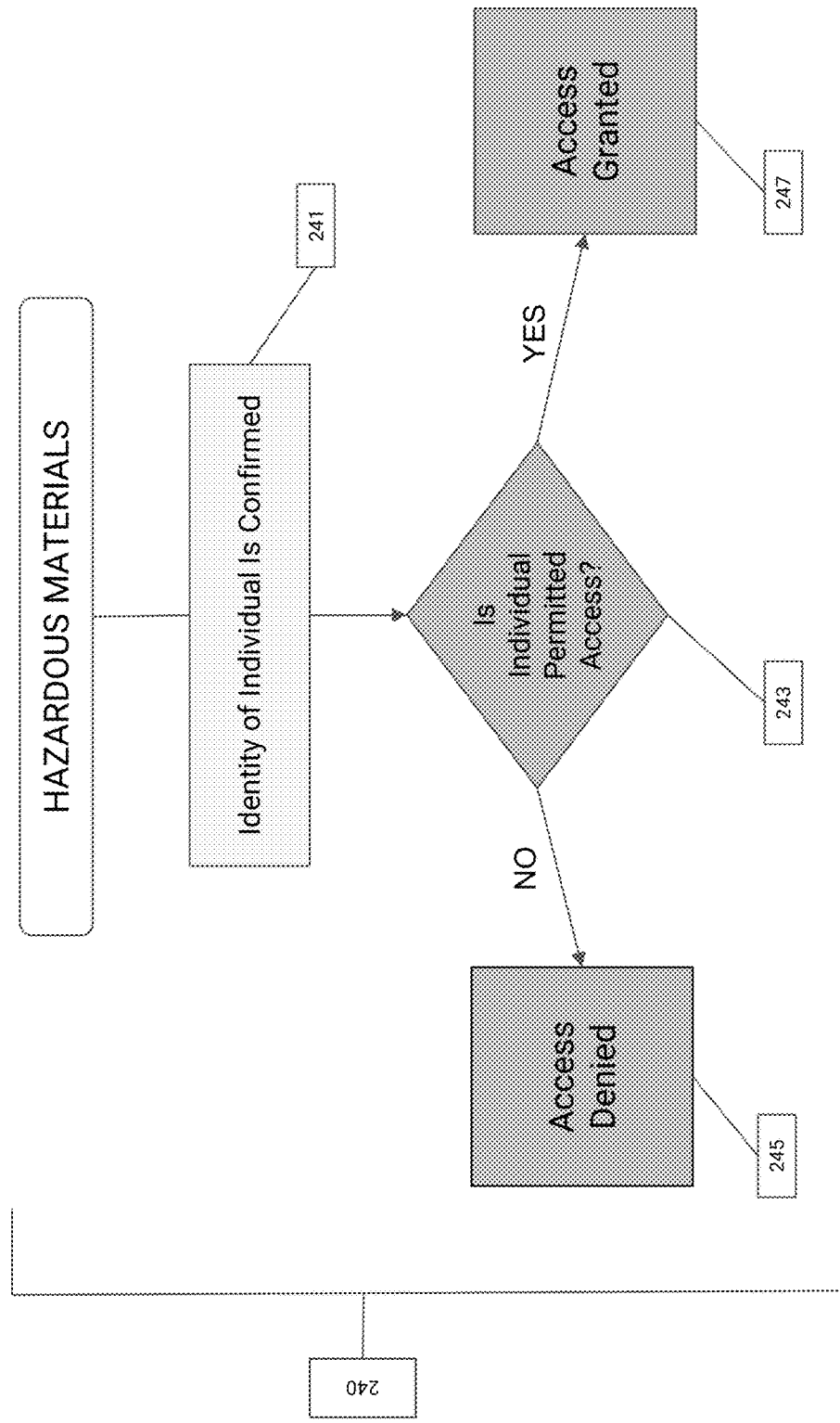
FIG. 2C depicts a flowchart of steps that may be performed by the site supervisor system to control access by workers to hazardous materials.

A list of hazardous materials at the site may be activated by activating element 232. This list may be updated as hazardous materials are delivered, removed or consumed. Access to hazardous materials may also be controlled via the site supervisor system 130. FIG. 2C shows a flowchart 240 of steps that may be taken to control access to hazardous materials at the construction site. First, the identity of the individual is confirmed 241, such as described above using biometric identity verification. The permissions information is accessed to determine if the individual is to be granted access to the hazardous materials 243. If the permissions indicate that access is to be granted, access is granted 247. In contrast if the permissions indicate that access is not to be granted, then access is denied 245.

The user interface on display 206 (FIG. 2B) may also include a safety briefing activatable element 234. Activation of this element 234 results in a safety briefing being displayed on the display 206.

The user interface on display 206 may include a dangerous tool activatable element 236. Activation of this element 236 causes the display of a list of dangerous tools on the construction site. An individual must have the proper authorization or certification to use such dangerous tools. The authorization or certification may be stored with the permissions.

The site supervisor system 130 may include coding software which allows each tool to be assigned to authorized personnel. Utilizing this coding along with smart locks as previously mentioned, the site supervisor system 130 either unlocks or prevents access.

Figure 2D:
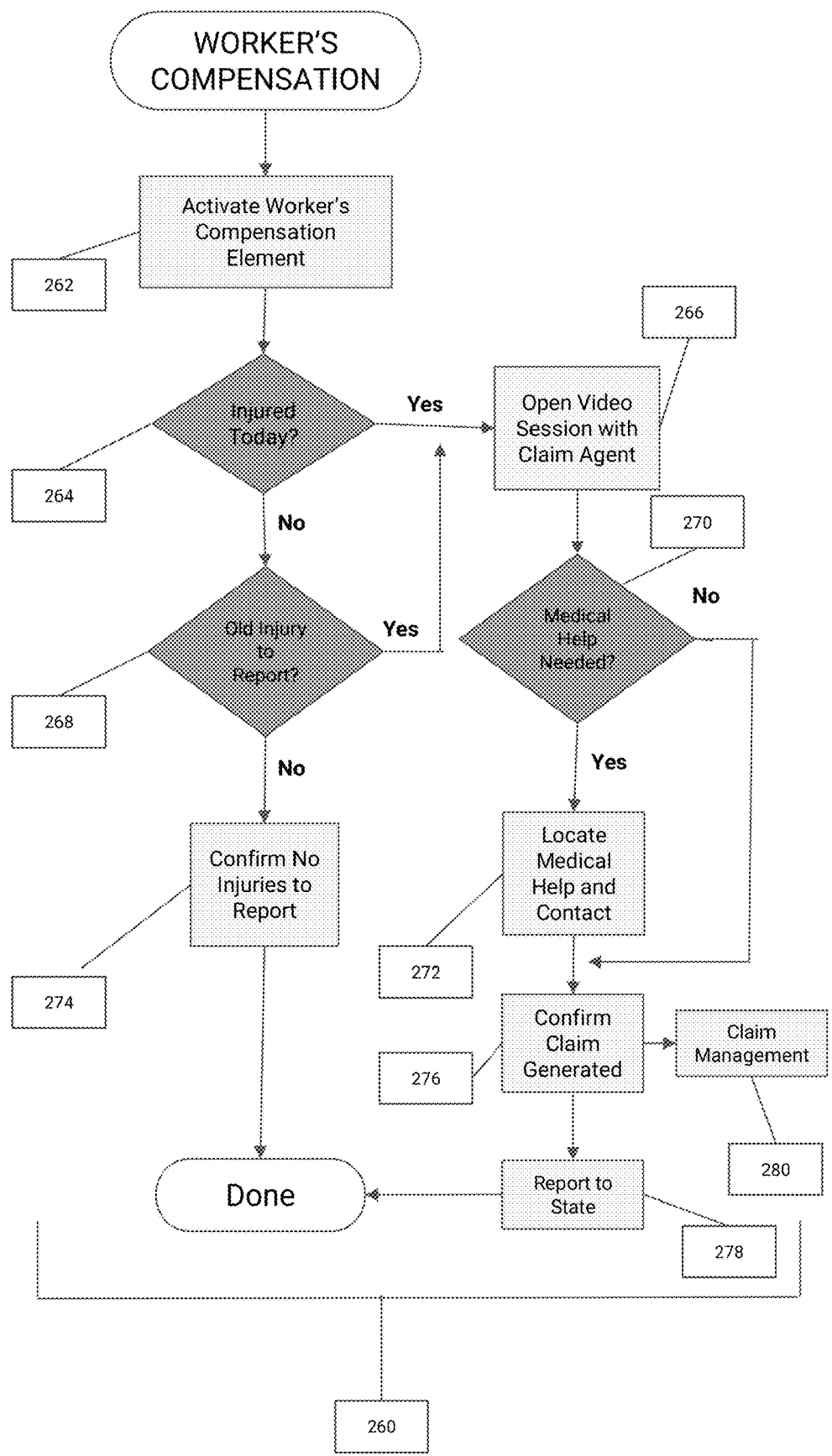
FIG. 2D depicts a flowchart of steps that may be performed regarding injuries and worker's compensation.

Selection of the worker's compensation activation element 238 may be required at the end of each work day or when an injury occurs. FIG. 2D provides a flowchart 260 of steps taken when the element 238 is activated 262. All workers may be required to enter this information each day. If the individual indicates that he/she has been injured 264, a video session with a claim agent is initiated 266. The claim agent may gather information to initiate any claim processing. The claim agent may determine if medical help is warranted 270. If medical help is warranted, the location of appropriate medical help is identified based on a location of the construction site (based on proximity and type of injury)

and contact is made with the medical help (e.g., calling of an ambulance, hospital or urgent care facility) 272. The facilities may be chosen to be "in network" for the worker's compensation carrier. A confirmation of the claims may be generated 276 and sent to claims management 280. In addition, a report may be sent to the appropriate state authority 280. The steps 266, 270 and 272 may also be performed in the instance in which the individual has an older injury to report 268. Where there is no injury to the individual, the lack of injury is reported 274.

Delivery personnel may activate the delivery activatable element 226 (FIG. 2B). This causes a delivery functionality to be displayed where delivery notes may be added and where information may be gathered from the delivery person regarding a particular delivery. A contractor activatable element 228 may be selected by contractor individuals. Selection of this activatable element 228 causes the activation of the contractor functionality whereby the contractor may sign in, request tools, equipment, power or materials, leave notes or the like.

Lastly, an inspector activatable element 230, may be activated to cause the inspector functionality to be activated. The inspector functionality may enable an inspector to add inspection notes, provide electronic inspection certificates and the like.

Figure 3A:
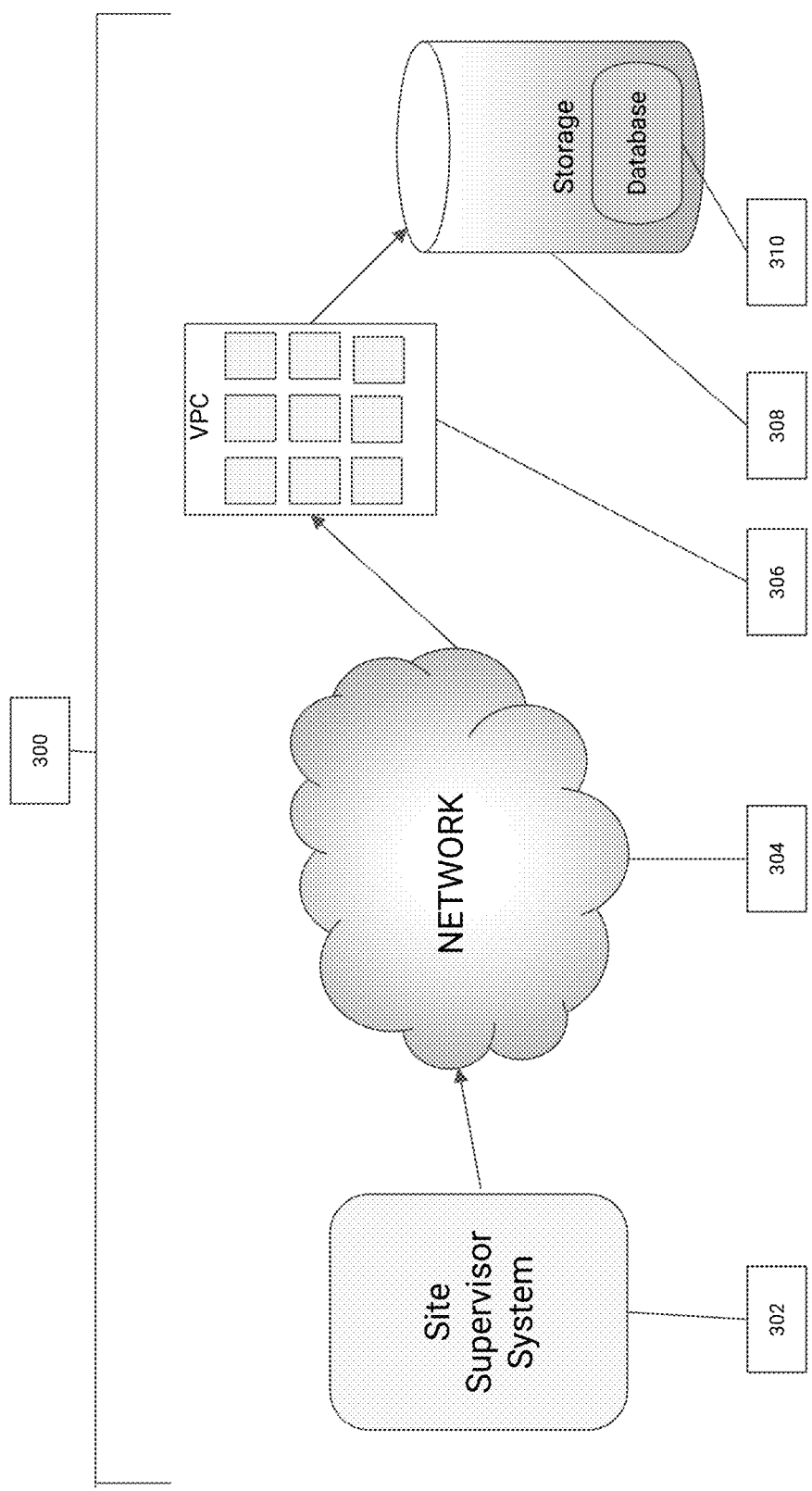
FIG. 3A depicts an example of a distributed environment in which multiple site supervisor systems communicate with a server having access to a storage device.

As shown in FIG. 3A, the exemplary embodiments may be implemented in a decentralized computing environment, that may include distributed systems and cloud computing. FIG. 3A shows one or more site supervisor systems 302 that may be in communication with a remote cluster 306 via a network 304. The cluster 306 may store information received from the site supervisor system 302 and provide added computational functionality. The network may be a wired network or a wireless network or a combination thereof. The network 304 may be a secure internet connection extending between the site supervisor system 302 and the cluster 306, such as a virtual private cloud (VPC). The server may be a computing device. The cluster 306 may include access to storage 308. The storage 308 may include a database 310 in which information regarding a construction site is stored in a consistent manner.

Figure 3B:
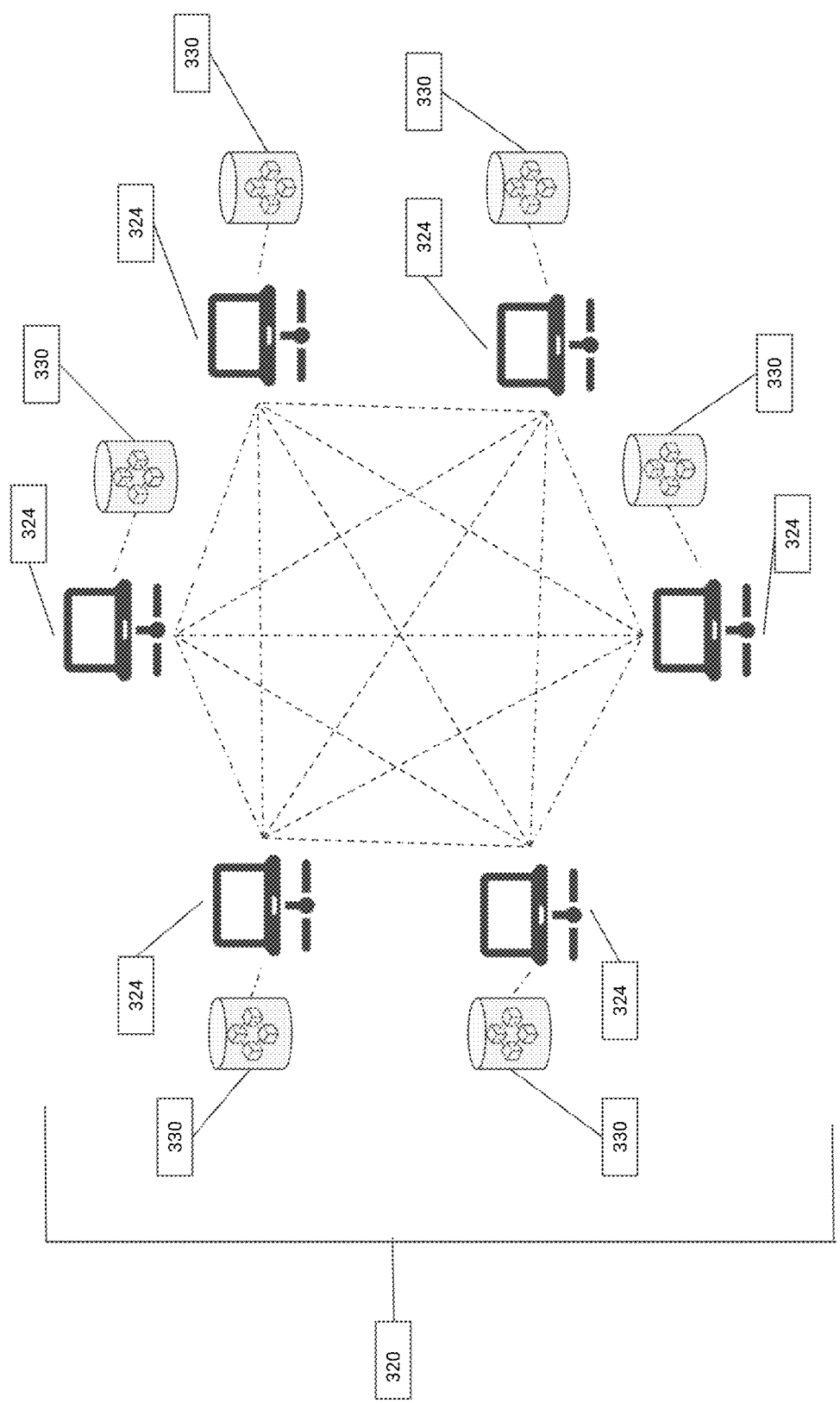
FIG. 3B depicts an example of a distributed ledger in a peer-based network.

FIG. 3B shows diagram 320 of an example of a peer-based network where a distributed ledger 330 is broadcast and shared among the nodes 324. This network may be resident in the VPC cluster 306 (FIG. 3A) or in the network 304 for example. The nodes 334 may represent computing resources, such as server computer systems or other computing systems, resident at the parties identified in FIG. 27, for example. Each node that has access to a copy of the blockchain-based distributed ledger 330 in storage.

Figure 3C:
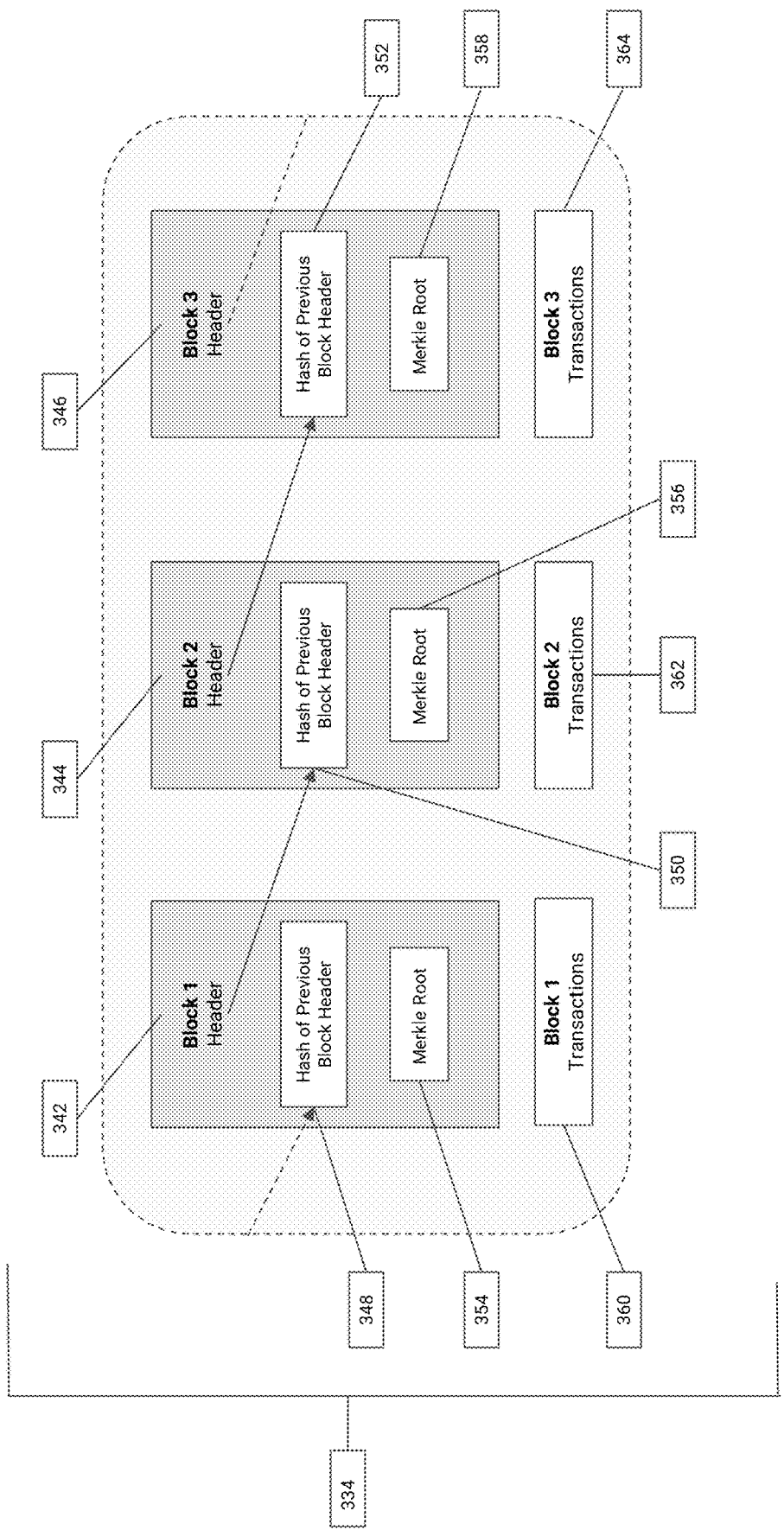
FIG. 3C depicts a simplified view of a portion of a blockchain-based distributed ledger.
Figure 3D:
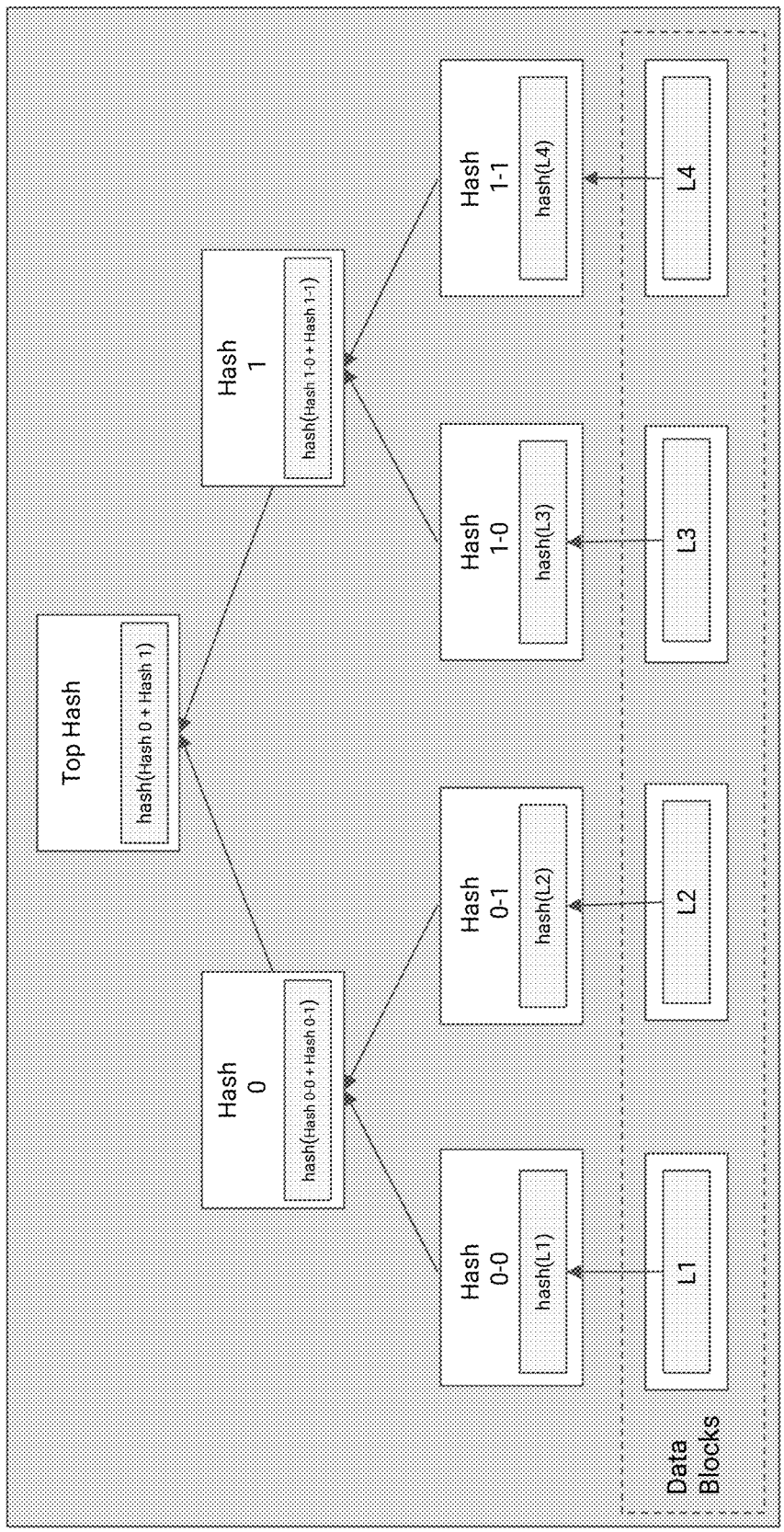
FIG. 3D depicts an example of a Merkle Tree in an illustrative distributed ledger.

FIG. 3C shows an example of a simplified blockchain 334 for use in a blockchain-based distributed ledger. The blockchain 334 is formed by interlinked blocks (i.e., Block 1, Block 2 and Block 3). Each header holds a hash of previous block header 348, 350 and 352 that acts as interlinking pointers between the block. The header may also include a reference 354, 356 and 358, such as a hash, to a root of a Merkle Tree. Data for transactions 360, 362 and 364 may be referenced via the respective Merkle Tree. FIG. 3D shows an example Merkle tree, having nodes holding hash values. Each non-leaf node is a hash of its child nodes, while the leaf nodes hold data blocks. The structure of the tree allows for efficient mapping of arbitrarily large amounts of data and enables easy identification of where changes in that data occur. As long as the root hash is publicly known and trusted, it is possible for anyone who wants to do a key-value lookup on a database to use a Merkle proof to verify the position and integrity of a piece of data within a database that has a particular root. When the root hash is available, the hash tree can be received from any non-trusted source and one branch of the tree can be downloaded at a time with immediate verification of data integrity, even if the whole tree is not yet available.

Figure 4:
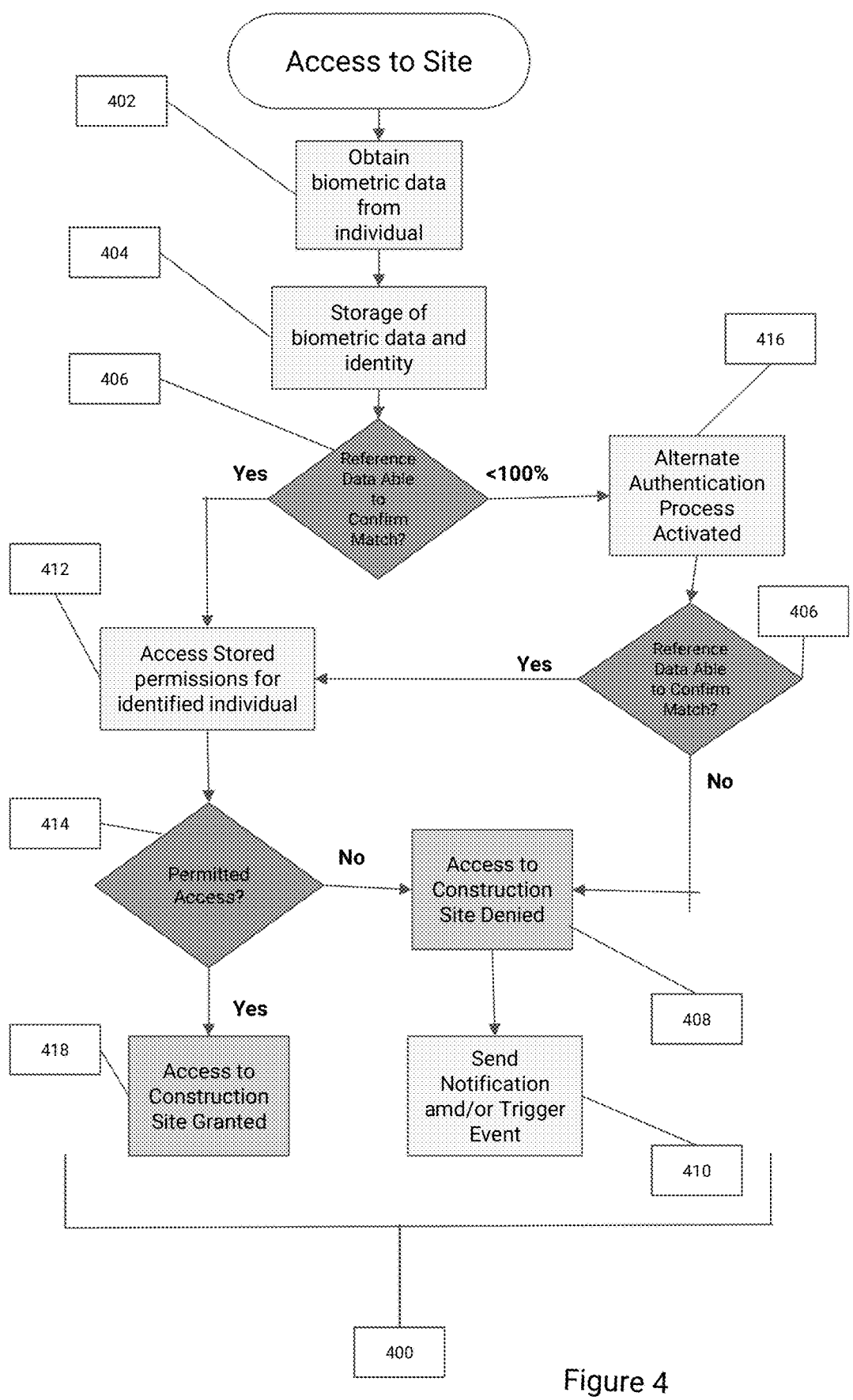
FIG. 4 depicts a flowchart illustrating the steps that may be performed in determining whether to grant access to a construction site to an individual.

As was discussed above, the site supervisor system controls access to the construction site. FIG. 4 shows a flowchart 400 identifying steps that may be performed in exemplary embodiments regarding this functionality of the site supervisor system Initially, biometric data is obtained from an individual that is seeking access to the site 402. As was discussed relative to the example of FIG. 1A in some exemplary embodiments, a camera 102 may capture an image of an individual and facial recognition may be performed. The biometric data in this case is the facial image of the individual. In other exemplary embodiments, the biometric data may be, for example, fingerprint data, hand scan data, voice print data, retinal scan data or the like, gathered by appropriate biometric-based identification devices. The obtained biometric data is stored, and then previously stored data is accessed from storage to compare biometric data for known individuals and to attempt to identify the individual 404. A comparison may be made between the gathered biometric data and the known reference biometric data to determine if there is sufficient closeness for there to be a match. Information regarding the identity of the individuals for which the biometric data is stored is also stored in the storage device. A determination is then made whether there is a match or not 406.

If there is not a match 406, a manual process may be executed, or an alternative authentication process may be deployed 416. If this alternative authentication fails to produce a match 406, access to the construction site may be denied 408. In addition, a notification may be sent to a responsible party and/or an event may be triggered, such as contacting security or law enforcement officials 410. If the alternative authentication process produces a match, the process proceeds to 412.

The site supervisor system may store permissions for each individual. These permissions may identify the dates and times where the individual is given access to the construction site. In addition, the permissions may specify what tools, equipment or materials the individual is allowed to access. The permissions may specify whether the individual is allowed to use a power supply and may specify what portions of the construction site the individual is permitted to access. These permissions may be accessed to determine the permissions for the identified individual 412. If the permissions indicate that access is permitted 414, the individual may be granted access to the construction site 418.

Figure 5:
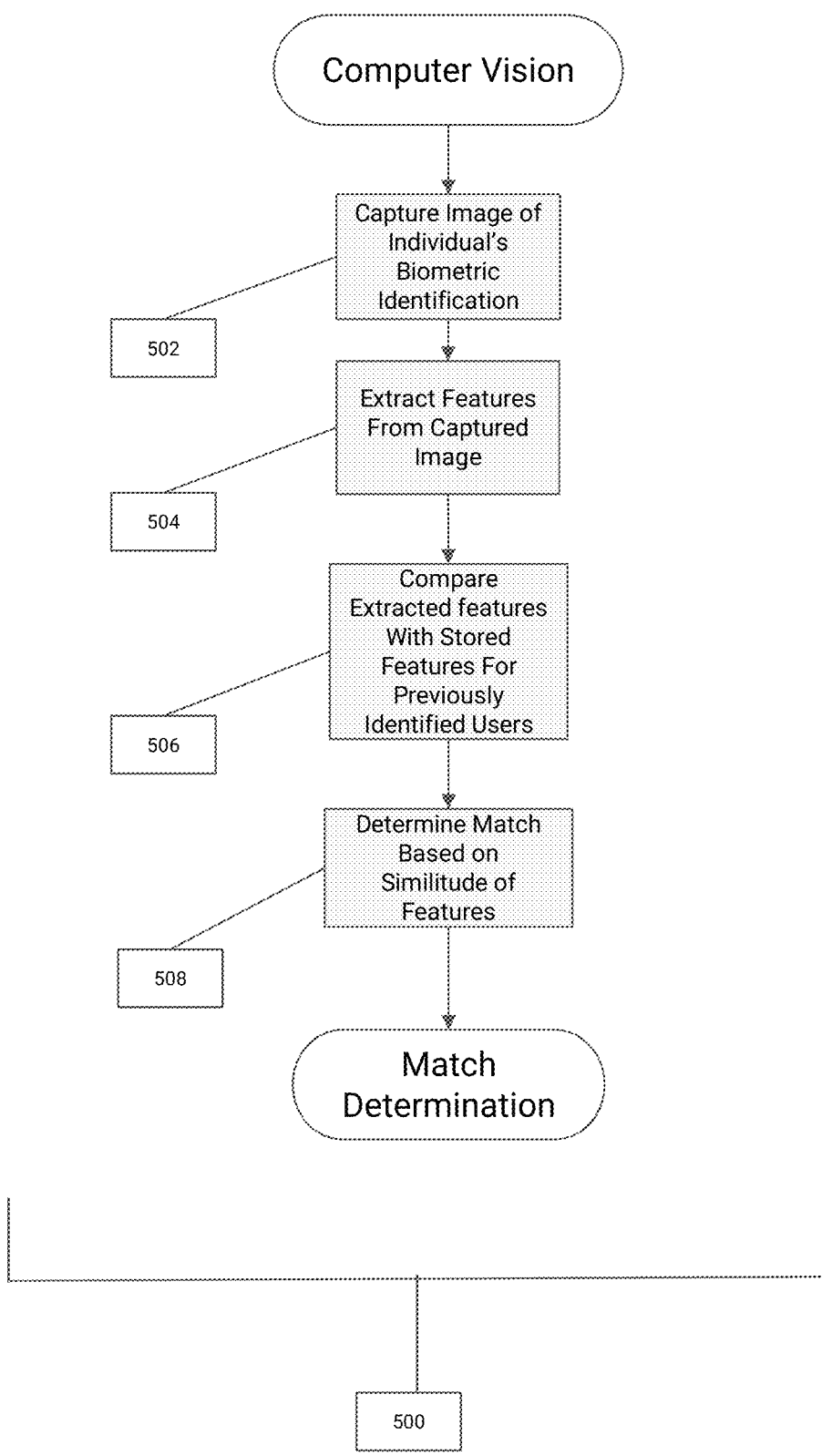
FIG. 5 depicts a flowchart illustrating steps that are performed in instance in which facial recognition is performed on an individual to determine whether the individual is granted access to the construction site.

FIG. 5 shows steps that are performed in a case of computer vision for 402, 404 and 406 of FIG. 4. The flowchart 500, regarding computer vision, begins with 502 in which an image of an individual is captured for biometric identification. This may be captured by a number of different types of image capture devices, including an intermittent video camera or other type of camera. In the case where an image of the face of an individual is captured, identifying features may be extracted from the captured image 504. In other words, unique facial features that help to identify an individual are extracted from the image. The image may be filtered and/or normalized. The features are then compared with the stored features for identified individuals 506, determination is made whether there is enough similarity for there to be a match 508.

Figure 6:
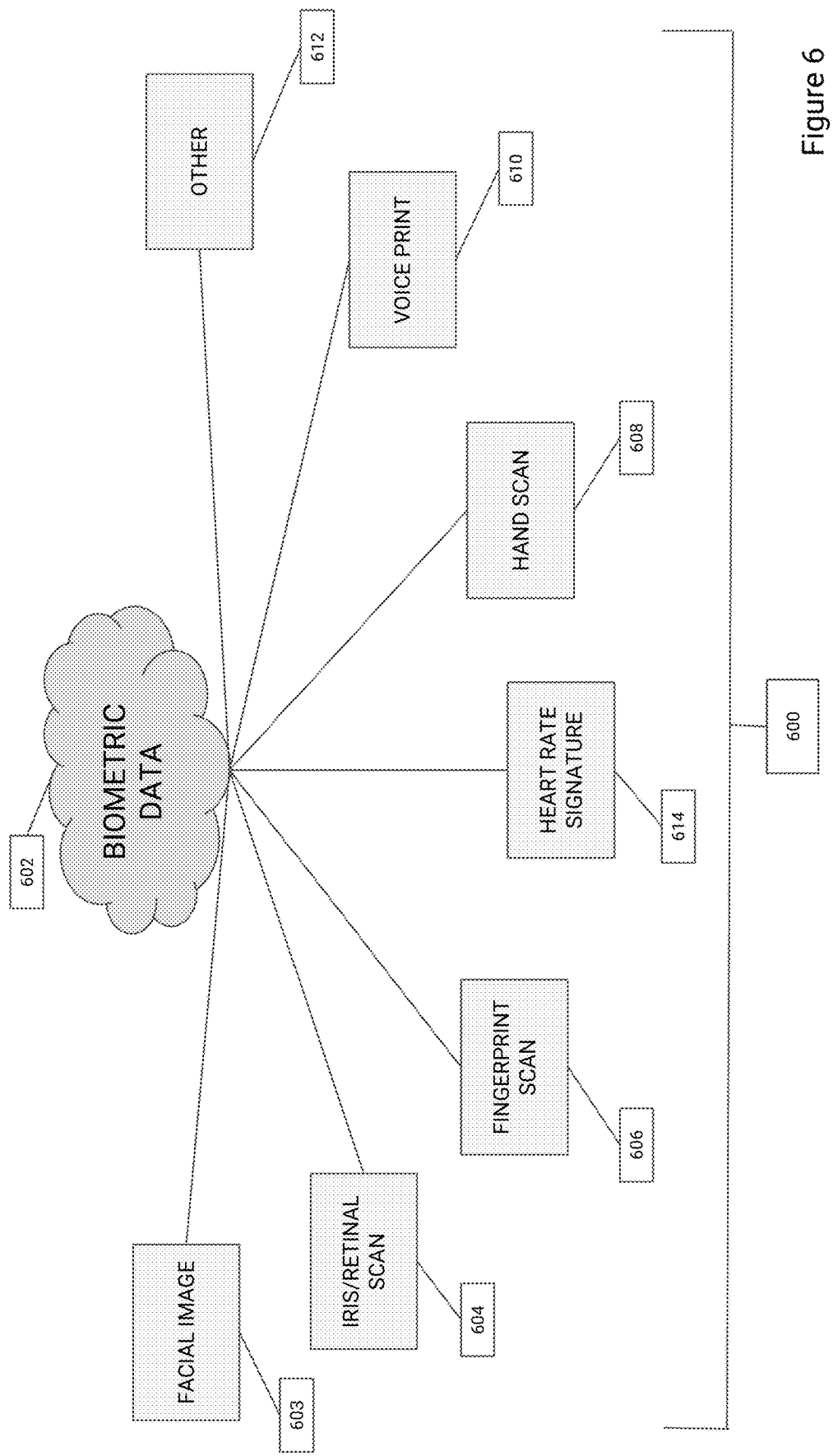
FIG. 6 depicts various types of biometric data that may be gathered and used by the site supervisor system.

FIG. 6 shows a diagram 600 that illustrates various types of biometric data 602 that may be obtained by biometric-based identification devices at the construction site to attempt to identify individuals. Biometric data may include facial recognition 603, an iris/retinal scan 604, a fingerprint scan 608, a hand scan 608, a voice print 610 or heart rate signature 614. It should be noted that other types 612 of biometric data may also be used in exemplary embodiments to help identify individuals uniquely. Also, an individual may be required to provide multiple types of biometric data in some instances.

Figure 7:
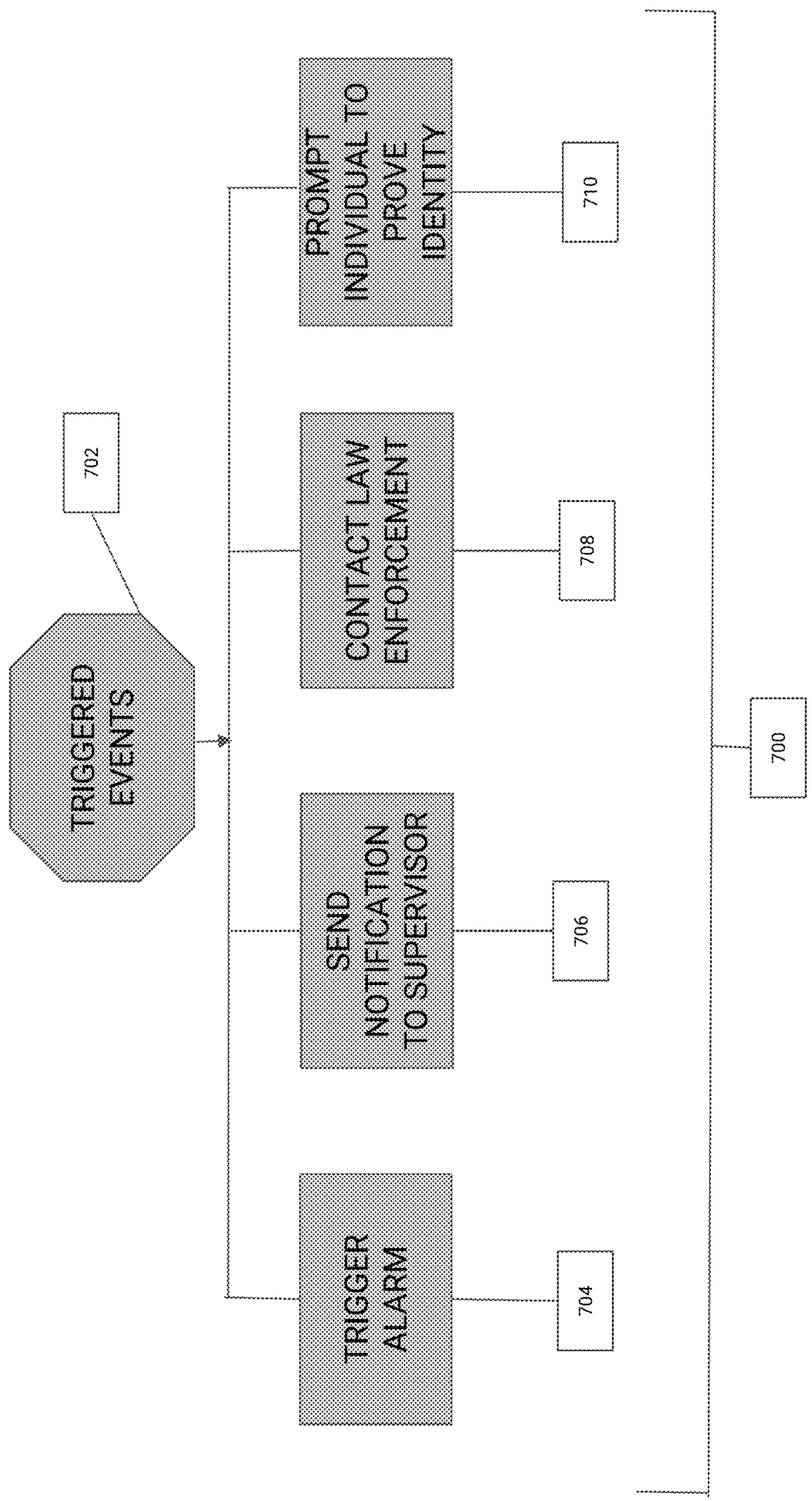
FIG. 7 illustrates a number of types of events that may be triggered when the identity of an individual cannot be determined.

As was mentioned above, when an individual attempts to access the construction site and is not granted access, certain events may be triggered (see 410 in FIG. 4). FIG. 7 shows a diagram 700 that provides an example of different types of triggered events 702. One type of triggered event is an alarm 704. This alarm may include visual alerts, audio alerts or a combination thereof. The alarm may be a silent alarm to individuals. Another event that may be triggered is to send notifications to a supervisor for the construction site 706. The supervisor may, for example, receive an email, a text, phone call or other notification that someone is trying to access the site that is not permitted. A triggered event 702 may also include the contacting of law enforcement or a member of a security service indicating that an unauthorized party has tried to access the construction site. Lastly, a triggered event 702 may include prompting the individual to produce proper identifying information to an official at the site or to a scanning device at the kiosk 100.

Figure 8:
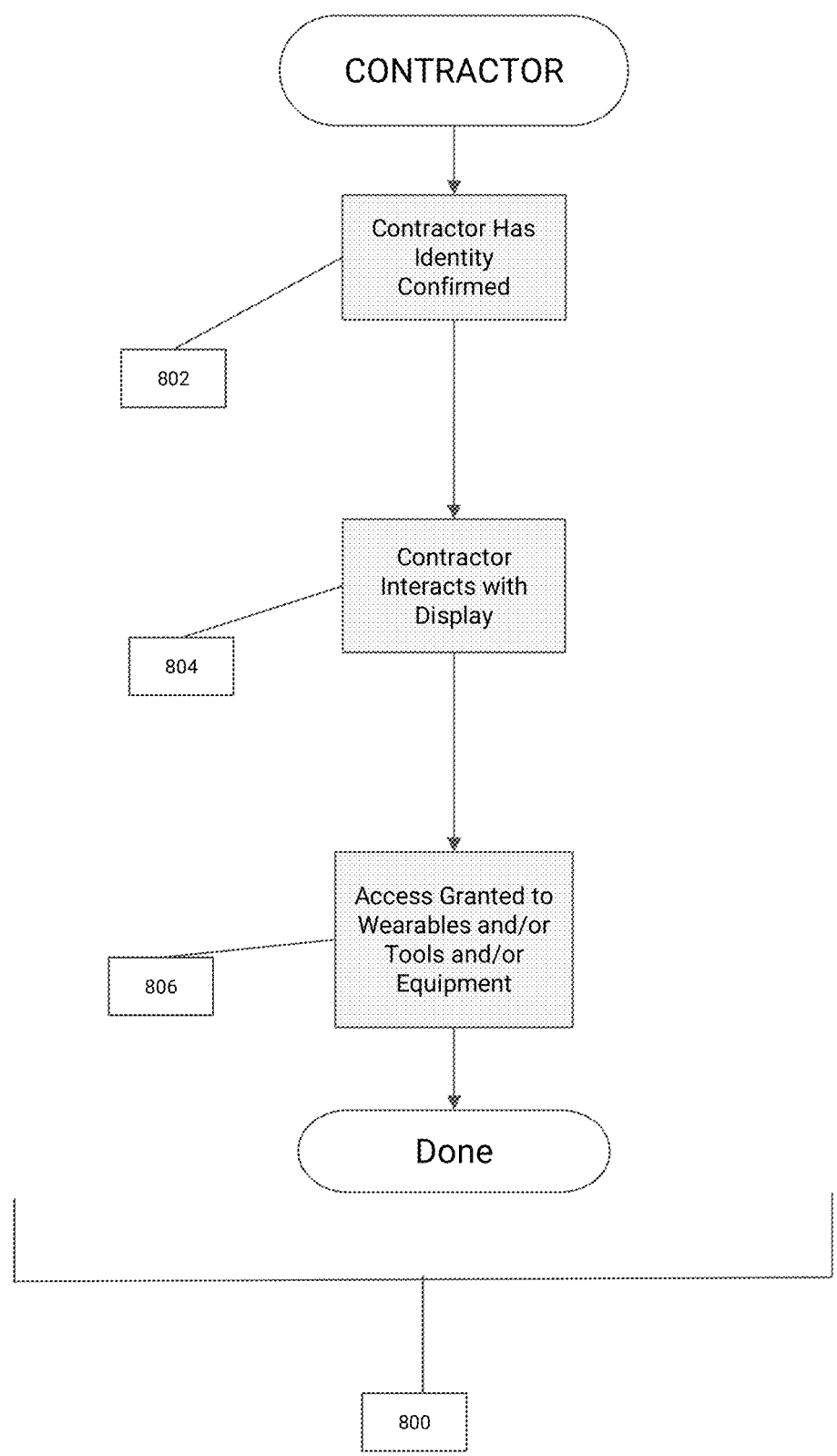
FIG. 8 depicts a flowchart illustrating the steps that may be performed upon a contractor entering the construction site.

As was discussed above, individuals entering the construction site must subject themselves to collection of their biometric data to confirm their identity before they are granted access to the site. One type of individual is a contractor. FIG. 8 shows a flowchart of the steps that may be performed to ensure that the contractors gain access to the appropriate items once they have been granted access to the construction site. As shown in the flowchart 800 of FIG. 8, initially the contractor has their identity confirmed, as has been discussed above 802. The system may offer an alternative touchscreen option to place a call to the appropriate party should the software fail to verify an otherwise authorized individual. The contractor may be prompted to interact with the display, such as the touchscreen 106B (FIG. 1) to register and to indicate whether they seek certain items. For example, with the user interface of FIG. 2B, the contractor may activate the contractor activatable element 228. Access is then granted to wearables and/or tools and/or equipment 806. The wearables, the tools and/or equipment may be stored in sheds or in other secured locations under the control of smart locks that may be controlled by the computing system of the site supervisor system.

Figure 9:
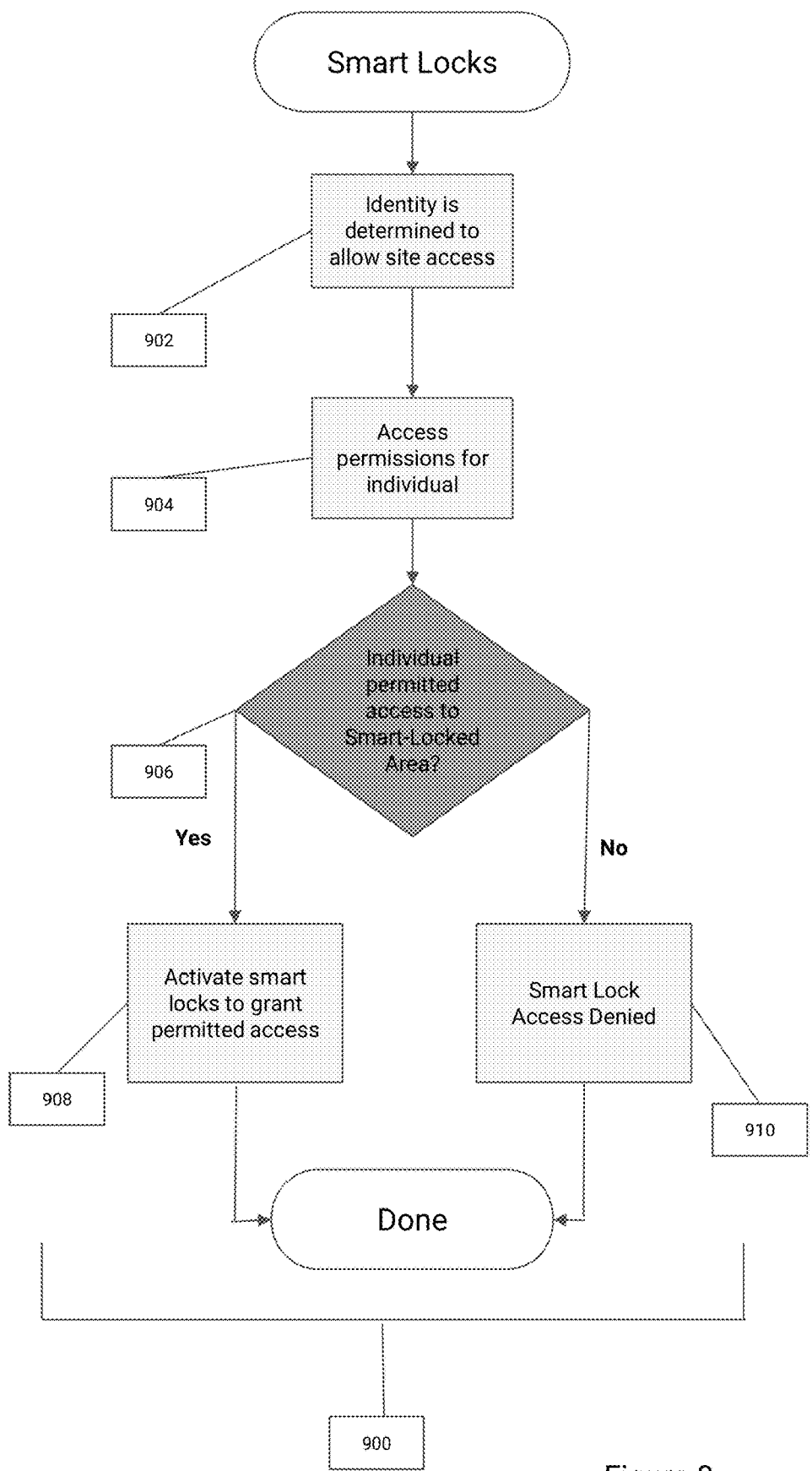
FIG. 9 depicts a flowchart illustrating steps that may be performed in controlling smart locks at the construction site by the site supervisor system.

FIG. 9 provides a flowchart 900 of the steps that may be performed relative to smart locks at the construction site. The individual, such as a contractor, has his/her identity determined and has access to the construction site 902. The system may offer an alternative touchscreen option to place a call to the appropriate party should the software fail to verify an otherwise authorized individual. The permissions stored for the individual are accessed 904. A determination is made whether the individual is granted access to a smart locked area 906. If the individual has permission to access the area 908, the smart locks may be activated to unlock the area, such as where wearables, tools or equipment are located. Before the individual can use the tools/equipment, the individual may first be required to wear some of the wearables and to scan the tools or equipment to indicate that they will be using the tools or equipment. If the individual lacks the proper permissions to access the area, then access to the area is denied 910, such as by keeping the smart locks locked.

As was discussed above, the wearables may be used to track the location of individuals on the construction site and to gather biometric data. In addition, the wearables may serve as a mechanism for communicating with the individual or communicating information regarding individuals to parties with certain responsibilities over the constructions site.

Figure 10:
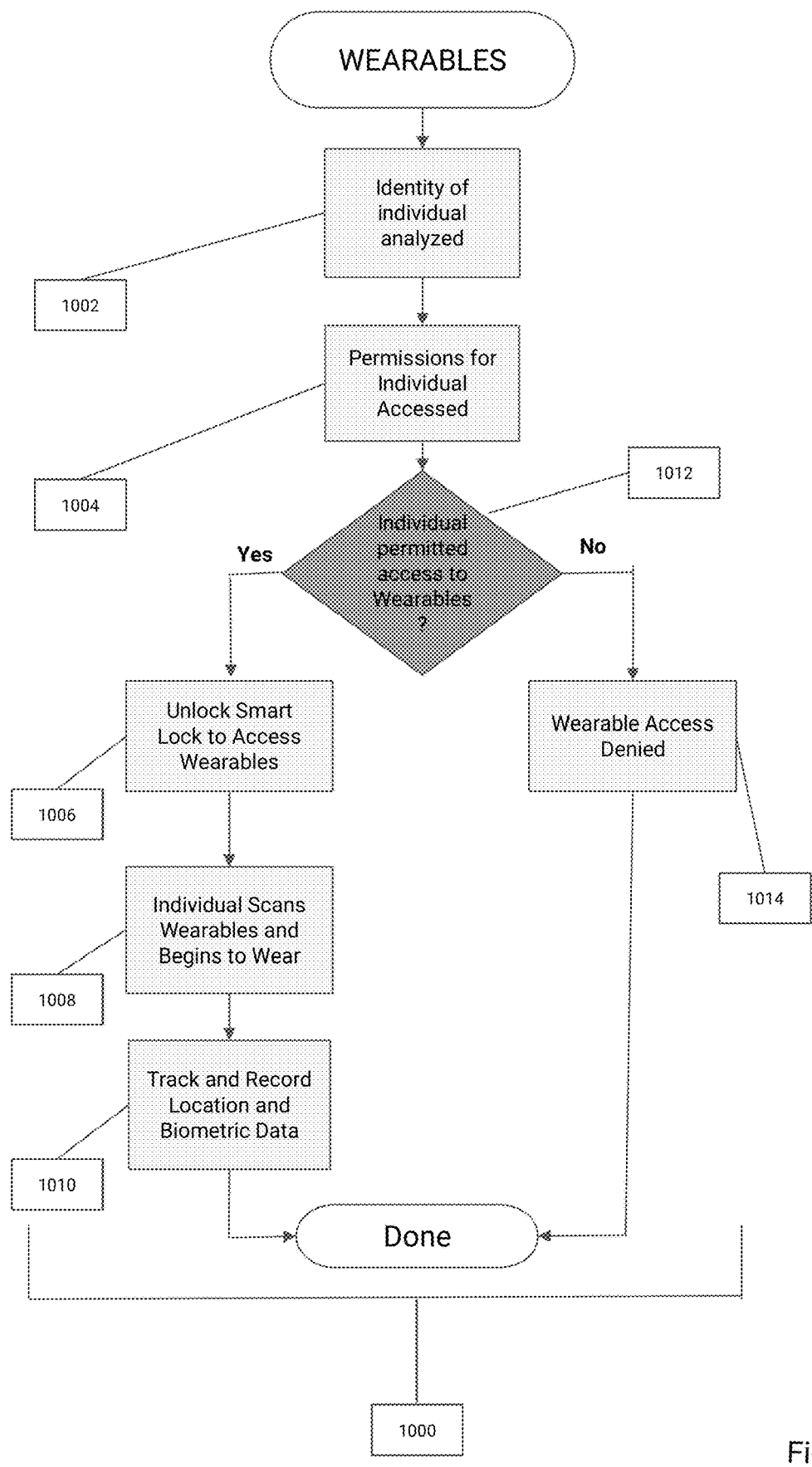
FIG. 10 depicts a flowchart illustrating the steps that may be performed to obtain wearables at a construction site.

FIG. 10 contains a flowchart 1000 illustrating the steps that may be performed to obtain the wearables. The wearables may include safety gear, such as hard hats, gloves, goggles, vests and the like, as well as wearables for tracking and obtaining biometric data. The identity of the individual is confirmed 1002, and the permissions for the individual are accessed 1004 and a determination is made based on the permissions if the individual should be granted access to the wearables 1012. The system may offer an alternative touchscreen option to place a call to the appropriate party should the software fail to verify an otherwise authorized individual. If it is determined that the individual should be granted access, the smart lock for the storage location of the wearables is unlocked 1006. The individual may then be prompted to scan information regarding the wearables so as to register the wearables and associate the wearables with the individual 1008. The site supervisor system may require that an individual wear certain safety equipment in the form of wearables. The site supervisor system may record what wearable the individual scans. The site supervisor system tracks and records the location and biometric data gathered by the wearables 1010. The wearables may include smart vests, bracelets, badges, sensors and the like that provide location information and biometric data, such as heart rate, body temperature, blood pressure breathing rate, gyroscopic informatic and/or other information.

These wearables assist the site supervisor system in tracking the location of individuals of the construction site. These wearables also help to track the biometric data of individuals. The biometric data may be helpful in identifying that an individual is experiencing an accident, a health event or is idle. The biometric data is stored so that a record of the biometric data can be kept. If in 1005, it is determined based on the permissions that the individual should not be granted access, then access to the wearables is denied 1014.

Figure 11:
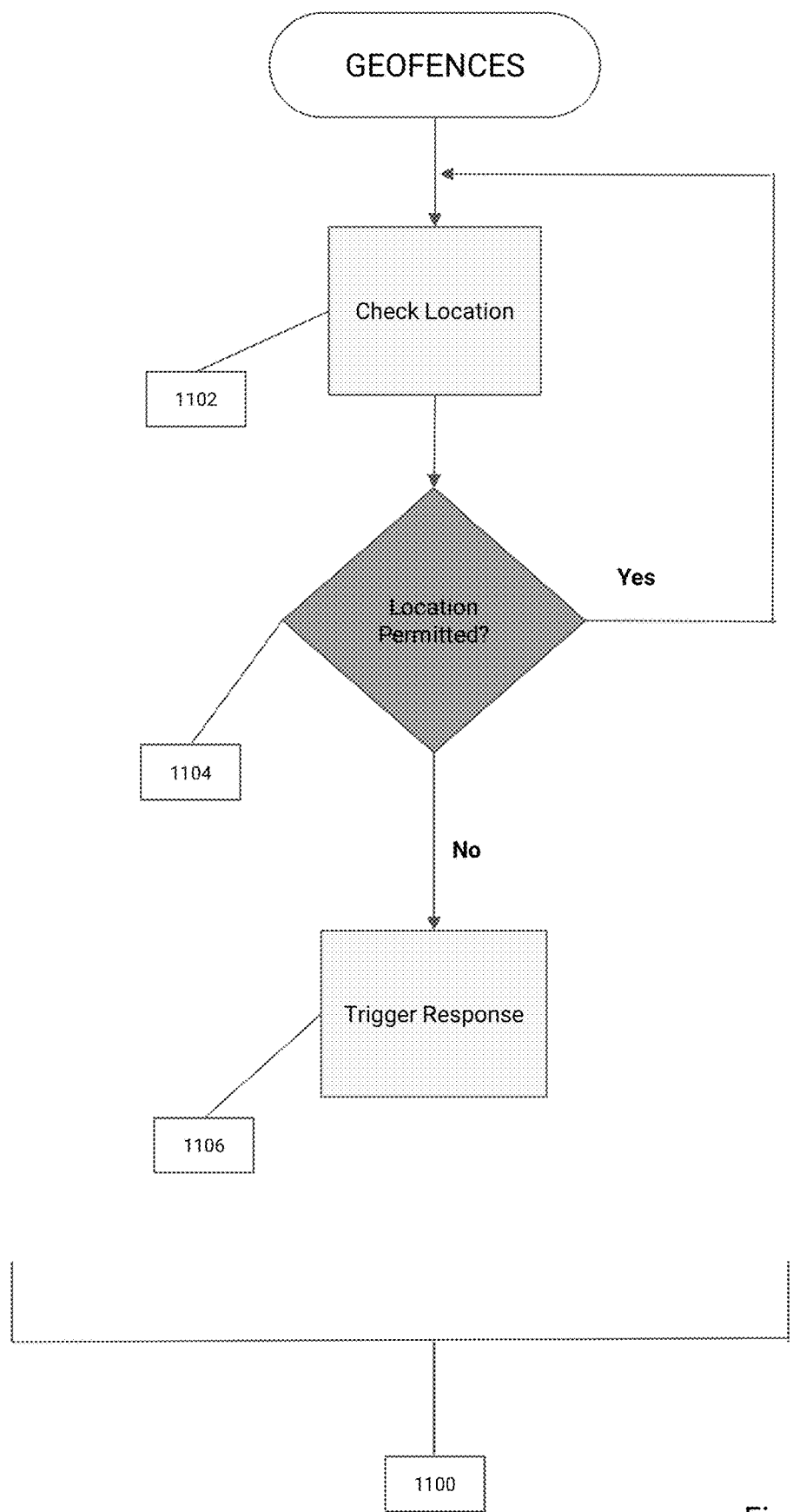
FIG. 11 depicts a flowchart showing steps that may be performed during geofencing at the construction site.
Figure 12A:
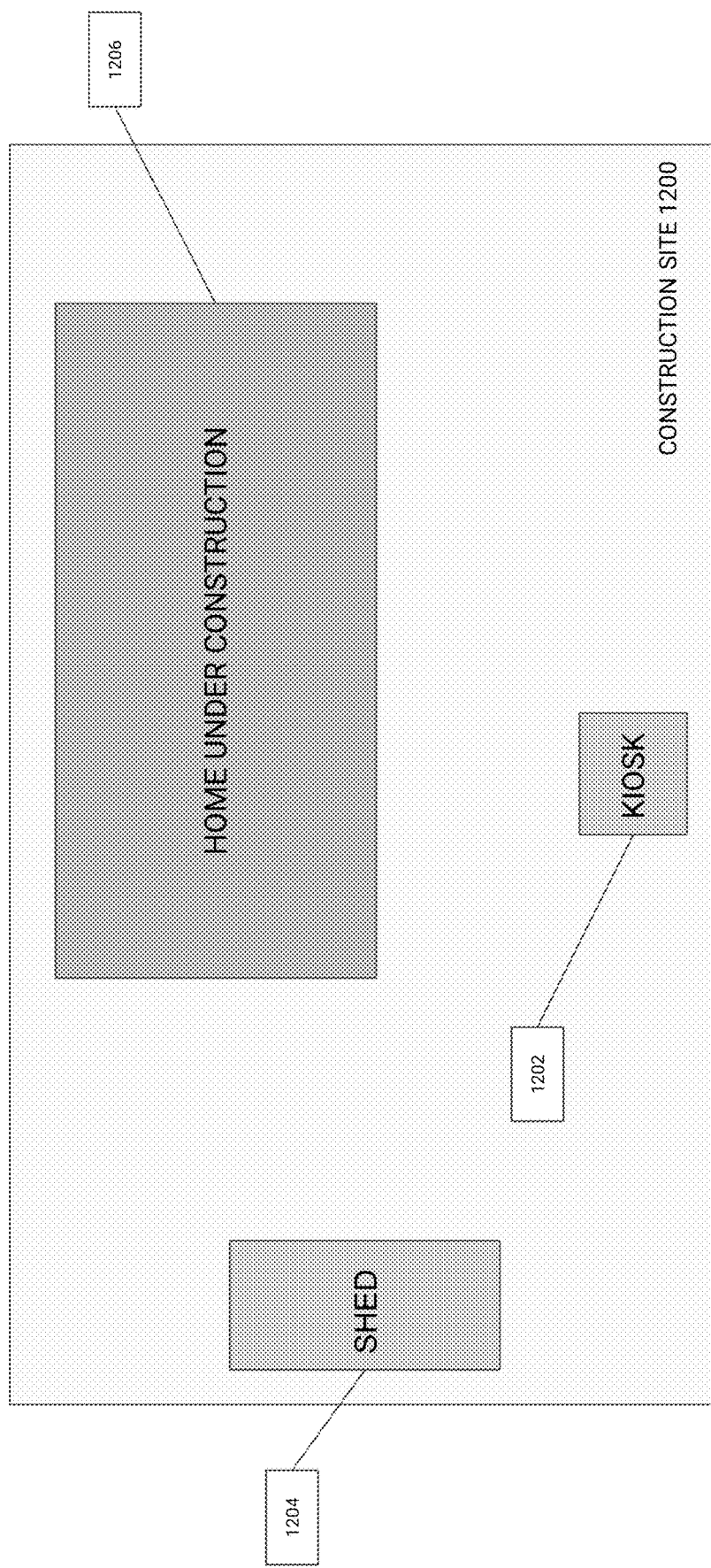
FIG. 12A shows a plan view illustrating components of an illustrative construction site.

The use of the wearable to track location helps to facilitate geofencing in exemplary embodiments. The geofencing enables the site supervisor system to track and limit access to locations of individuals at the construction site. The construction site may be partitioned into areas where different permission rights are given for the various areas. For example, a plumber may be given access to the kitchen and the bathrooms of a project under construction but may be prohibited from being in the living room or the roof. As shown in FIG. 11, a flowchart 1100 shows some of the steps performed in secrecy. The process begins with the checking of the location 1102 of an individual. A determination is made in 1104 whether the individual is permitted to be at that location. If the individual is not permitted to be at that location, a response is triggered 1106. To help illustrate an example of geofencing, FIG. 12A shows an illustrative construction site 1200. The construction site 1200 may include a kiosk 1202 for the site supervisor system as well as a shed 1204. The shed 1204 may hold tools, equipment, wearables and/or materials. The construction site 1200 may also include a home or other building project that is under construction 1206.

Figure 12B:
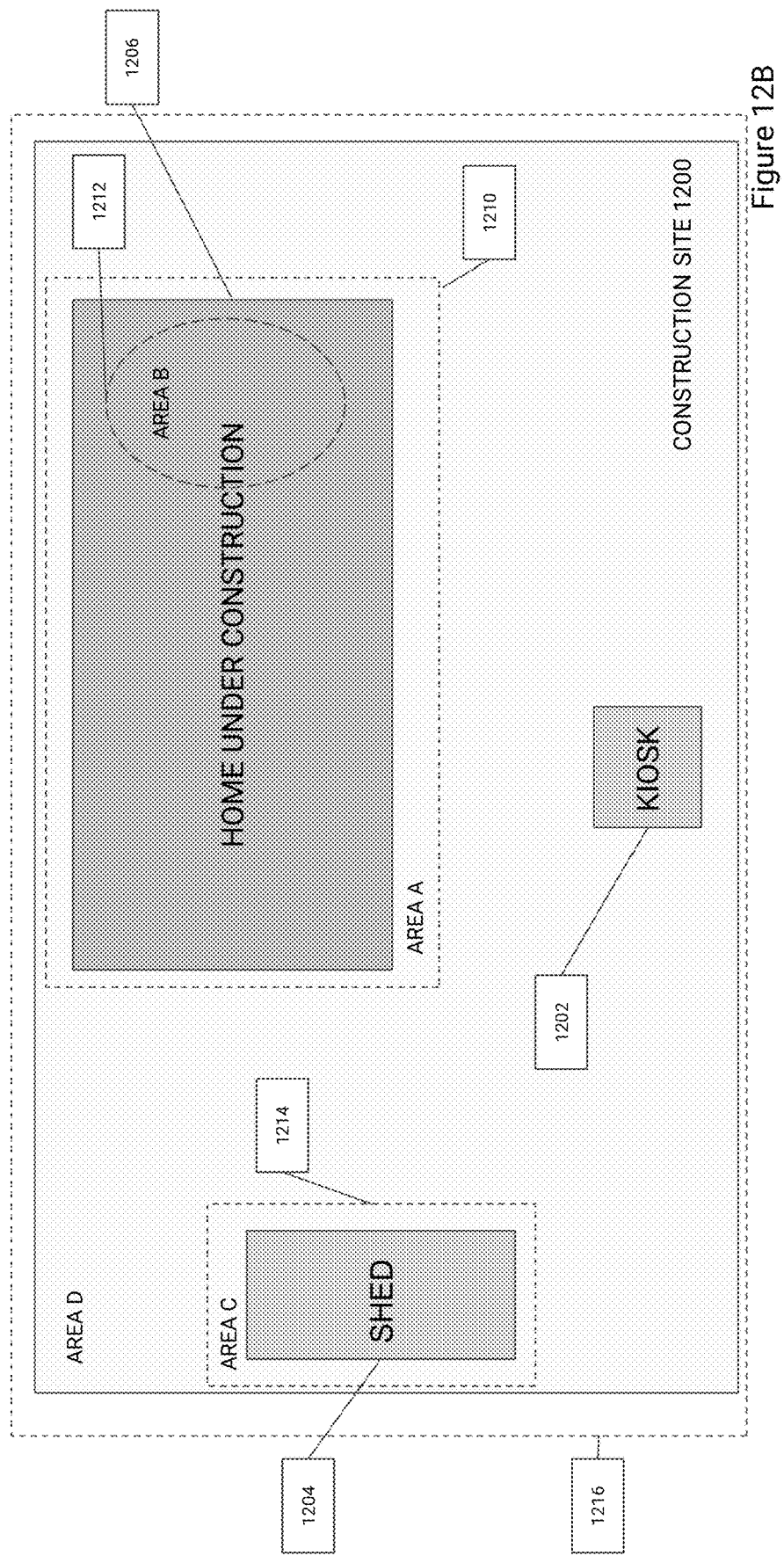
FIG. 12B depicts illustrative geofencing areas in the example construction site of FIG. 12A.

FIG. 12B shows an example of different areas that may be established for geofencing at the construction site 1200. Area A shown by the phantom boundary 1210 may include the entirety of the project that is under construction 1206. Area B 1212 may be a portion of the project, such as the kitchen. Area C 1214 may be the shed and area D 1216 may be the entire construction site. Individuals may have access to none of these areas or to a subset of these areas, including all of the areas.

Figure 13:
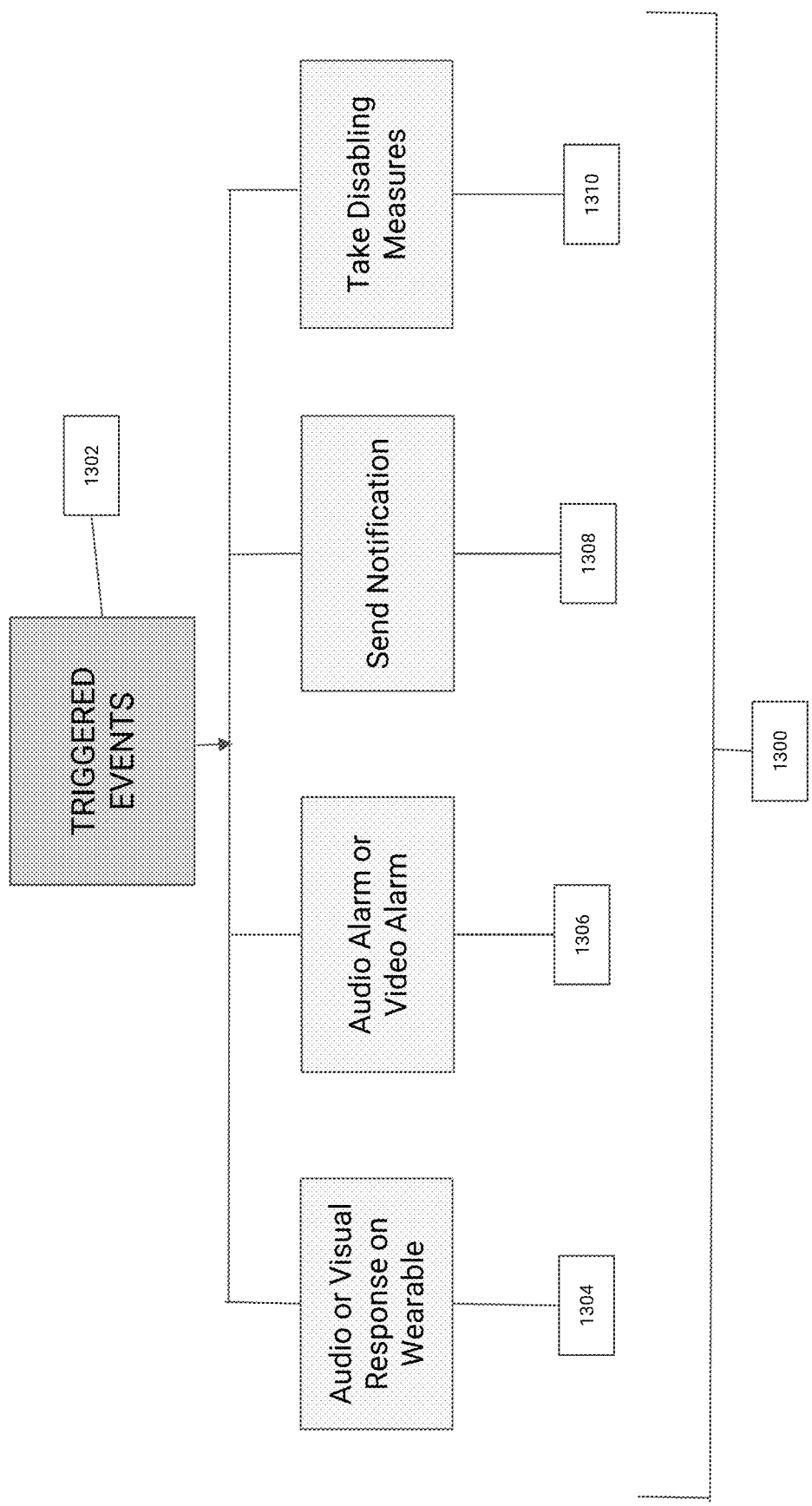
FIG. 13 illustrates possible responses that may be taken when an individual is outside a permitted area at the construction site.

FIG. 13 is a diagram 1300 that shows exemplary responses 1302 that may be taken in response to a party being in areas of the construction site they are not permitted to be in. One option is for an audio or video response to occur on a wearable 1304. For example, a smart vest may include lights that may flash or may be continuously illuminated in response to a party being outside the permitted areas on the construction site. An audio alarm may also be triggered. Another option is for an audio alarm or a video alarm to be triggered at the construction site rather than on a wearable 1306. This alarm indicates that an individual is in a non-permitted area. A further option is to send a notification, such as a phone call, a text message, an email message or other notification to a supervisor on or off the construction site 1308. Yet another option is to take disabling measures relative to the individual 1310. The disabling measures could entail triggering locks or disabling equipment by shutting off power or the like.

Figure 14:
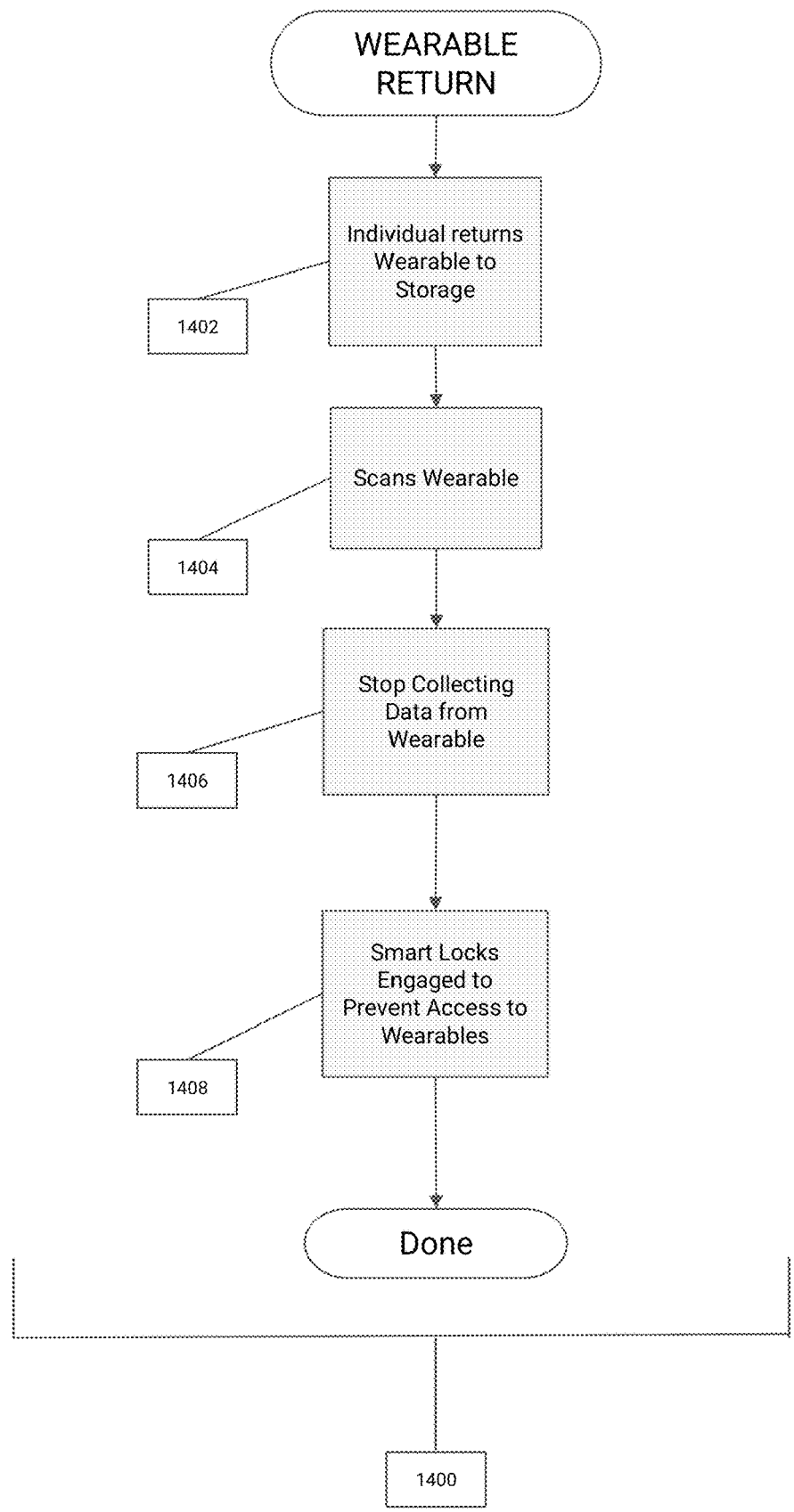
FIG. 14 depicts a flowchart illustrating the steps that may be performed in returning a wearable at the construction site.

Once individuals at the construction site are finished with their assigned tasks, they may be required to return the wearables. FIG. 14 is a flowchart 1400 illustrating the steps that may be performed to return such wearables. In particular, the individual returns the wearable to the storage location 1402. The individual then scans the wearable to indicate that the individual is no longer wearing the wearable 1404. The site supervisor system may then stop collecting data from the wearable 1406. After a sufficient period of time, the smart lock may be engaged to prevent access to the wearable by the individual 1408.

As was discussed above, the site supervisor system may control access to utilities, such as electrical power, at the construction site. This may be a significant issue in conventional construction sites where a great deal of power may be used by parties without paying for the power or parties may use power during non-working hours.

Figure 15:
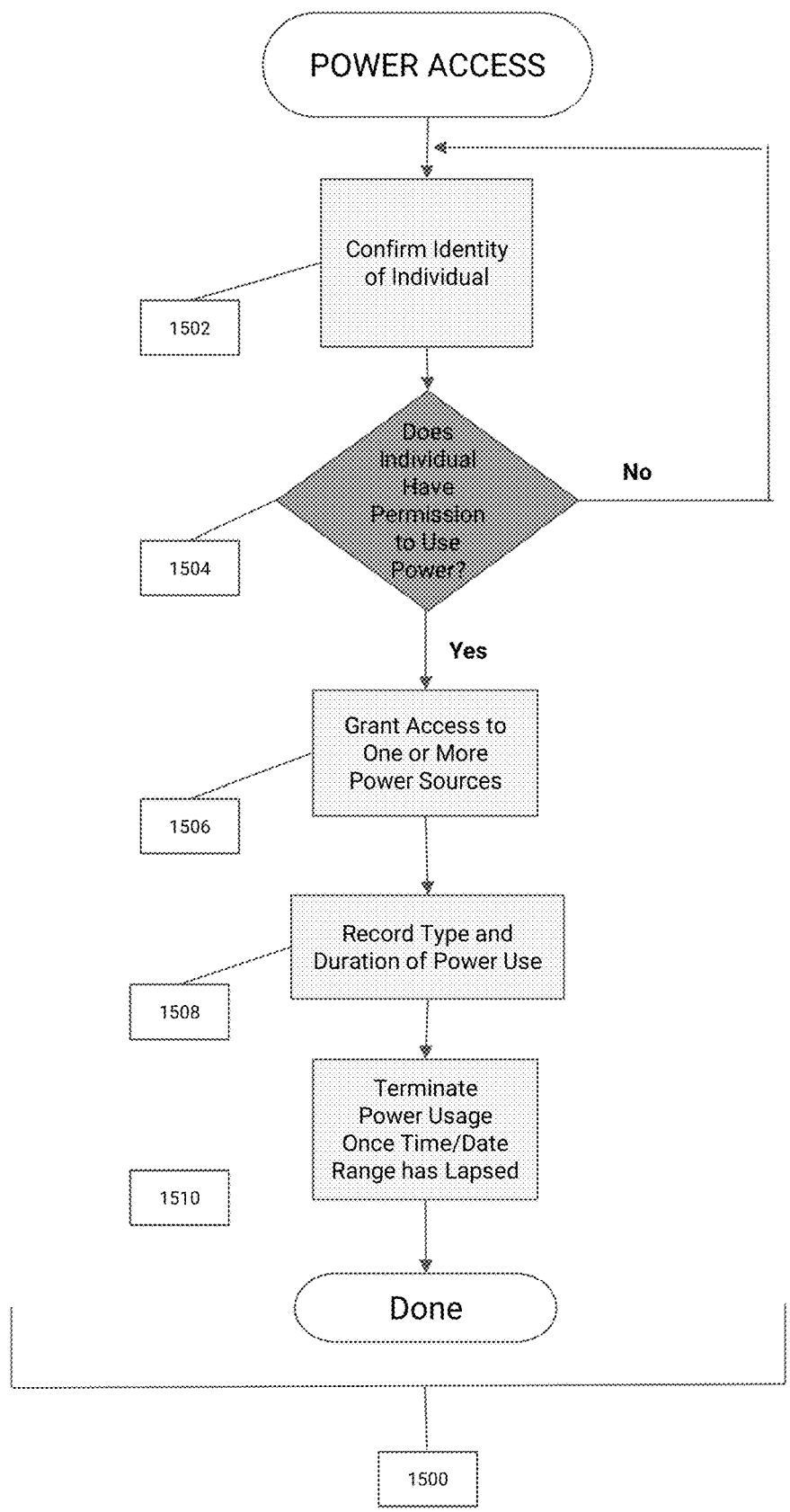
FIG. 15 depicts a flowchart illustrating the steps that may be performed to grant or deny access to a power source at the construction site.

FIG. 15 shows a flowchart 1500 of steps that are performed to regulate power access by the site supervisor system at a construction site. Initially, the system confirms the identity of the individual as has been discussed above 1502. Permissions are accessed to determine the permissions relating to the use of power that are granted to the individual 1504. In the case where the individual has sufficient permissions, access to one or more power sources is granted 1506. The kiosk may include switches or other mechanisms for turning power on or off under programmatic control. The system records the type and duration of power use 1508. The power outlets may provide power at different voltages, and this information is recorded along with the duration and quantity of power that is consumed. Once the time/date range has lapsed, power usage to the individual is terminated 1510. In some instances, the power usage may be terminated after a given period of time has elapsed in which the power has not been utilized.

These steps may also be applied to other utilities, such as water, natural gas and access to computational resources, like the Internet.

As was mentioned above, the wearables provide biometric data regarding individuals of the construction site. The site supervisor system may monitor this information and prompt action under certain circumstances.

Figure 16A:
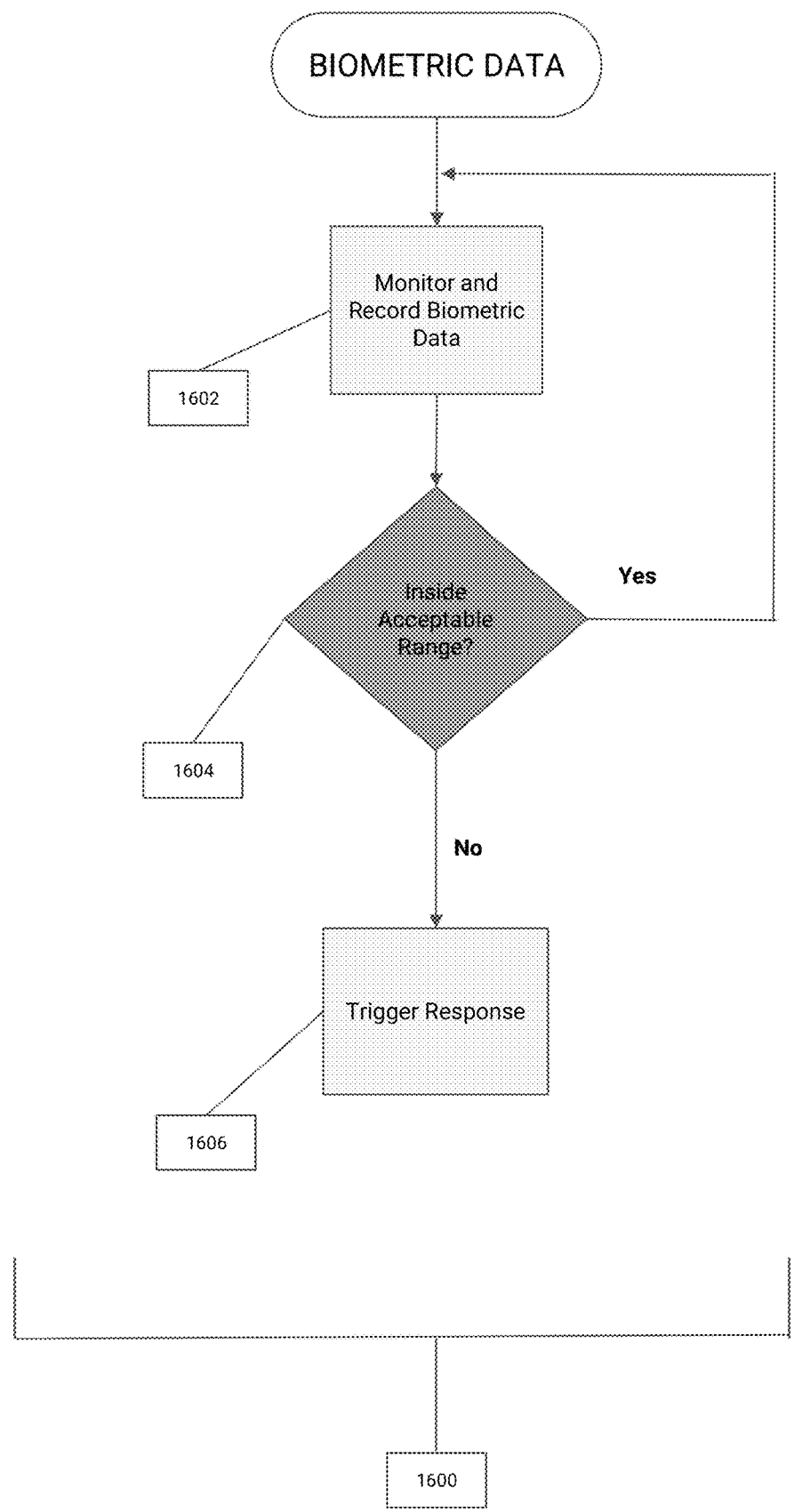
FIG. 16A depicts a flowchart illustrating steps that may be performed in the tracking of biometric data at the construction site.

FIG. 16A provides a flowchart 1600 of steps that may be performed relative to the monitoring of such biometric data. The biometric data for each of the individuals on the construction site that are wearing wearables is monitored and recorded 1602. The system may check to see whether the biometric data is outside of acceptable ranges. For example, suppose that the biometric data indicates that the heart rate of an individual has exceeded 200 beats per minute or that the heartrate of an individual has dropped to a dangerously low rate. This would be the type of event that would trigger a response. Other suitable types of events include if the body temperature of the individual becomes excessive or too low or if gyroscopic data indicates a fall. Similarly, blood pressure readings may be gathered and compared to acceptable ranges. Breathing rates may be monitored as well. It is determined whether the most recent rating is outside of an acceptable range 1604. If it is, a response may be triggered 1606.

Figure 16B:
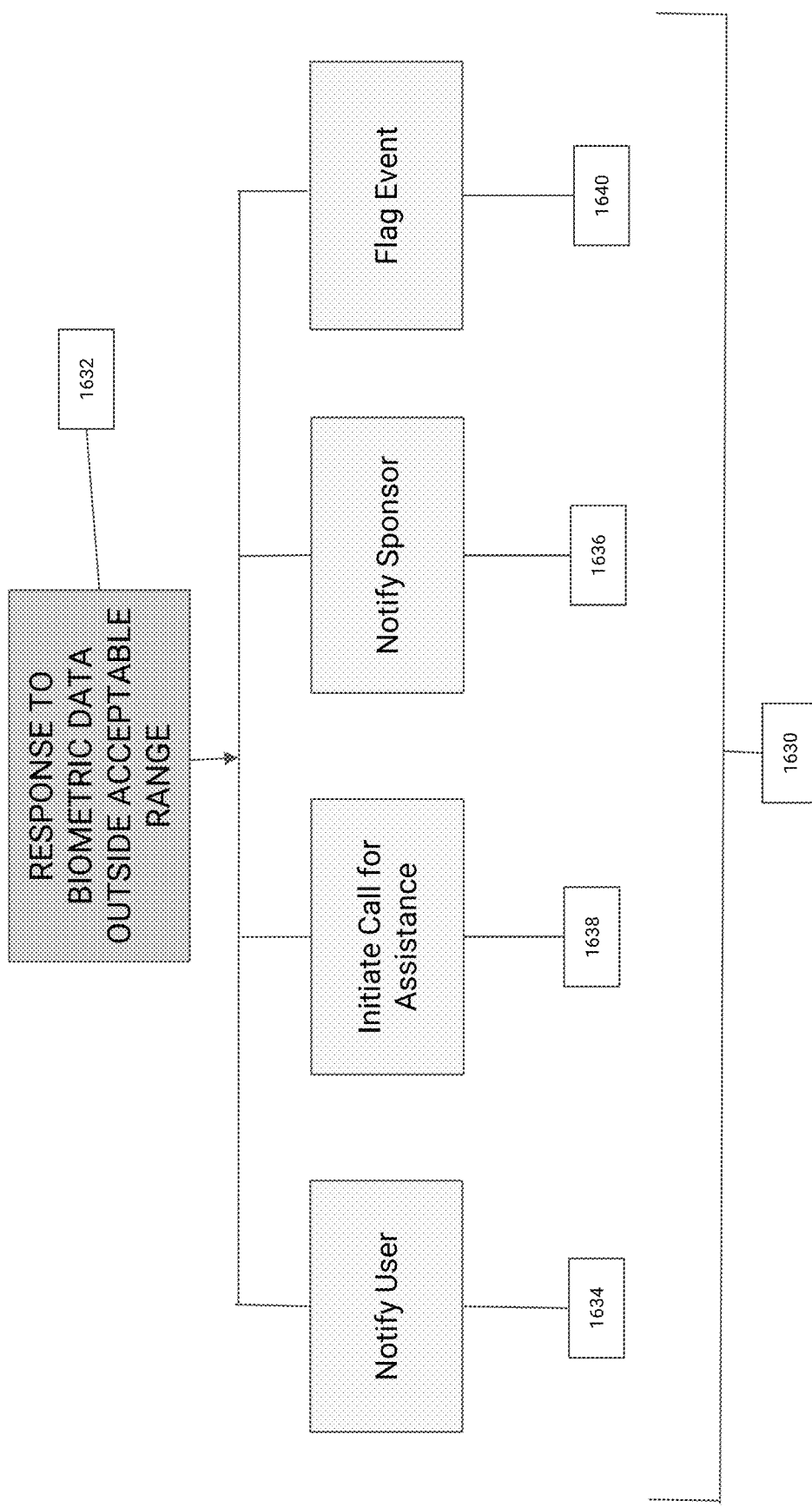
FIG. 16B illustrates possible responses when tracked biometric data for an individual lies outside of an acceptable range.

FIG. 16B shows an example of some types of responses may be triggered in diagram 1630. When a monitored biometric data is outside an acceptable range 1632, one option is to notify the wearer of the wearable that the biometric data is outside a range 1634. For instance, a party might be notified that their heart rate is too high or that their body temperature is too high. The individual should take a break, sit in the shade, and/or drink some water, or take other appropriate action. The response may also include flagging an event in the stored data 1640.

This is a way of flagging abnormalities where the data is outside the acceptable range and may be used as a reference point for later investigation. A further option is to notify a supervisor 1636. This may inform the supervisor that an event has happened or that an individual is at risk. Moreover, the information may indicate to a supervisor that the individual is not working. A further option is to initiate a call for assistance, such as calling an ambulance or contacting law enforcement officials 1638.

As was mentioned above, the site supervisor system, enables tracking of equipment, tools and materials at the construction site.

Figure 17:
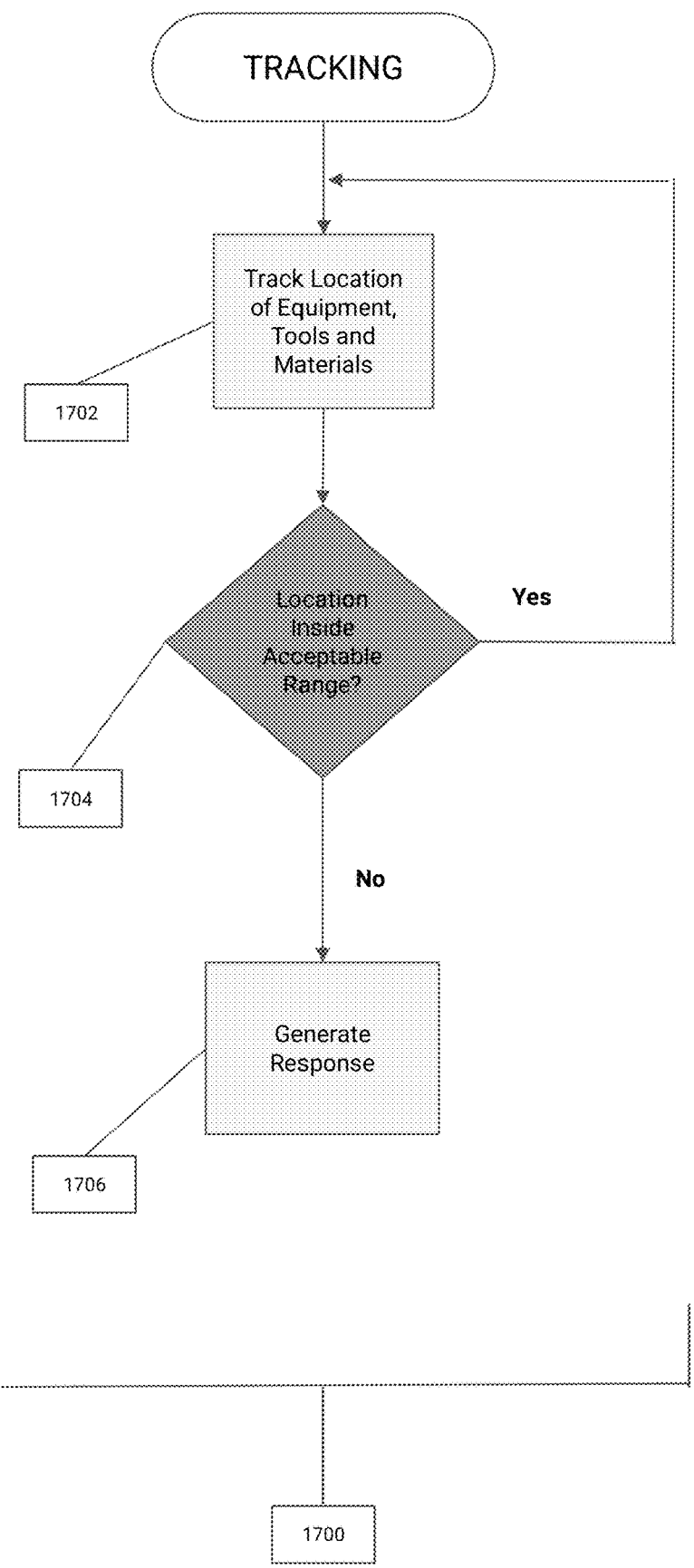
FIG. 17 depicts a flowchart illustrating steps that may be performed in tracking equipment, tools or materials at the construction site.

FIG. 17 shows a flowchart of steps that may be performed relative to such tracking. On an ongoing basis, the site supervisor system may track the location of equipment, tools or materials at the construction site 1702. The system can check whether the location of the equipment, tools or materials is acceptable or not 1704. For example, suppose that lumber has been delivered to the construction site and the location of the lumber indicates that the lumber is removed from the construction site. This would be problematic and would warrant a response. If the location is not acceptable as checked in 1704, a response is generated in 1706.

Figure 18:
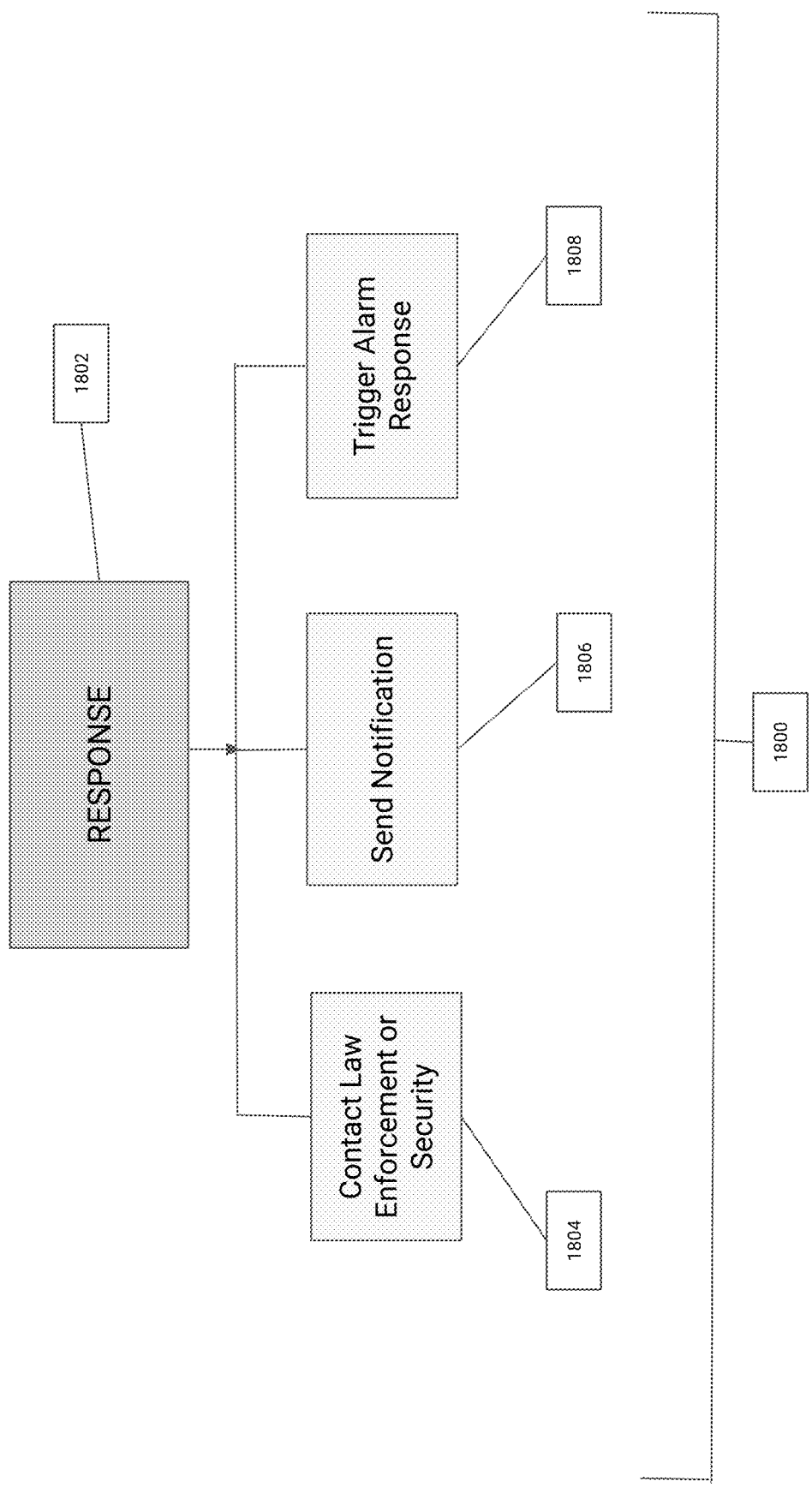
FIG. 18 illustrates possible responses when the equipment, tools and materials are tracked as being outside of an acceptable location.
Figure 19:
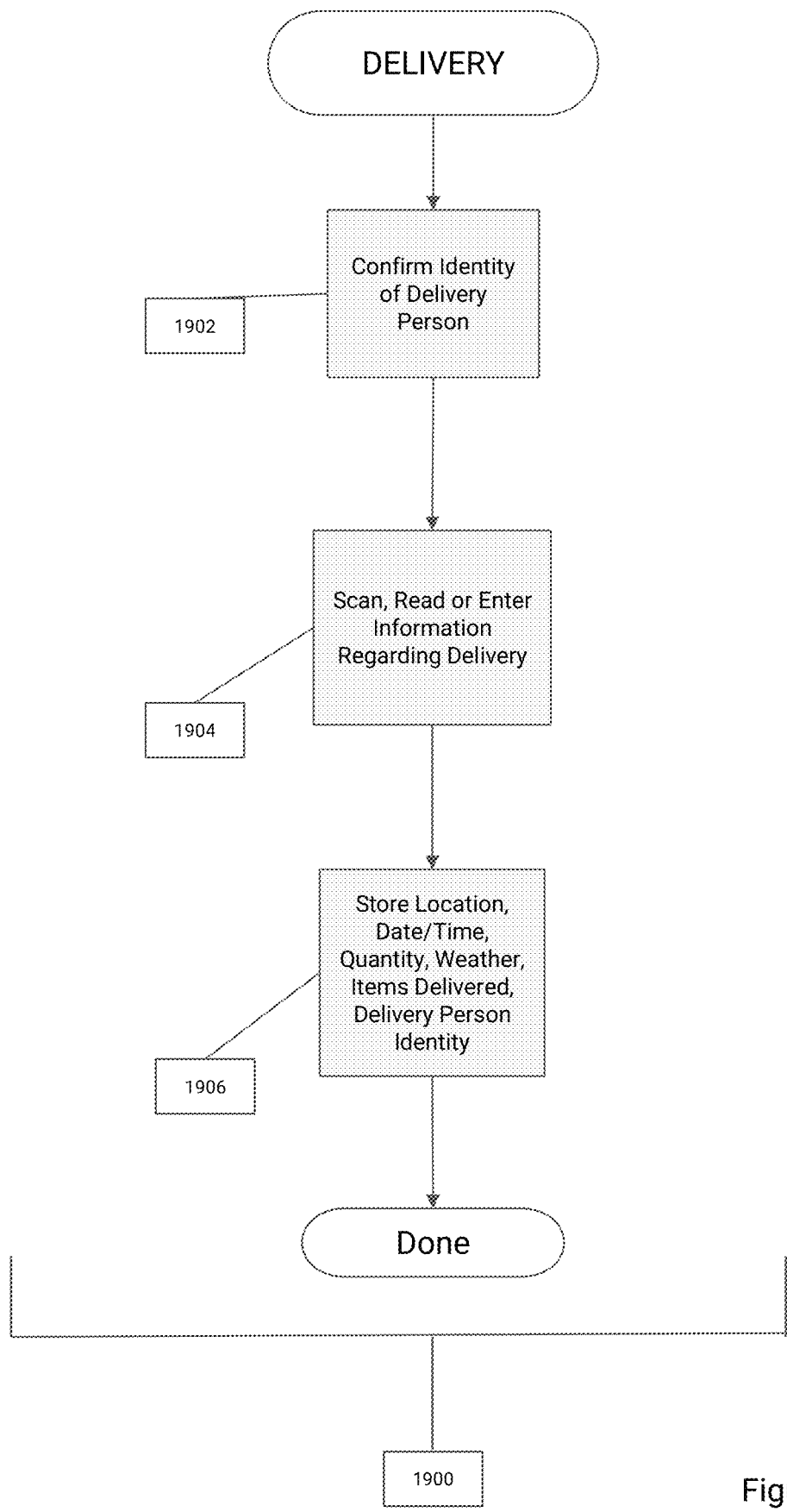
FIG. 19 depicts a flowchart illustrating steps that may be performed at the time of delivery of items to the construction site.

FIG. 18 shows a diagram 1800 illustrating different types of responses 1802 that may be generated in response to the equipment, tools or material in an unacceptable location. One type of response is to contact law enforcement or security 1804. In many cases the location of the tools, equipment and materials may indicate that a theft is underway. Another type of response is to send a notification to supervisor or to other appropriate parties at the construction site 1806. A final type of response is to trigger an alarm response 1808, such as the sounding of an audio alarm or a video alarm.

As was mentioned above, the site supervisor system helps monitor and control deliveries to the construction site. FIG.

19 depicts a flowchart 1900 showing steps that may be performed in this regard regarding deliveries. Initially, the identity of the delivery person is confirmed to indicate that the delivery person is the appropriate party and is permitted access to the construction site 1902. For example, a serial number or other identification indicator may be scanned or read off the delivered items. In addition, information may be entered by the delivery person using the kiosk, such as by entering information via touchscreen 106A (FIG. 1A) 1904. The location of delivery, the date of delivery, the time of the delivery, the quantity of delivery, the identity of the delivery person and the weather may be recorded as part of the information that is kept regarding the delivery. This information may later be used to track and confirm deliveries as well as to understand the conditions when the delivery was made.

Figure 20:
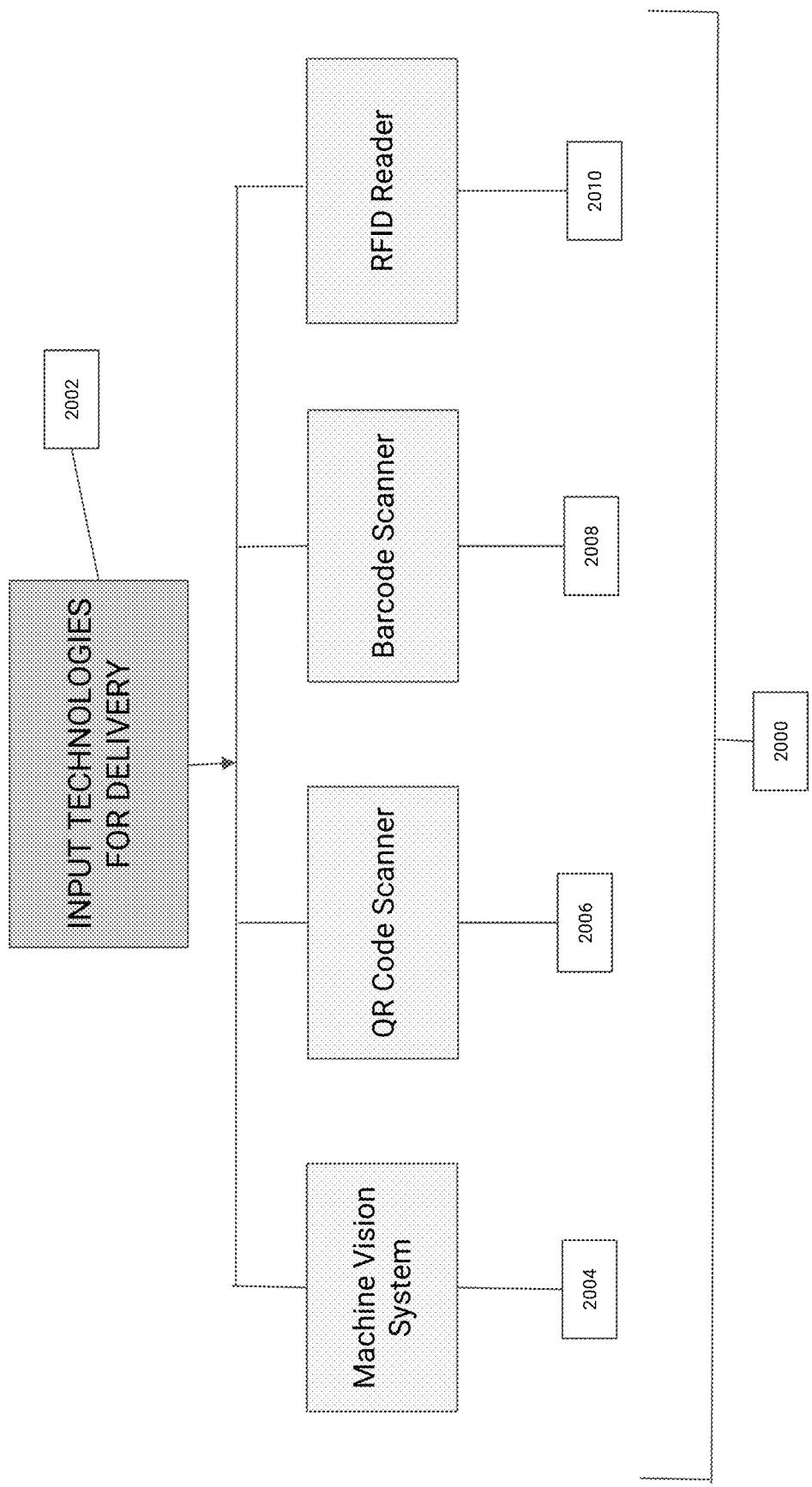
FIG. 20 illustrates different types of input technology that may be used for monitoring deliveries.

As was discussed above, the deliveries may utilize various scanning and reader technology. In FIG. 1A, a scanner 110A may be provided. Diagram 2000 in FIG. 20 illustrates different types of input technologies 2002 that may be used for assisting gathering information regarding deliveries. A machine vision system 2004 may be provided. The machine vision system 2004 may capture an image of the delivered items and process the image to determine the nature of the items that were delivered as well as the quantity of items. Moreover, the machine vision system may capture an archival image that may be indicative of the state of the items when they were delivered. A QR code scanner 2006 may be used where QR codes are on a delivered items or documentation. Similarly, a bar code scanner 2008 may be used where bar codes are on the items or on documentation delivered with the items. Still further, an RFID reader 2010 may be provided to gather information regarding the delivered items.

Figure 21:
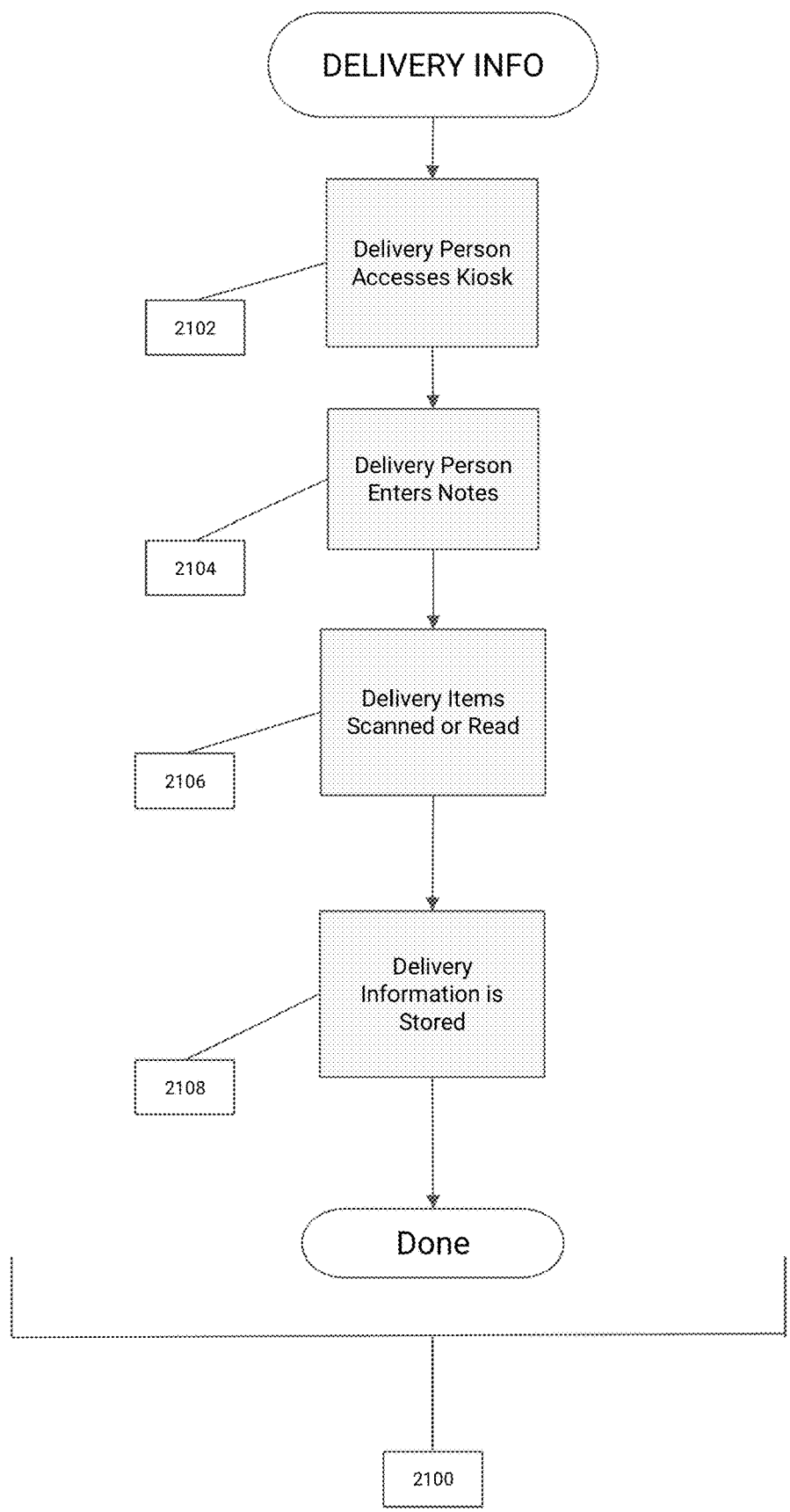
FIG. 21 depicts a flowchart illustrating steps that may be performed by a delivery person to enter delivery information into the site supervisor system.

As mentioned above, the delivery person may interface with kiosk via touchscreen 106A and 1900 to provide delivery information. Flowchart 2100 of FIG. 21 illustrates some of the steps that may be performed in such an instance. Initially, the delivery person may access the kiosk 2102. The delivery person may enter a note(s) regarding the delivery, such as what was delivered and the state of items that were delivered 2104. This information may be entered, such as through the touchscreen 106A (FIG. 1A). The delivered items are imaged, scanned or read 2106. As was mentioned above, a number of different types of input technology may be used on the delivered items. The result is that delivery information is then stored in records that may be accessed subsequently 2108.

Figure 22:
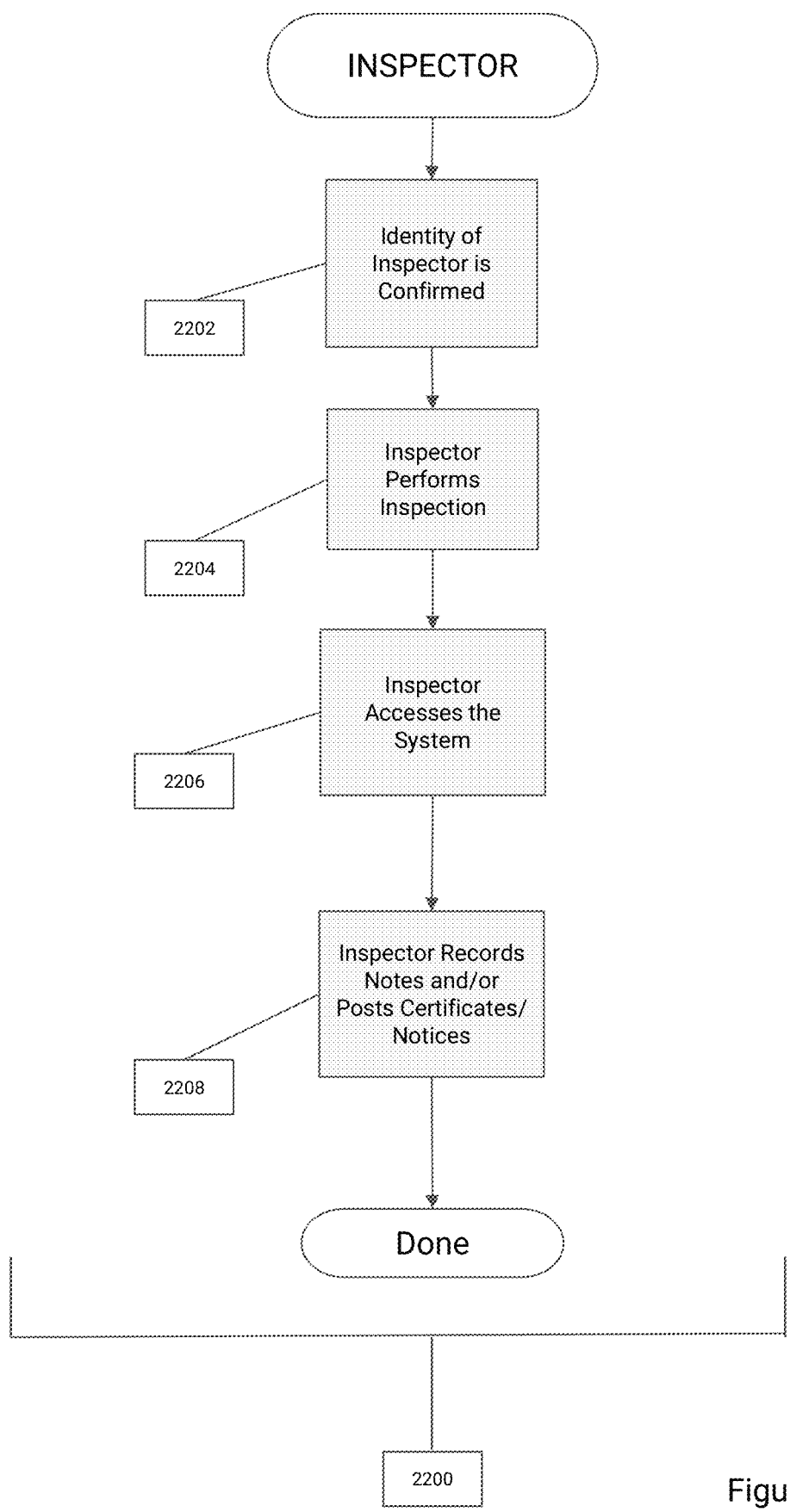
FIG. 22 depicts a flowchart illustrating steps that may be performed by an inspector to enter information into the site supervisor system.
Figure 23:
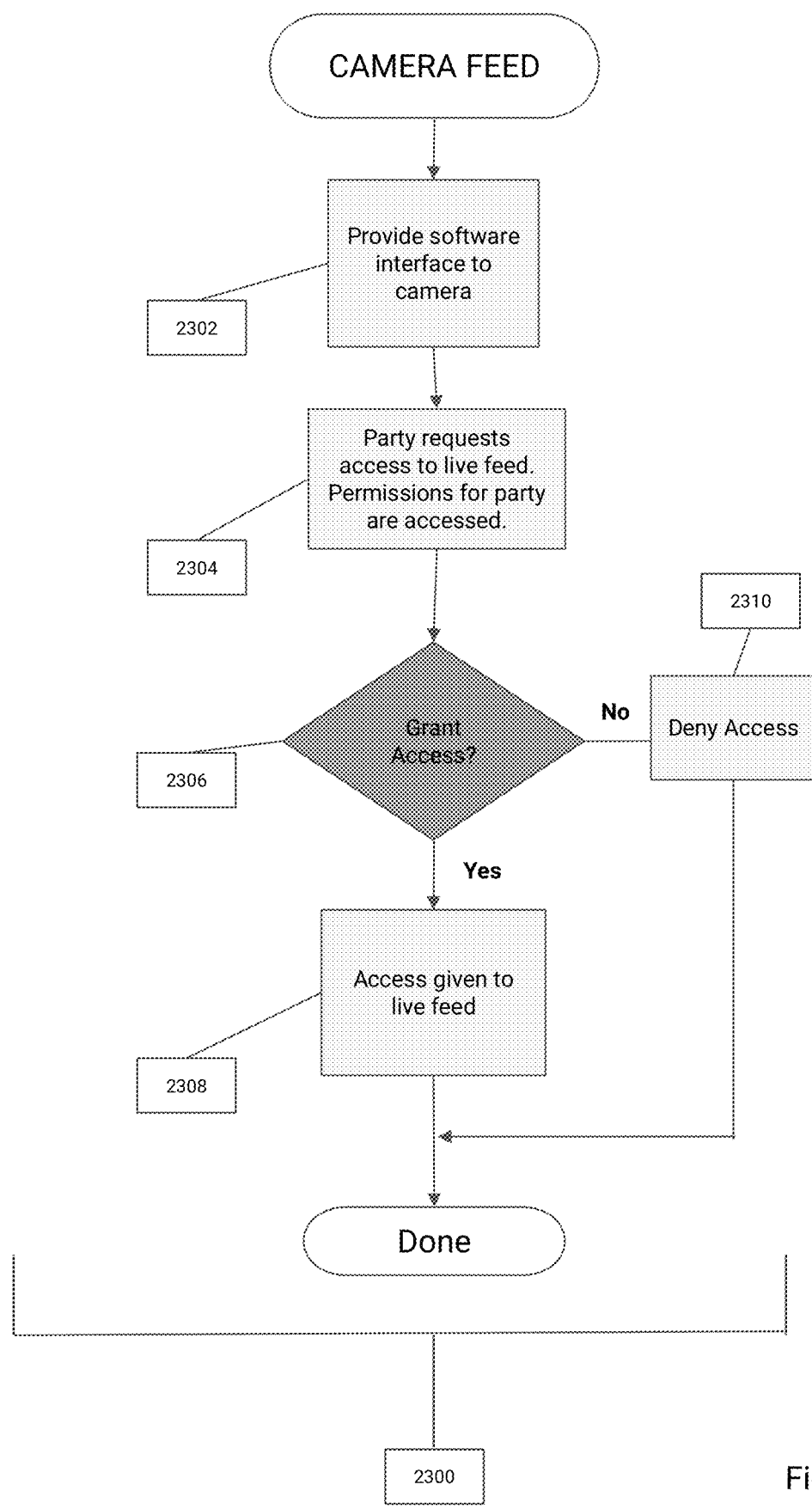
FIG. 23 depicts a flowchart of steps that may be performed regarding an external party requesting access to an image capture device of the site supervisor system.

The inspector may interface with the site supervisor system FIG. 22 includes a flowchart 2200 illustrating steps that may be performed in such an interaction. Initially, the identity of the inspector may be confirmed using the biometric data 2202 or manually using the touchscreen on the kiosk. The inspector then performs the inspection of the appropriate portion of the construction site 2204. The inspector then accesses the system, such as through the kiosk 2006. The inspector then may record notes and/or post certificates or notices at the kiosk 2208. Additionally, the inspector may use technology available via the kiosk such as OCR scanner or the like to capture appropriate information the inspector may have written during fulfillment of the reason for being on the site. The site supervisor system may include a still camera(s) or a video camera(s) that is part of the system. FIG. 23 provides a flowchart 2300 relating to such access. A software interface to the camera may be provided to enable authorized external parties to gain access to the camera 2302. A party requests access to the camera via the interface over the network 2304. For example, a bank official may wish to view the construction site before authorizing release of funds or before granting a loan. A determination is made whether the party is permitted access by accessing permissions 2306. The site supervisor system gathers a great deal of information over the course of time. At least a portion of this information is persistently stored to compile a record of activities at the construction site. This record can be useful to prove activities after the fact. The activities that are recorded may drive workflow and scheduling at the construction site to improve efficiency. If the party is permitted access, access is given to the party so that they may receive a captured image or video data 2308. Otherwise, access to the camera by the party is denied 2310.

Figure 24:
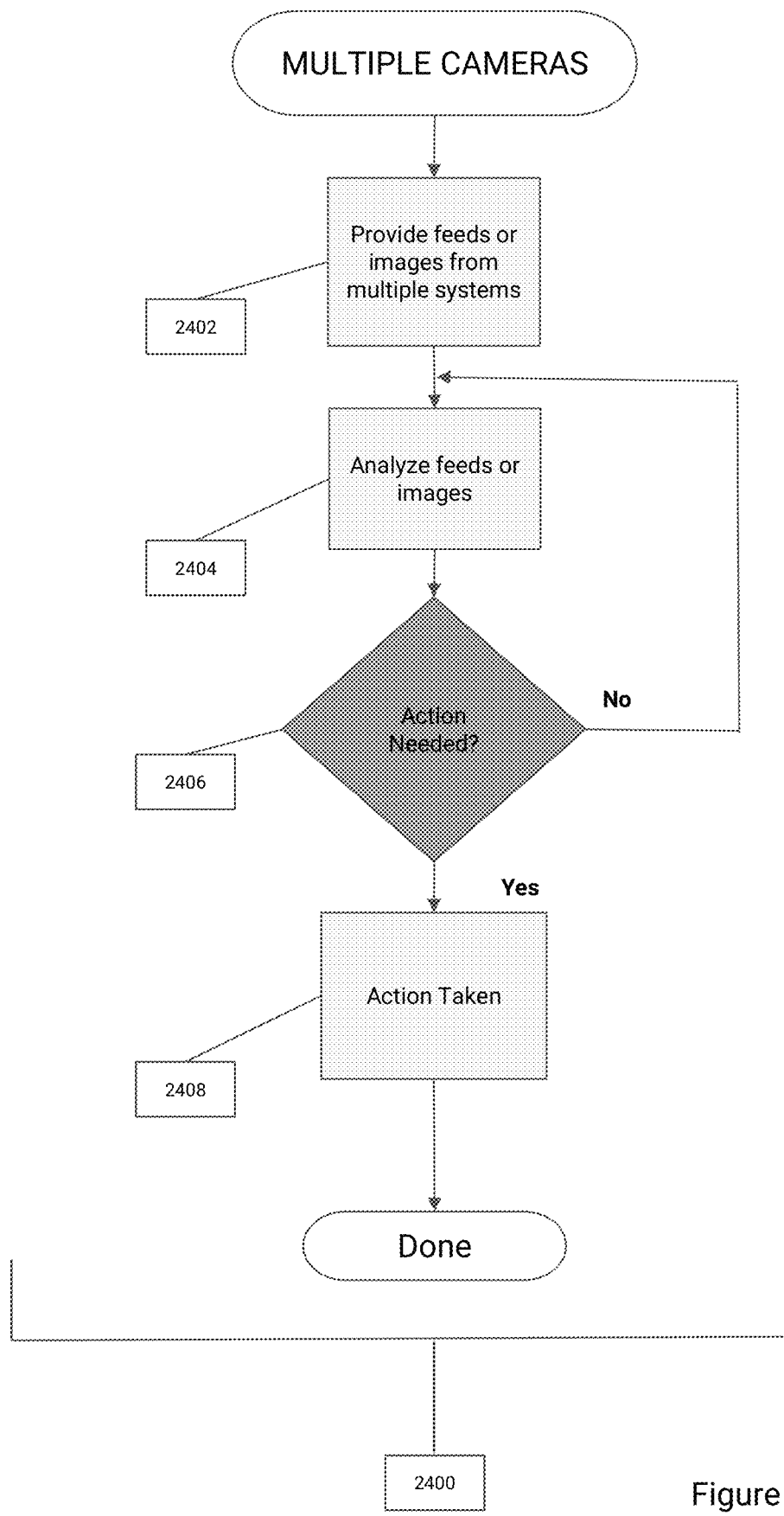
FIG. 24 depicts a flowchart of steps that relating to using multiple image capture devices from adjacent site supervisor systems.

Site supervisor systems at adjacent locations may be used in conjunction with each other. FIG. 24 shows a flowchart 2400 of steps that may be performed when image capture devices, such as still cameras or video cameras, from multiple adjacently situated site supervisor systems are used in conjunction in one example application. In particular, video feeds or still images may be obtained from the image capture devices from multiple systems 2402. The video feeds or images may then be processed, such as by the cluster described above, using software such as motion detection software, thermal image analysis or other image analysis software to identify activity that may warrant a response 2404. For example, the analysis may identify a large living object moving near the periphery of multiple construction sites. The system may then, based on the analysis, determine if action needs to be taken 2406. If an action is needed, then the action is taken 2408. If not, the capture of the images or videos may continue. Examples of actions include sounding an alarm, contacting law enforcement, contacting a security team or the like.

Figure 25:
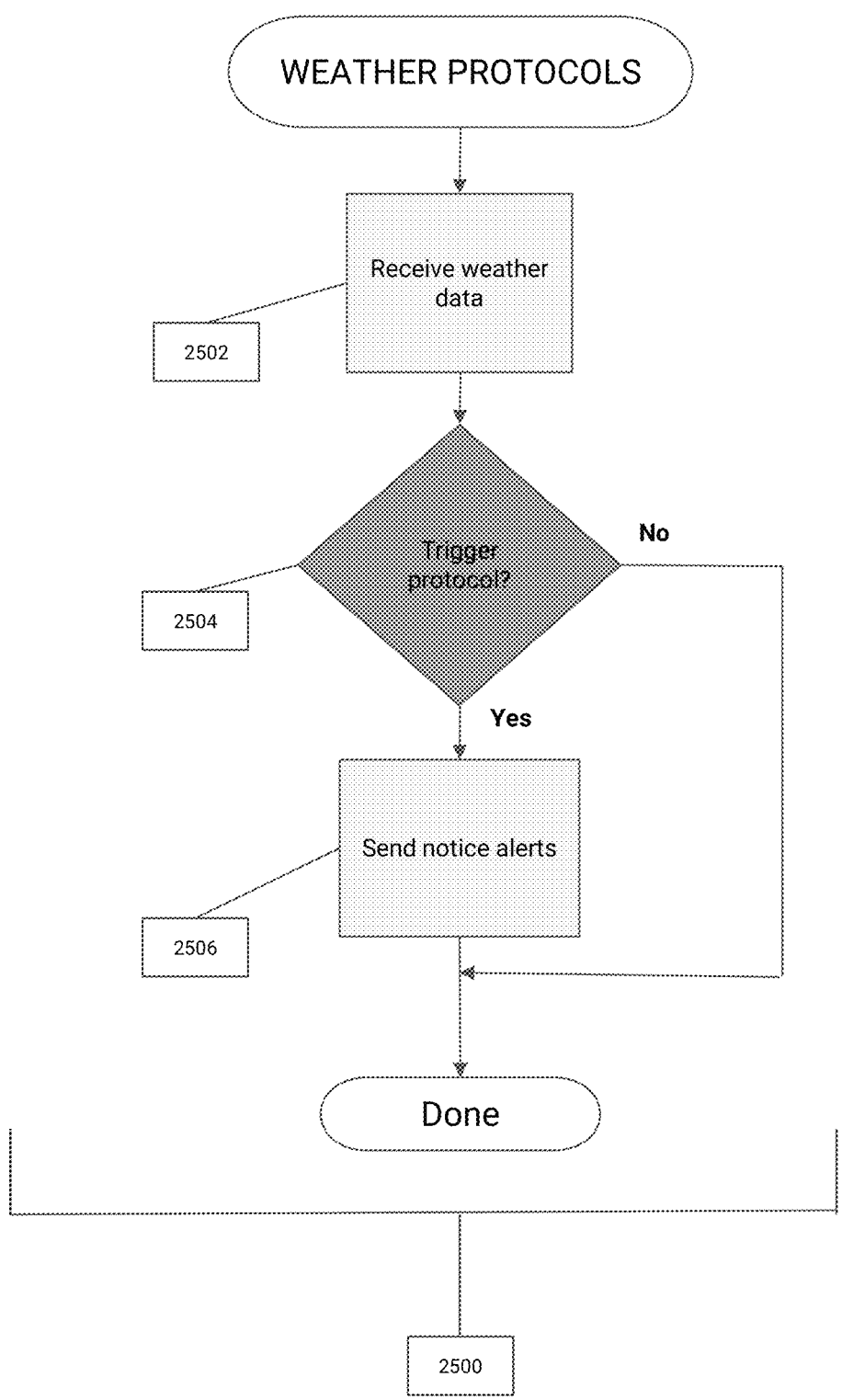
FIG. 25 depicts a flowchart of steps that trigger weather protocols.

The weather conditions may trigger different protocols that are performed by the system. For example, inclement weather, very cold weather or very hot weather may trigger protocols to ensure worker safety and productivity as well as the protection of structures and equipment at the construction site. FIG. 25 shows a flowchart 2500 of steps that relate to such protocols.

Initially, the site supervisor system receives weather data 2502. A check is made whether the weather data values trigger any protocols 2504. If a protocol is triggered, notices and alerts may be sent as part of the protocol to the appropriate parties 2506. For example, if the temperature is over 90 degrees fahrenheit, a party may be sent a notice to take a break every hour and to get a drink. Related notices may be sent to supervisors. As another example, if it is too cold, workers may be prompted to wear gloves and hats and to spend time in a heated space every hour. In still another example, if severe weather is approaching, workers may be prompted to secure the construction site and seek a safe location. In a final example, workers may be prompted not to take actions, such as pouring concrete, applying paint or applying stucco, in certain weather conditions.

Figure 26:
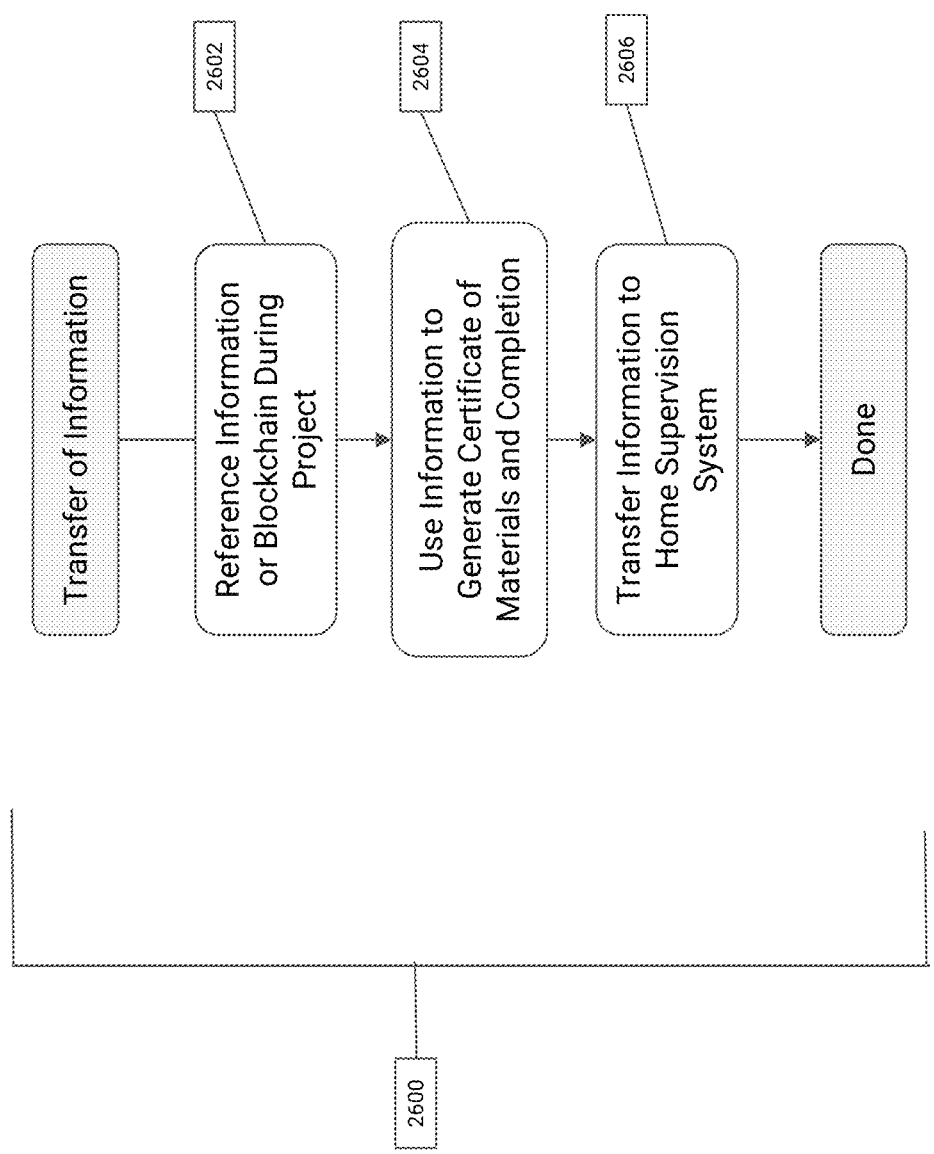
FIG. 26 depicts a flowchart of steps relating to the transfer of information for reference on a blockchain-based distributed ledger, to a certificate of materials and completion and to a home supervisor system.

As has been mentioned above, a great deal of information may be stored during the course of the construction project for reference during the project and after the project is completed. FIG. 26 shows a flowchart of steps 2600 that may be performed in exemplary embodiments in relation to the information. The information obtained during the project from many different sources may be referenced on a distributed ledger, like a blockchain-based distributed ledger 2602. The information may be stored on an ongoing fashion in databases as describe below and may be referenced in an immutable persistent fashion on the blockchain-based distributed ledger. This information may help resolve disputes between parties involved on the construction project. For example, suppose the construction company asserts that the wrong items were delivered. Since there is a complete record references on the blockchain of all deliveries, these records may be accessed to resolve the dispute. Insurance providers may access injury records referenced on the blockchain to settle claims. Disputes regarding pay among workers may be resolved by checking the recorded hours on site to determine the appropriate pay for the workers. Inspection records may be accessed to confirm that proper inspections were carried out and passed. The certificate may also be delivered to other parties, such as an insurance provider or financial institution.

When the construction project is complete, information referenced on the blockchain and stored in databases may be extracted and encapsulated into a certificate of materials and completion 2604. The certificate may hold information such as the BIM, the final BOM, labor sequence information, warranties for items in the completed home, punch list completion information, lender information, information regarding the contractors and laborers, insurance policy information, inspection history information, ownership history, history of localized events like weather and records of trespassing (such as images) and bills of lading for items delivered during the project. The certificate may be delivered in electronic form and preferably in an immutable format. Alternatively, the certificate may be delivered in paper form. The certificate may be delivered to the owner of the property or to a property manager.

A few examples help to illustrate the value of the certificate. The certificate acts as a complete record of the project. Suppose that an oven in a home fails 3 months after an owner occupies the premises. Since the certificate has complete warranty information, the owner can reference the warranty information and get the oven fixed under warranty. As another example, suppose that gutters on the home leak 6 months after an owner occupies the premises. The owner can reference the certificate to contact the contractor that installed the gutters if it appears there was an installation problem. The construction company might also have a remedy against the contractor based on evidence that the gutters were not installed properly. Further, the bills of lading (BOLs) may indicate that the gutters that were delivered were different from those specified in the BIM and BOM. The certificate may also help the owner get lower insurance premiums from an insurance provider because there are no unknowns regarding the construction project.

The information referenced on the blockchain based distributed ledger and stored in the databases may also be passed to a computing device of the owner 2606. The computing device may be, for example, part of a home supervisor system that manages and controls home systems, such as heating, air conditioning, lighting, an alarm system or the like. The computing device may be part of a smart home controller and may interface with appliances and other items that are interconnected via a home control network. The computing device may include a document management system for securely storing the transferred information.

Figure 27:
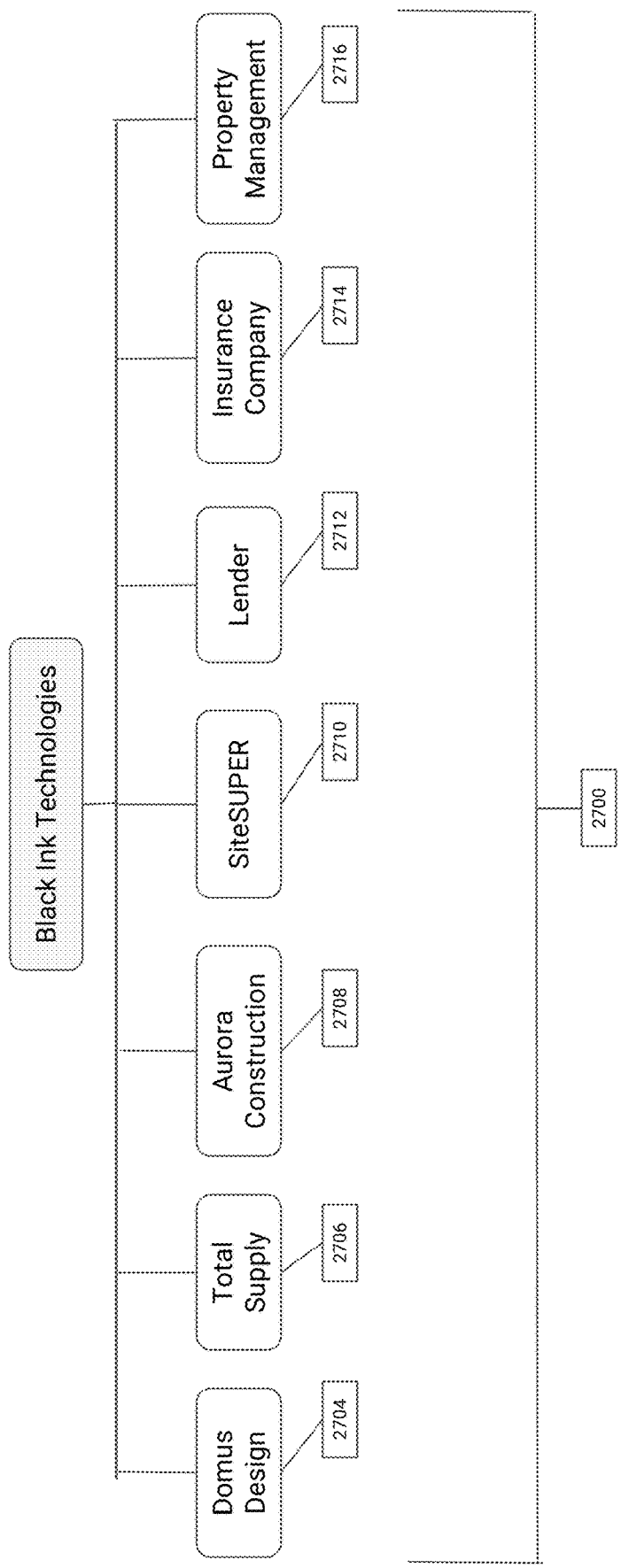
FIG. 27 depicts parties involved in the construction project.

In exemplary embodiments, information may be gathered from and sent to multiple parties. FIG. 27 shows a diagram 2700 of illustrative parties that may provide or use information that is referenced on the blockchain-based distributed ledger. A managing company 2702 is responsible for the management and oversight of the construction project. A design company 2704 is responsible for developing a design for the home and develops the BIM for the project. A supply company 2704 analyzes the BIM and develops a BOM for the construction project. The supply company 2704 is responsible for supplying the items used in the construction project. A construction company 2708 is responsible for constructing the home. The construction company hires workers and subcontractors as needed to complete the project.

The site supervisor system 2710 gathers, stores and uses information during the construction project as discussed above. A lender 2712 provides funding for carrying out the construction project. An insurance provider 2714 provides insurance for the project. Different types of insurance such as and including worker's compensation insurance and general liability insurance may be provided. A property manager 2716 may be responsible for managing the resulting home. In some instances, the home may be an apartment or condominium that have property managers.

Figure 28:
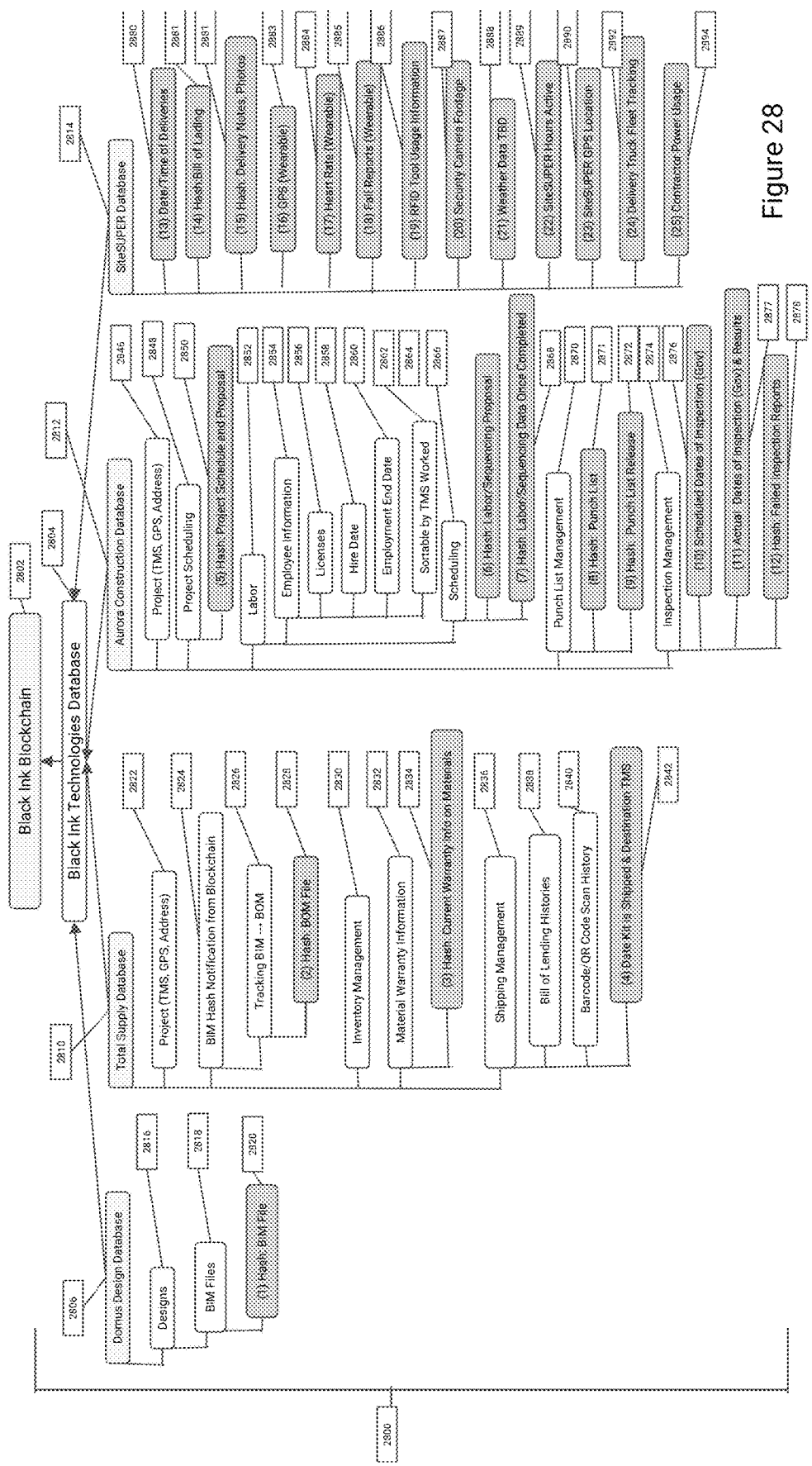
FIG. 28 depicts databases that provide information that is referenced on the blockchain-based distributed ledger.

FIG. 28 shows a diagram 2800 depicting possible information from multiple data sources (e.g., databases), some of which may be referenced on the blockchain-based distributed ledger 2802. The workflow may be that the data is first stored in a management company database 2804 and then referenced on the blockchain-based distributed ledger 2802. The design company database 2806 may hold information that is passed on to the management company database 2804 and ultimately referenced on the blockchain-based distributed ledger 2802. The design company database 2806 may hold designs 2816. The designs 2816 may include BIM files for BIMs, as has been discussed above. A hash value resulting from passing the BIM file 2820 for the construction project through a secure hash algorithm may also be stored on the design company database 2806. The BIM file may be hashed using any number of different types of known secure hash algorithms as mentioned above. The hash value of the BIM file may be transferred to the management company database 2804 and then for reference on the blockchain-based distributed ledger 2802.

FIG. 28 also shows a supply company database 2810. The supply company database 2810 may hold project information 2822, such as tax map submap (TMS) numbers, GPS information and address information for construction project properties. The supply company database 2810 may store a BIM hash notification 2824 from the blockchain-based distributed ledger 2802, indicating that the hash value for the BIM has been referenced on the blockchain-based distributed ledger 2802. Information 2826 tracking the bill of materials (BOM) to the BIM may be stored in the supply company database. As was discussed above, the supply company may analyze and process the BIM to develop of BOM for the project. A hash value 2828 resulting from passing the BOM file through a secure hash function is stored in the supply company database 2810, transferred to the management company database 2804 and referenced on the blockchain-based distributed ledger 2802.

The supply company database 2810 may also store inventory management information 2830, such as quantity and the particulars of material inventory and material warranty information for such materials 2832. The warranty information for materials used in the project is hashed 2834 and the resulting hash value is stored in storage in the supply company database 2810. The hashed value 2834 may be passed to the management company database 2804 and then referenced on the blockchain-based distributed ledger 2802. The supply company database 2810 may also store shipping management information 2836. This may include bill of lading histories 2838 and barcode, RFID values, UHF values and/or QR code scan histories 2840. The bills of lading (BOLs) for the project and the barcode/QR scan codes for delivered items for the projects may be hashed 2842 and the resulting hash value(s) passed to the management company database 2804 for reference on the blockchain-based distributed ledger 2802.

A construction company database 2812 may store project information 2846, such as TMS #'s, GPS information and addresses for projects. The construction company database may also hold scheduling information 2848 for the project. This may include detail regarding workflow and timing. A hash value of the project schedule 2850 may be stored on the construction company database 2812, passed to the management company database 2804 and referenced on the blockchain-based distributed ledger 2802. The construction company database 2812 may store labor information 2852. The labor information 2852 may include employee information 2854 for workers involved in projects. This employee information 2854 may include information regarding licenses for workers 2856, hire dates for workers 2858, employment end dates for workers 2860 and other information, such as names, photos, etc. The information may be sortable by keys such as TMS # to identify workers for a project. The construction company database 2812 may also store scheduling information 2864 for workers. This information may be used to develop a labor/sequencing proposal that is hashed 2866 and the resulting hash value stored in the construction company database 2812. The hash value 2866 may be passed to the management company database 2804 and referenced on the blockchain-based distributed ledger 2802. Labor sequencing data once the labor is completed 2868 is hashed and the resulting hash value stored in the construction company database 2812 for a project. This hash value 2868 may be passed to the management company database 2804 and referenced on the blockchain-based distributed ledger 2802.

Punch list management information 2870 may also be stored in the construction company database 2812. The punch list management information 2870 may include a hash of the punch list for a project 2871 and a hash of punch list releases for a project 2872. These hash values 2871 and 2872 may be passed to the management company database 2804 and referenced on the blockchain-based distributed ledger 2802.

Inspection management information 2874 may be stored in the construction company database 2812. Hashes of scheduled dates of inspections 2876, dates of actual inspections and results 2877 and failed inspection reports 2878 for a project may be stored in the construction company database. The hash values 2876, 2877 and 2878 may be passed to the management company database 2804 and referenced on the blockchain-based distributed ledger 2802. Information relating to a contractor bid portal 2879 may be stored in the construction company database.

Hash values gathered and stored in the site supervisor database 2814 may be passed to the management company database 2804 and referenced on the blockchain-based distributed ledger 2802. This may include hash values of information regarding dates and times of deliveries for a project 2880, delivery details for the project 2881 and delivery notes and delivery photos for the project 2882. The hash values may include hash values resulting from passing GPS information for wearables used in the project 2883, heart rate information gathered by wearables for the project 2884, failure reports from the wearables for the project 2885 through hash functions. Additionally hash values resulting from passing RFID tool usage information for the project 2886, security camera footage gathered by the site supervisor for the project 2887, weather data recorded by the site supervisor for the project 2888, hours information for when the site supervisor was active for the project through hash algorithms may be stored in the site supervisor database 2814, passed to the management company database 2804 and referenced on the blockchain-based distributed ledger 2802. The hash values may also result from passing.

GPS location information for the site supervisor system 2890, tracking information for delivery trucks 2892 and contractor power usage information 2894 through a hash function. Hash values 2890, 2892 and 2894 may be passed to the management company database 2804 and referenced on the blockchain-based distributed ledger 2802.

It should be appreciated that the detail of information in the databases and referenced in the blockchain-based distributed ledger is intended to be illustrative and not limiting. Other information may be stored in the databases and the blockchain-based distributed ledger.

Figure 29:
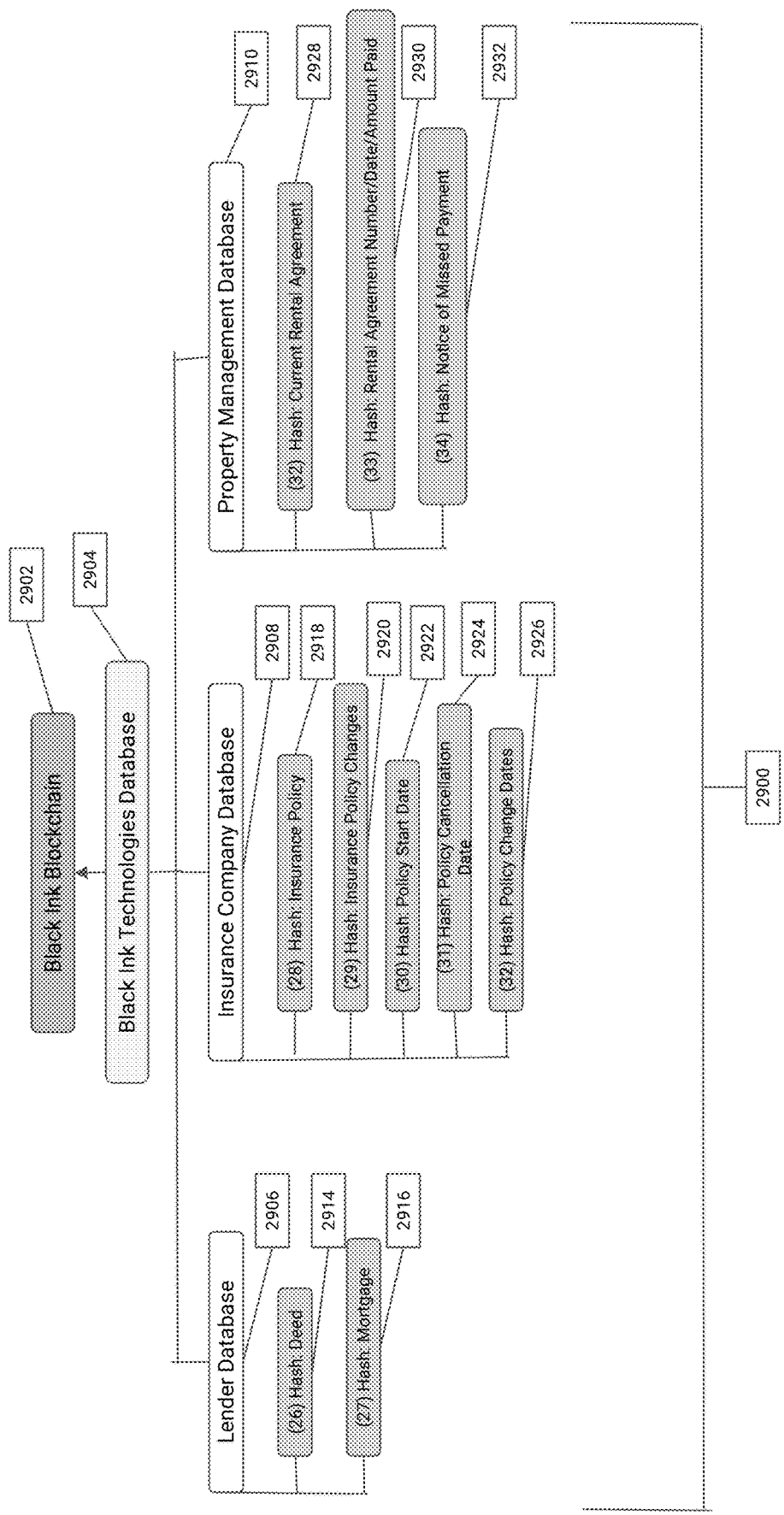
FIG. 29 depicts additional databases that provide information that is referenced on the blockchain-based distributed ledger.

Information referenced on the blockchain-based distributed ledger may also originate from other stakeholders. FIG. 29 shows a diagram 2900 of additional sources of information from other stakeholders. For example, information may originate from a lender database 2906. For example, hashed versions of the deed for the construction site property 2914 and the mortgage 2916 on the construction site property may be stored in the lender database 2906, transferred to the management company database 2904 and referenced on the blockchain-based distributed ledger 2902.

Information may originate from an insurance company database 2908. A hash of an insurance policy for the project 2918, a hash of any insurance policy changes for the project 2920, a hash of policy start date 2922, a hash of policy cancellation date 2924 and a hash of policy change dates 2926 may be stored in the insurance company database 2908. The resulting hash values 2918, 2920, 2922, 2924 and 2926 may be transferred to the management company database 2904 and referenced on the blockchain-based distributed ledger 2902.

Information may also originate from a property management database 2910. Hashes of a current rental agreement 2928, rental agreement particulars 2930 (such as agreement number, dates and amount paid) and notice(s) of missed payments 2932 may be stored therein. This hash values 2928, 2930 and 2932 may be added to the management company database 2904 and ultimately referenced on the blockchain-based distributed ledger 2902.

Figure 30:
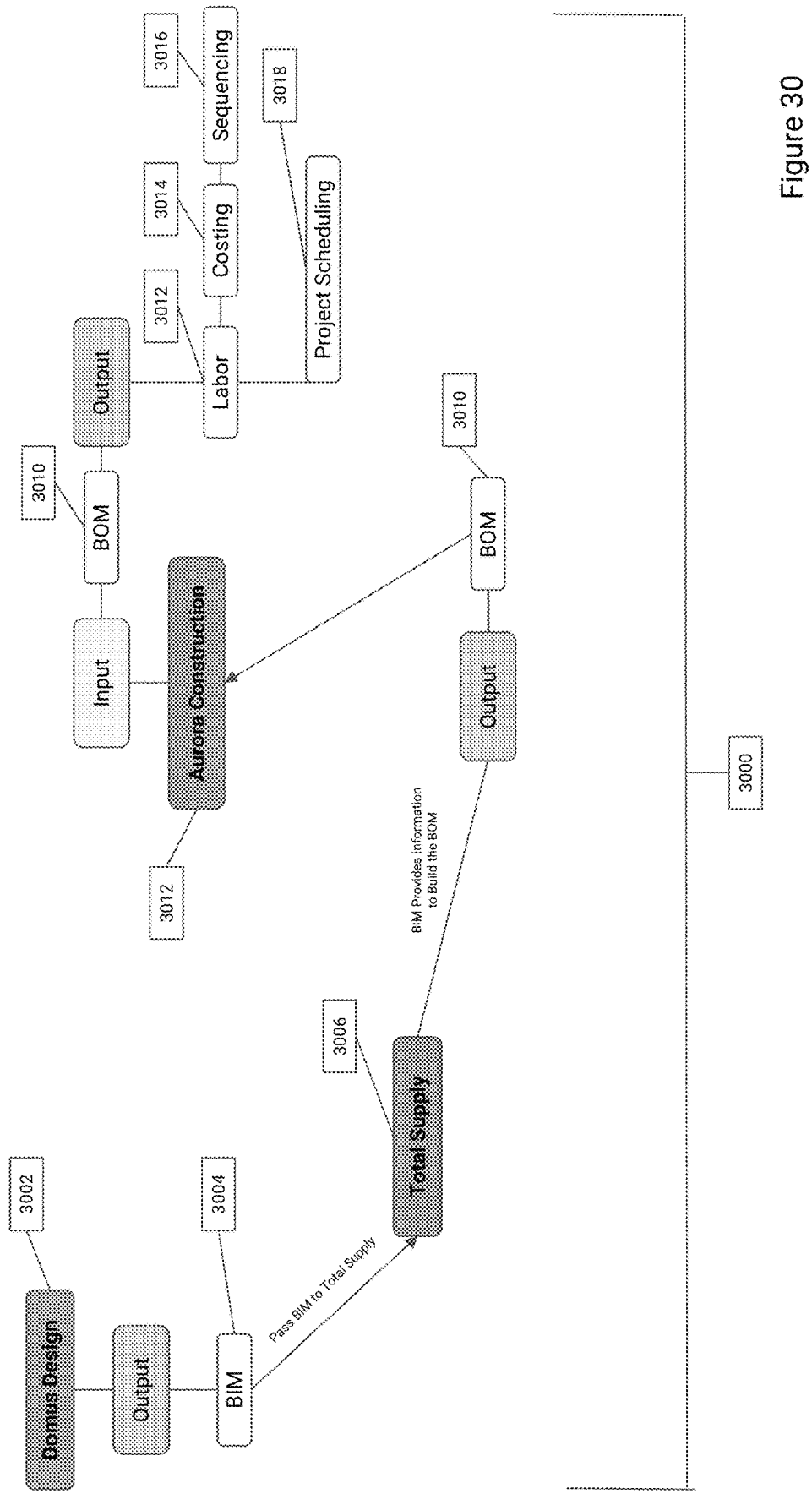
FIG. 30 shows information flow from the design company to the supply company.

FIG. 30 shows a diagram 3000 that captures information flow among the design company 3002, the supply company 3006 and the construction company 3012. As was mentioned above the design company 3002 generates a BIM 3004 for the construction project that is passed to the supply company 3006. The supply company 3006 uses information in the BIM 3004 to generate the BOM 3010. The BOM 3010 is then shared with the construction company 3012. The construction company 3012 develops a project schedule 3018. The project schedule 3018 specifies labor needs 3012 for the project, the costs for the labor 3014 and the sequencing of labor 3018 over the project.

Figure 31:
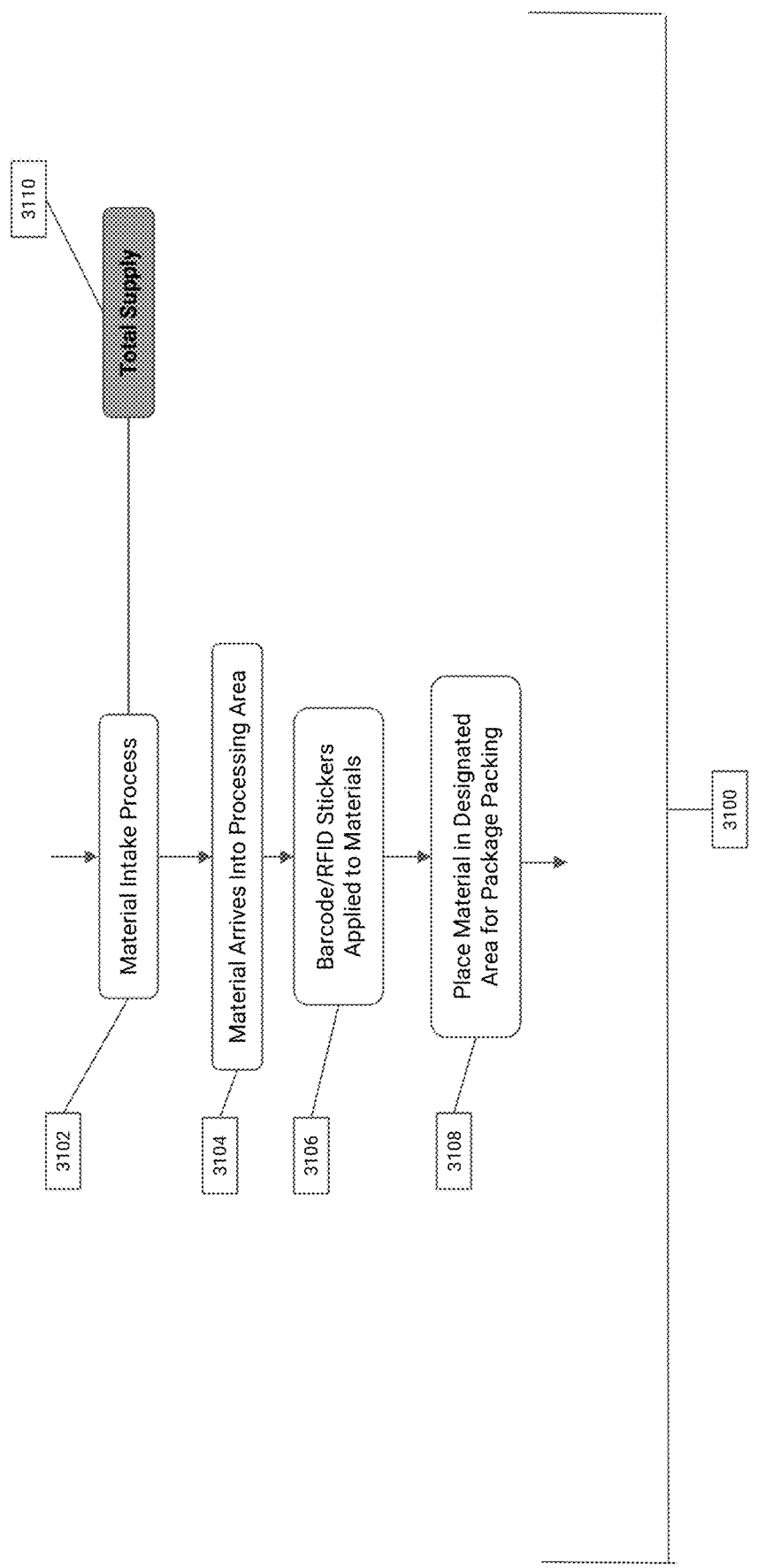
FIG. 31 depicts operations performed by the supply company in performing materials intake.

The supply company 3110 is responsible for the intake of materials specified in the BOM that are needed for the construction project. FIG. 31 shows a diagram 3100 of steps taken in the material intake process 3102. Materials arrive 3014 at a processing area of the supply company 3110 from the manufacturers and/or distributors. Items such as barcode stickers, QR code stickers, UHF stickers and/or RFID stickers are applied to the materials 3106 so that the materials may be identified and tracked. The materials with the stickers applied are placed in a designated area for packing 3108. The materials may then be packaged for shipment to the construction site.

Figure 32:
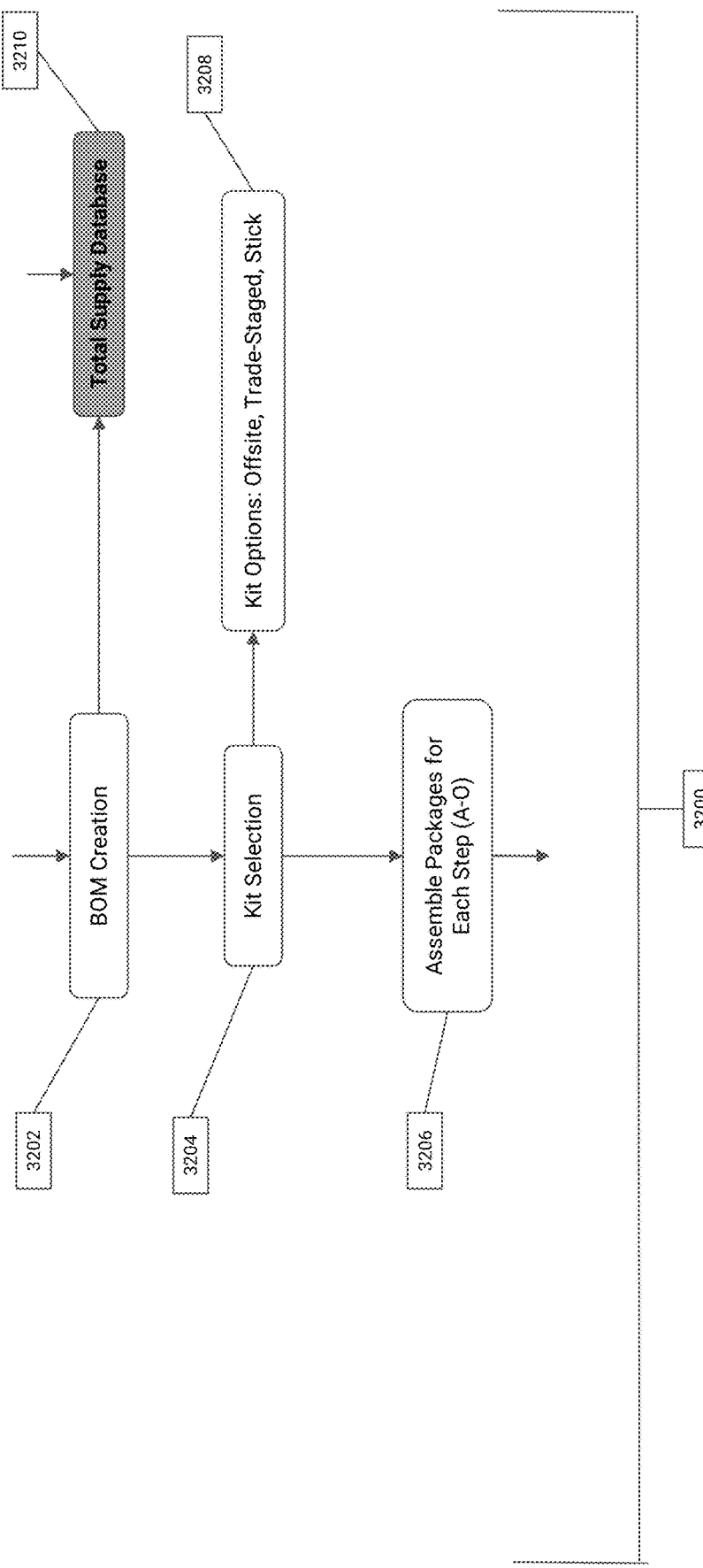
FIG. 32 depicts operations performed by the supply company in forming the BOM and assembling packages of kits.
Figure 33:
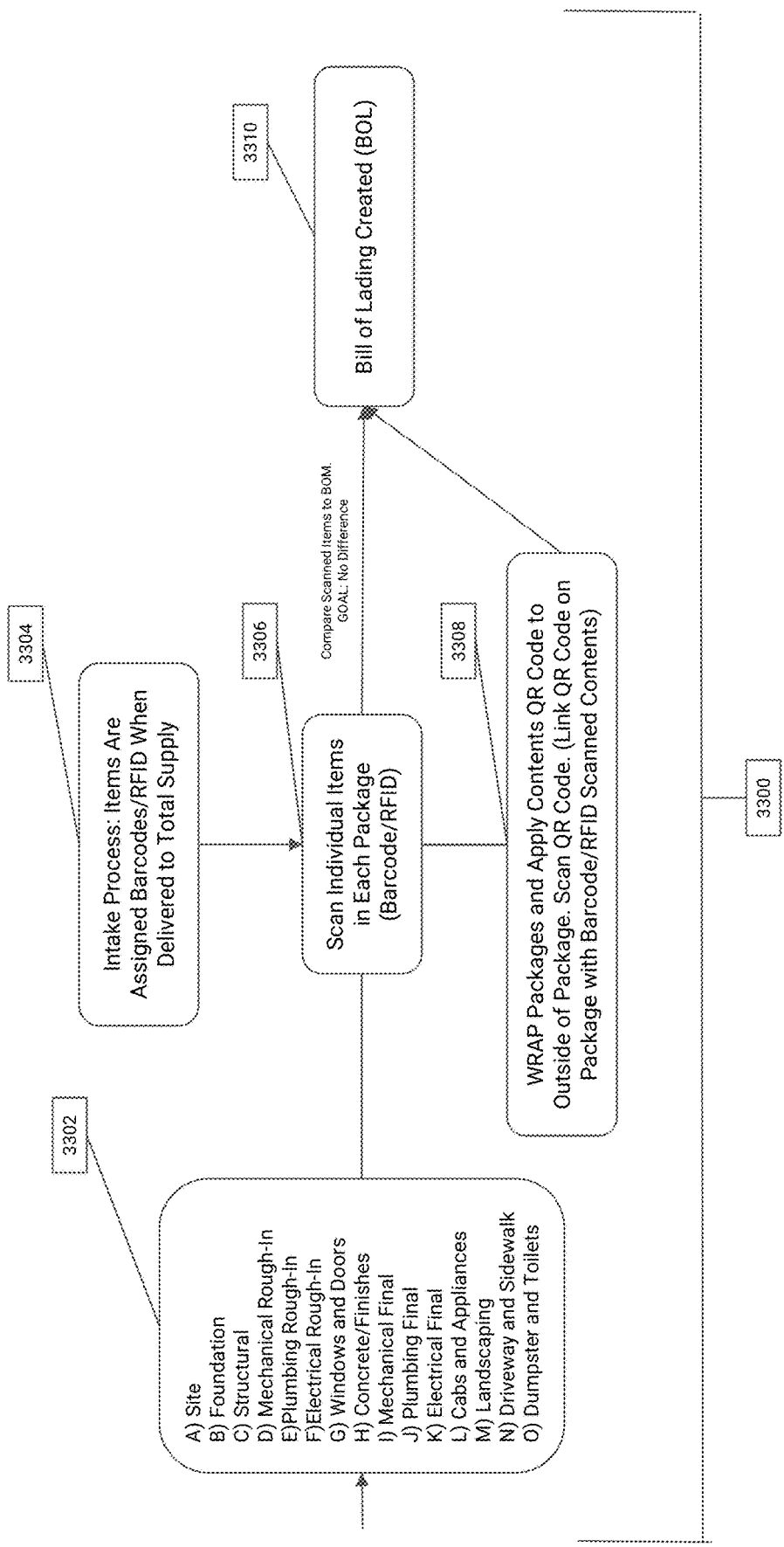
FIG. 33 depicts the steps performed in forming and wrapping kits and generating bills of lading.

As shown in the diagram of FIG. 32, the materials may be organized into kits for particular activities at the construction site. The BOM 3204 is created 3202 and processed to develop the kits that will be sent to the construction site. Different strategies 3208 may deployed to develop the kits. For example, the materials in the kits may be staged based on the trade involved (e.g., electrical, plumbing, carpentry) so that each trade has its own kit for the stage of construction. Thus, kits are selected 3204, and packages are developed for each step or stage of the construction project 3206. FIG. 33 shows a diagram 3300 depicting additional detail of activity performed by the supply company. The construction project schedule 3302 is organized into stages, such as site preparation, foundation, etc. as shown in FIG. 33. Items may be affixed such as barcodes, QR codes, RFID identification and/or UHF identification when the items arrive at the supply company 3304. As was mentioned above, stickers may be affixed to the items to associate the codes with the items. The items in each package may be scanned to record what items are included in the packages 3306. The packages may be wrapped as needed and a QR code sticker may be affixed to the outside of each package 3308. The QR code for each package is scanned 3312. The process may then generate a BOL for each delivery 3310.

Figure 34:
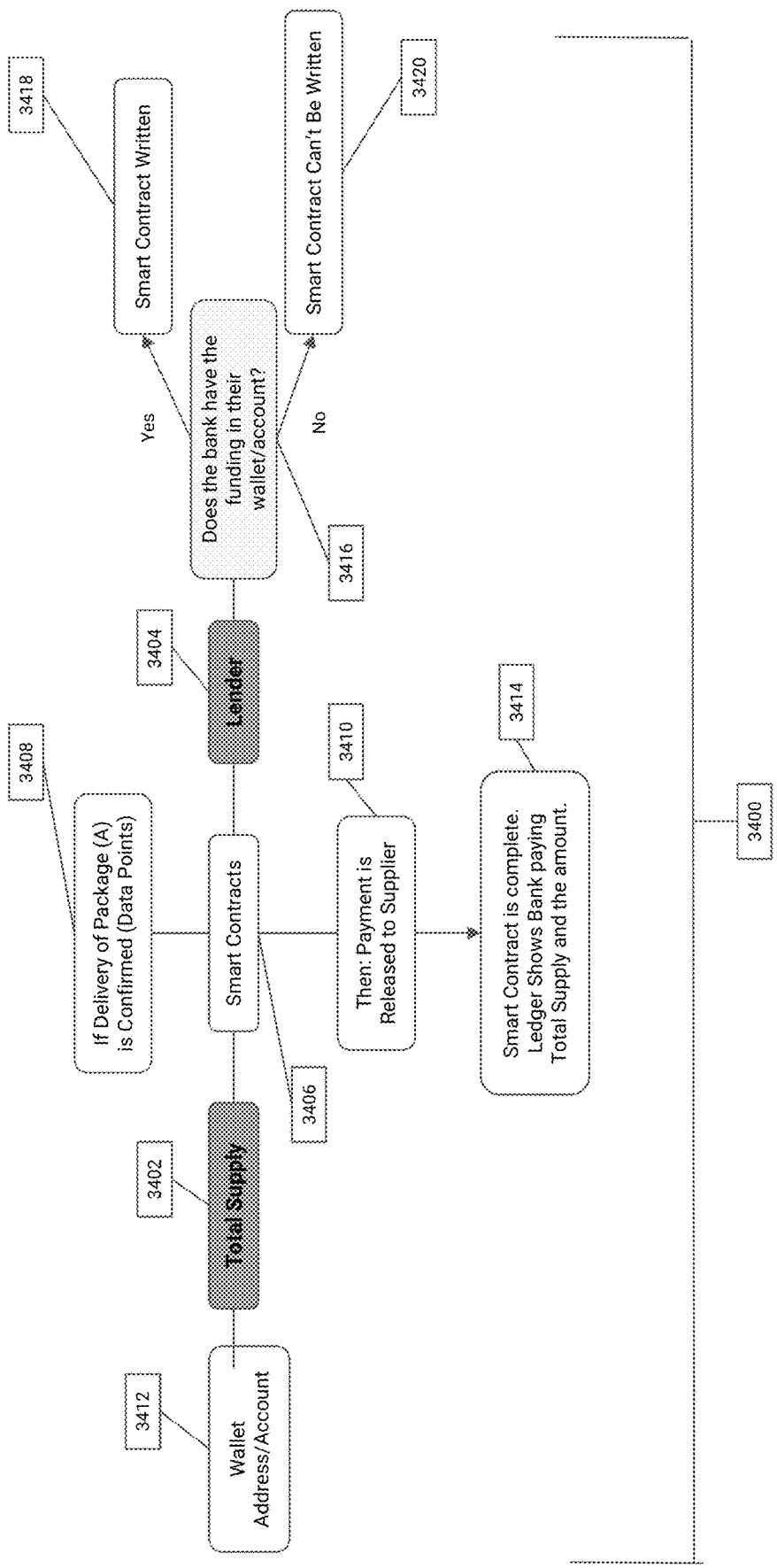
FIG. 34 depicts an example smart contract for the delivery of items.

Much of the interactions among the parties shown in FIG. 27 rely upon smart contracts that utilize the blockchain-based distributed ledger. FIG. 34 shows a diagram 3400 of a first example of interactions relating to a smart contract for the construction project. Suppose that the supply company 3402 makes a delivery to the construction site. Further suppose that the delivery is confirmed 3408 by information such as that gathered by the site supervisor system as discussed above. The lender 3404 then releases payment 3410 to the supply company 3402. The payment may be made electronically, such as through crypto-currencies, like Bitcoin or Ether, or via a stable coin whose value is pinned to an item like a paper currency or the like. A crypto-currency is a digital currency built with cryptographic protocols that make transactions secure and difficult to forge. Other suitable forms of electronic payment includes Automated Clearing House (ACH) payment, Electronic Funds Transfer (EFT), card payments, other types of bank transfers or other types of electronic wallet transfer. In the case where crypto-currency is used, the crypto-currency may be delivered to the digital wallet of the supply company at a specified wallet address or account 3412. The ledger is updated to show that the contract is complete 3414. Payment requires that the lender has sufficient funding in their digital wallet 3416. If not, the smart contract will not be written on the blockchain-based distributed ledger 3418. If there is sufficient funding, payment is made and the contract is written onto the blockchain-based distributed ledger as complete 3420.

Figure 35:
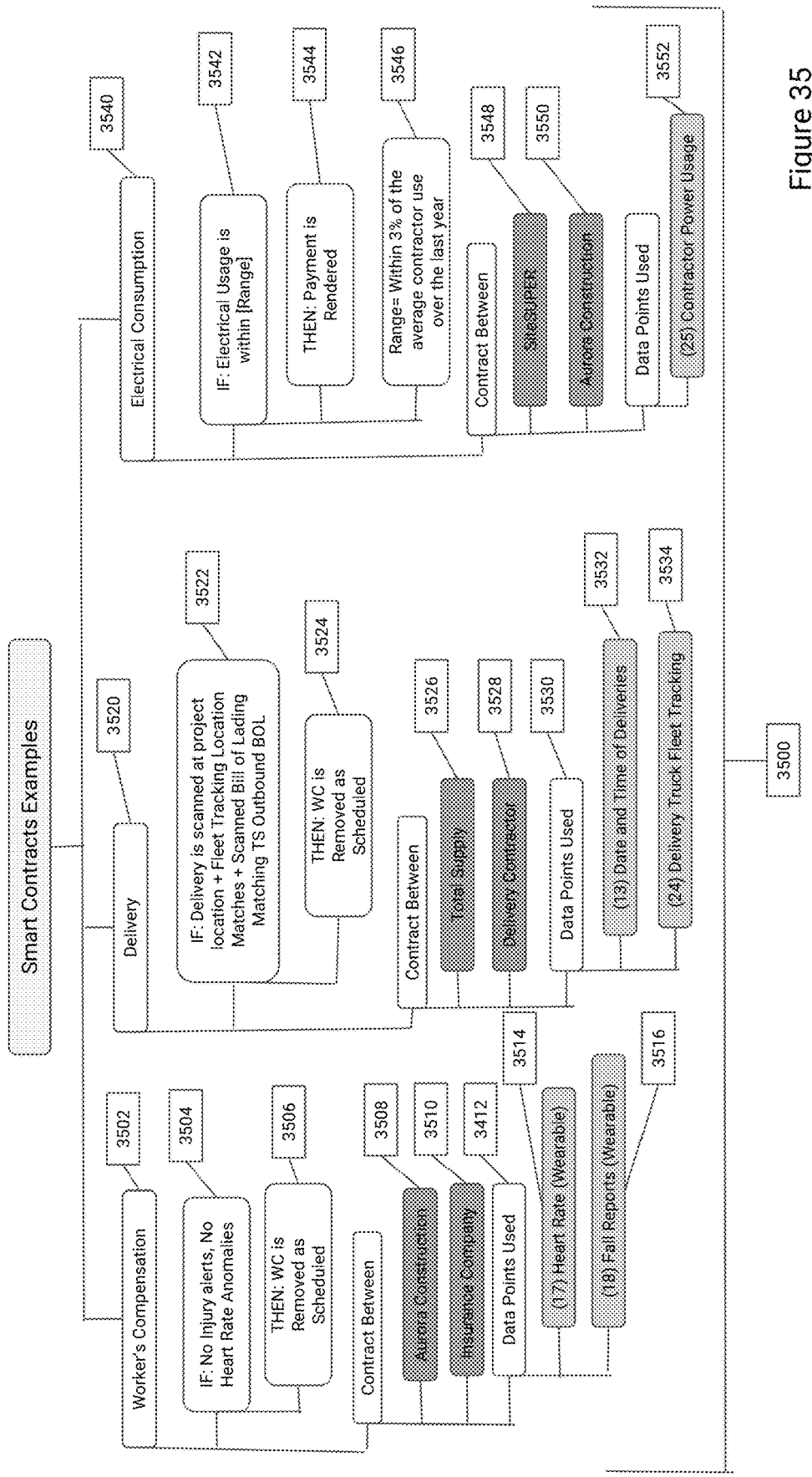
FIG. 35 depicts three example smart contracts.

FIG. 35 depicts a diagram 3500 for multiple illustrative smart contracts. In a first illustrative smart contract, the smart contract concerns worker's compensation insurance 3502. The contract removes the insurance for a worker 3506 if there are no injury alerts and no heart rate abnormalities for a given worker 3504. The smart contract is between the construction company 3508 and the insurance company 3510. The contract looks at the data points 3512 of the heart rate history 3514 gathered by a wearable for the worker and any fall reports 3516 from a wearable for the worker. As mentioned above, the wearables may include a gyroscope or other mechanism that provides data indicative of a fall. This data may be processed to identify data indicative or a fall or other incident where an injury may have occurred.

A second illustrative smart contract shown in FIG. 35 relates to payment for a delivery 3520. If a scan is made at the delivery site, if the fleet location tracking information matches the desired delivery site location and if the scanned BOL at the delivery site matches the outbound BOL from the supply company 3522, then payment from the supply company 3526 to the delivery contractor 3528 is made. Data 3530 used by this illustrative smart contract 3530 includes date and time of deliveries 3532 and delivery truck fleet tracking information 3534.

A third illustrative smart contract shown in FIG. 35 relates to electrical consumption 3540. If the electrical usage by a contractor of the construction company is within a range of 3% of the average contractor use over the past year 3542 and 3546, then payment is provided 3544 by the construction company 3550 to the site supervisor system 3548. The contractor power usage data 3552 is reviewed.

Figure 36:
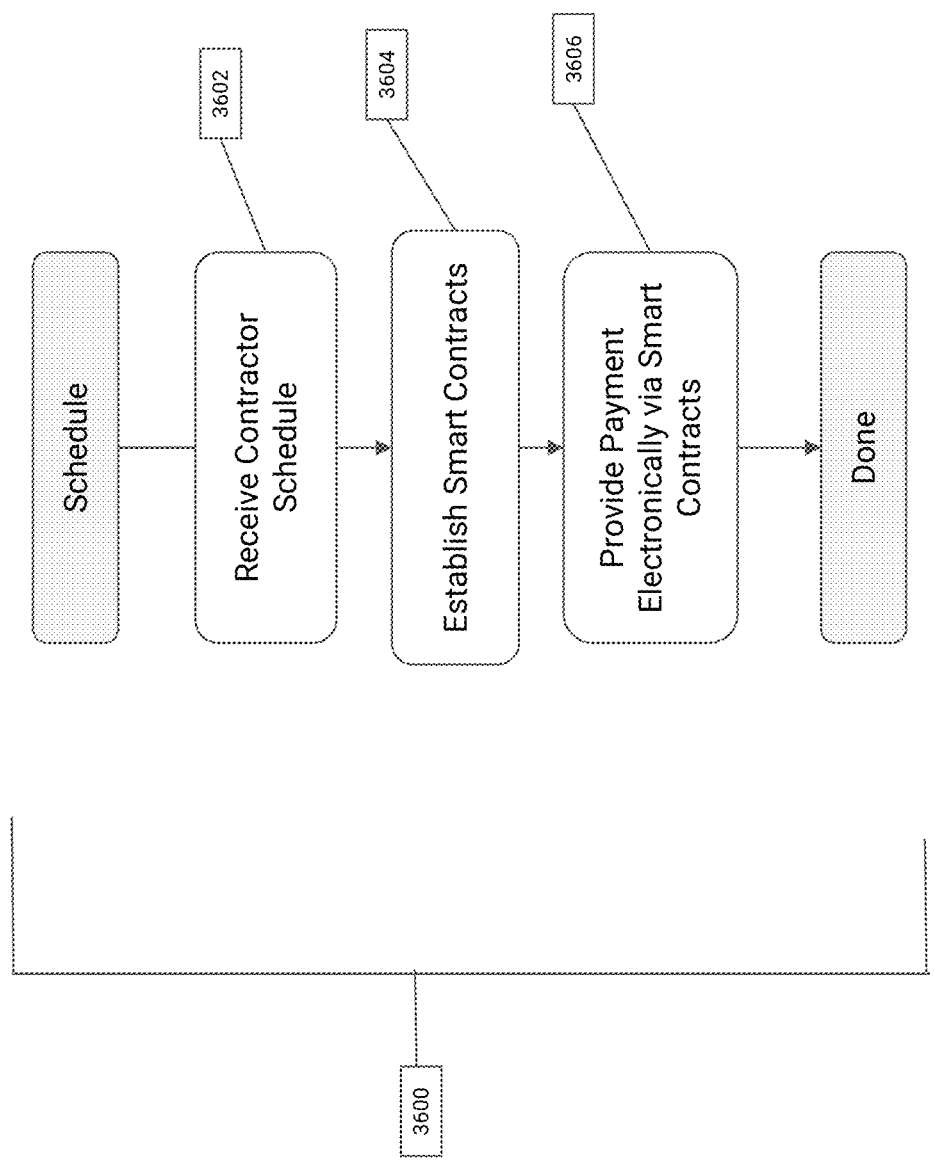
FIG. 36 depicts a flowchart of steps performed in scheduling and paying for construction activities.

There is a relationship between the smart contracts and the project schedule. FIG. 36 depicts a flowchart 3600 illustrating steps performed relating to the project schedule and smart contracts. Initially, the project schedule is received 3602. As was discussed above, the construction company forms the project schedule based in part on the BIM and BOM. Based on the project schedule, smart contracts may be constructed that use the blockchain-based distributed ledger for contractual arrangements associated with the construction project 3604.

The smart contracts are implemented in software and in this case are used to provide electronic payments to parties 3606 for activities relating to the construction project using, for example, crypto-currencies. The smart contracts may specify the conditions required for payment and may specify the amounts of payment.

Figure 37:
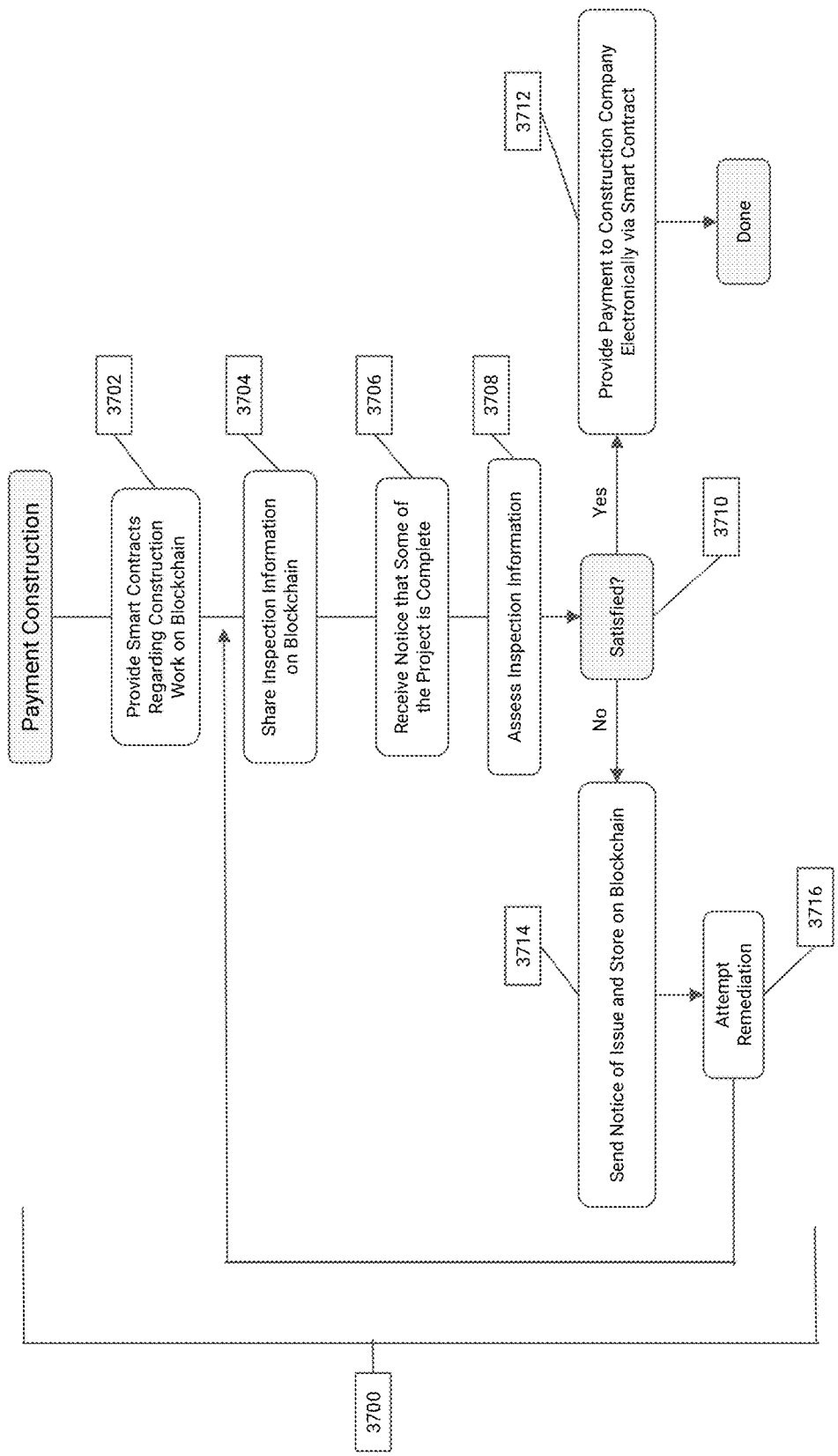
FIG. 37 depicts a flowchart of steps performed in paying for construction activities.

FIG. 37 shows a flowchart 3700 depicting steps performed for construction work in the construction project. Initially a smart contract may be initiated that uses the blockchain-based distributed ledger, where the smart contract is for at least a portion of the construction work for the construction project 3702. An inspection of work performed under the contract takes place and information regarding the inspection is passed through a hash function resulting in a hash value. The hash value may be referenced on the blockchain-based distributed ledger 3704. The information may include, for example, the name of the inspector, the date of the inspection, an identification of what was inspected, an indication of whether the inspection was passed, any inspection notes from the inspector and an identification of any defects that cause a fail inspection and how to remedy. A notice is received at the site supervisor system that a portion of the project is complete 3706. The inspection information is assessed 3708. If the inspection information indicates that the inspection was passed 3710, then payment may be provided 3712 to the construction company via smart contract for the portion of the construction project. In contrast, if the inspection was unsuccessful, a notice of the failure and a notice of issues that need to be addressed may be sent, hashed and resulting hash value may be referenced on the blockchain-based distributed ledger 3714 for review by the construction company. The construction company may then attempt to remediate the problems 3716 and repeat the above-described steps beginning with a new inspection and reference to a hash value for information regarding the new inspection on the blockchain-based distributed ledger 3704.

Figure 38:
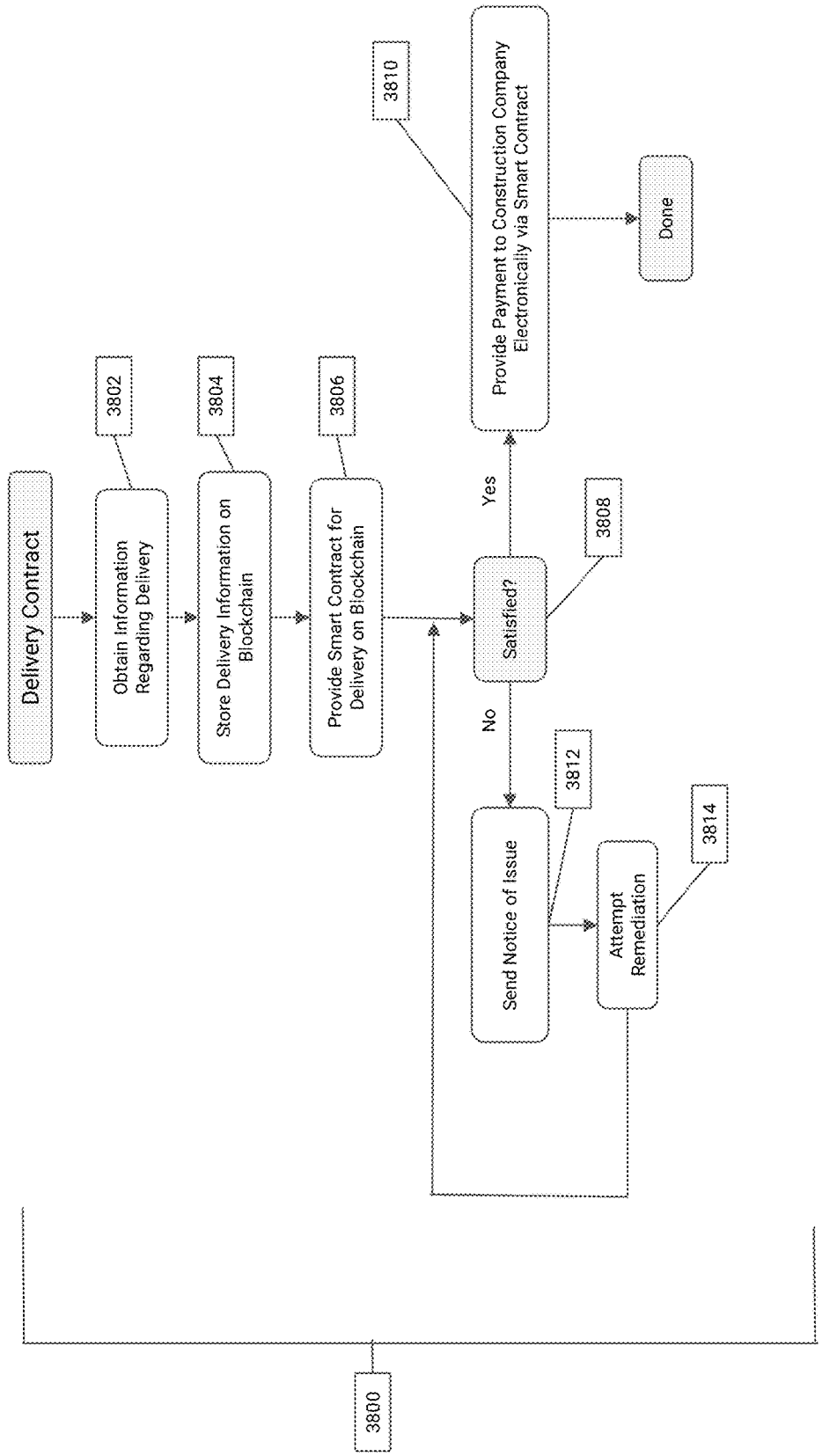
FIG. 38 depicts a flowchart of steps performed with smart contracts relating to delivery of items.

Smart contracts may also play a role with deliveries. FIG. 38 provides a flowchart 3800 concerning steps performed in relation to deliveries relating to such smart contracts. First, information is obtained regarding delivery to the construction site for the construction project 3802. The delivery information is hashed, and the resulting hash value is referenced on the blockchain-based distributed ledger 3804. A smart contract is provided that uses the blockchain-based distributed ledger 3806. A determination is made whether the conditions specified in the smart contract are satisfied 3808. If the conditions are satisfied, electronic payment for the delivery is realized 3810. If the conditions are not satisfied, notice of outstanding issues are sent and the delivery contractor may attempt to remedy the issues 3814. The process may then repeat beginning with step 3808 until the conditions are satisfied.

Figure 39:
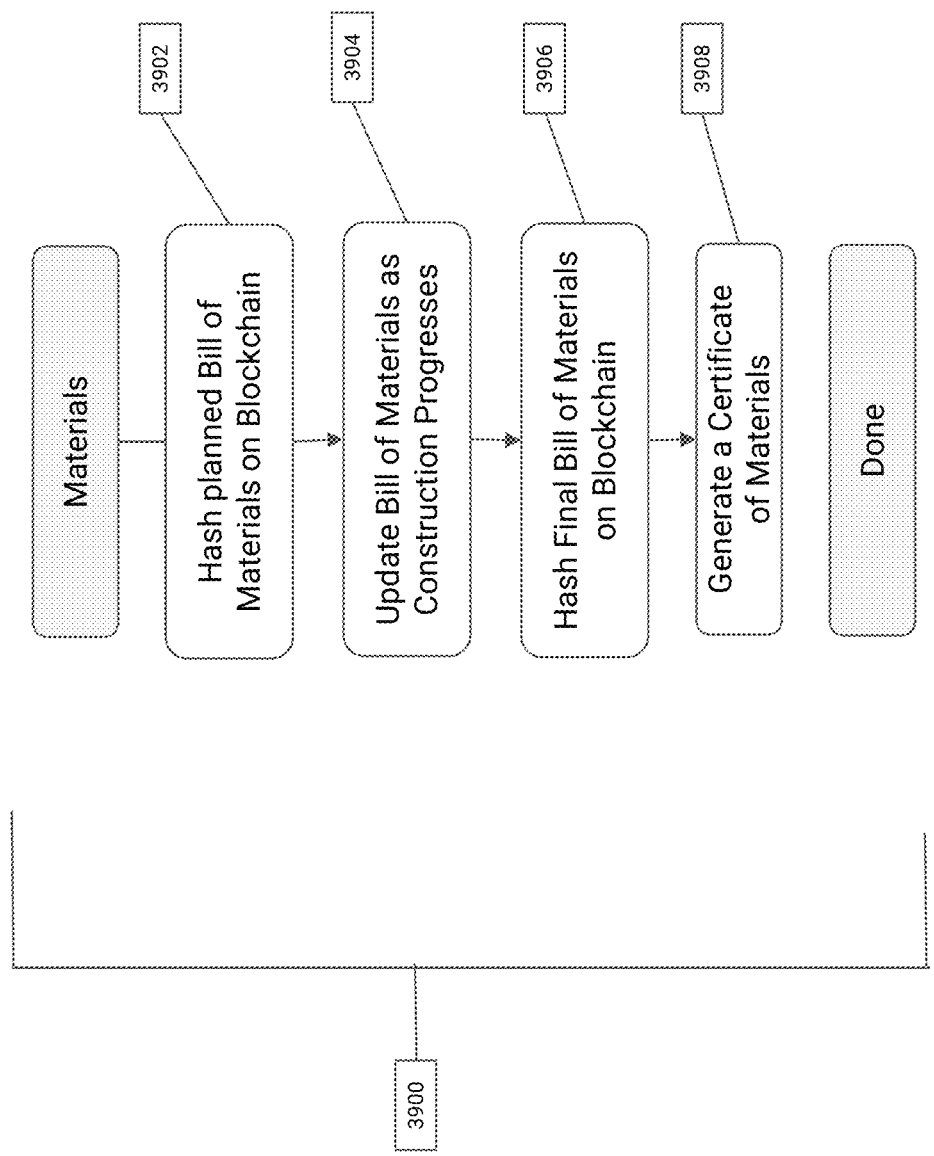
FIG. 39 depicts a flowchart of steps performed to monitor materials used in a construction project to generate a certificate of materials.

One of the benefits of the approach adopted by the exemplary embodiments described herein is that a complete record of materials used in the home of the construction project is maintained. FIG. 39 shows a flowchart of steps that are performed regarding such materials. Initially, the planned BOM generated by the supply company is hashed and the hash value is referenced on the blockchain-based distributed ledger 3902 as described above. The BOM is updated as the construction progresses until the construction is complete 3904. When construction is complete, the final BOM is hashed and the hash value is referenced on the blockchain-based distributed ledger 3906. The information in the final BOM is used to generate the certificate of materials provided to the owner of the home resulting from the construction project 3908.

Figure 40:
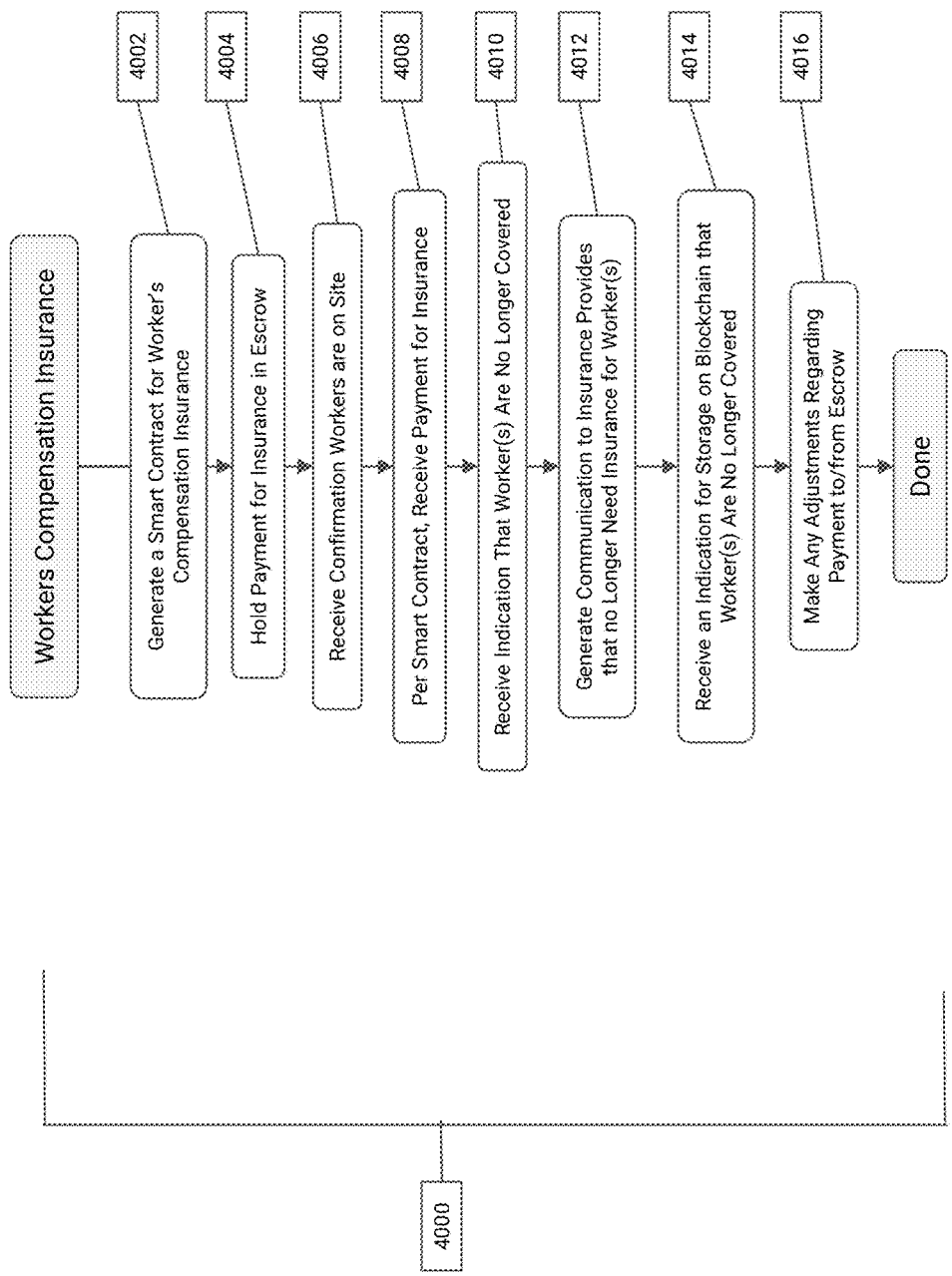
FIG. 40 depicts a flowchart of steps performed to provide or withdraw worker's compensation insurance per a smart contract.

As has been discussed above, worker's compensation insurance may be adjusted as workers are added and removed from the workforce for the construction project with the assistance of smart contracts. FIG. 40 provides a flowchart 4000 of steps performed relative to worker's compensation insurance. A smart contract is provided for worker's compensation insurance 4002 between the insurance provider and the construction company. Payment for the insurance may be held in escrow 4004 and funds may be added/deleted as warranted. When confirmation is received that workers are at the site to work 4006, the insurance is put in place and payment is received 4008 by the insurance provider for the insurance from escrow on behalf of the construction company. When notice is received that a worker or workers is/are no longer to be covered by the insurance 4010, a communication is generated to the insurance provider that no longer need coverage for the worker(s) 4012. An indication is received and hashed to produce a hash value that may be referenced on the blockchain-based distributed ledger that the worker is no longer covered by the insurance 4014 and any adjustments in the insurance premiums may be made to the escrow account 4016.

Figure 41:
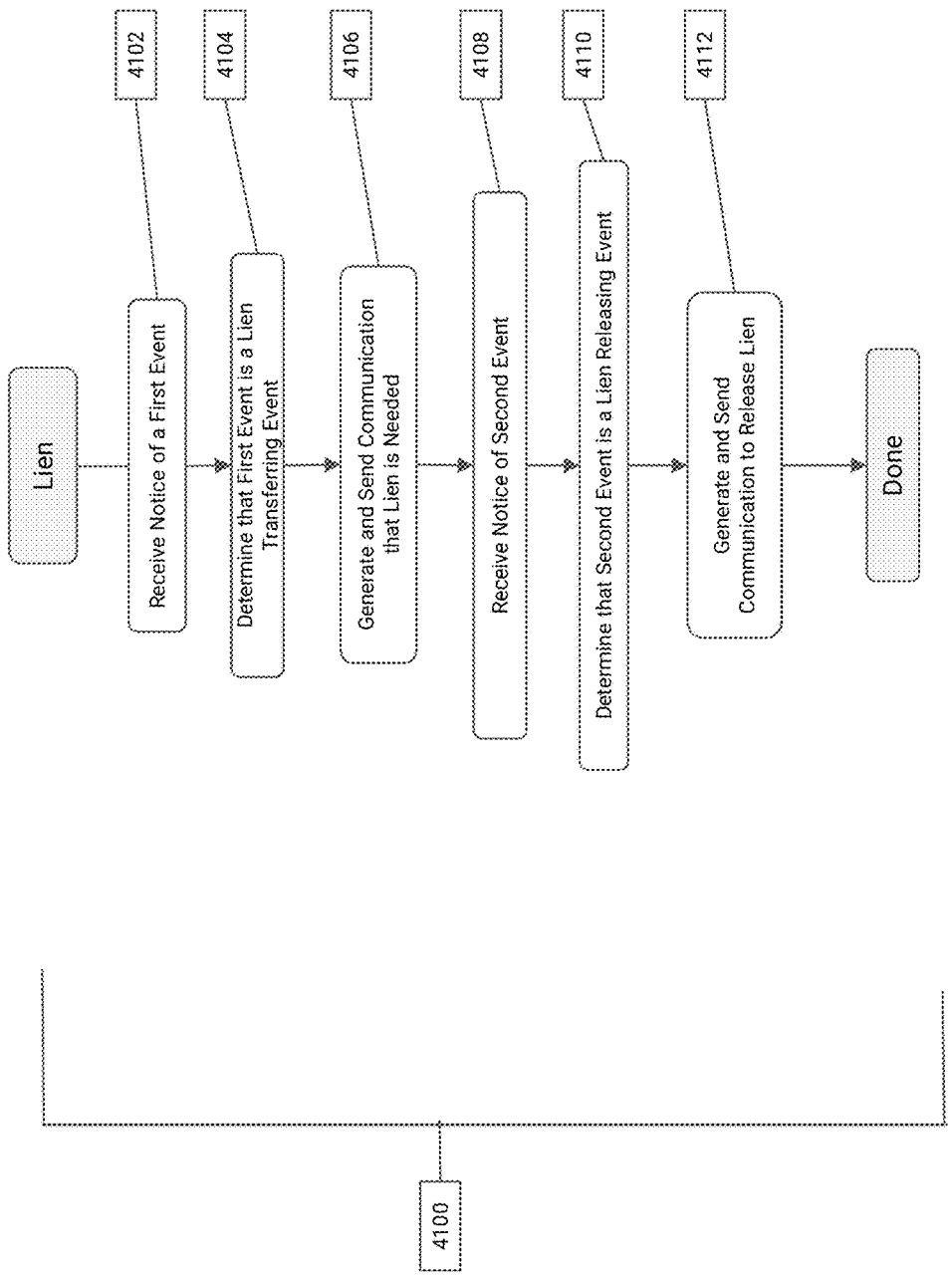
FIG. 41 depicts a flowchart of programmatic steps performed to trigger and release liens responsive to events.

Liens are often used in construction. The exemplary embodiments enable the triggering and releasing of such liens to be automated. FIG. 41 shows a flowchart 4100 of steps that may performed regarding liens. Initially, notice of a first event is received 4102 at the site supervisor systems or at a server in a cloud environment. A programmatic determination is made that the event is a lien triggering event 4104. For example, suppose a supply company delivers items to a construction site. The supply company may have a lien on the items until payment is received.

A communication is generated and sent that a lien is needed 4106. This communication may be sent to the involved parties. In some instances, where the lien is not in place, the communication may be sent to legal counsel or the like to perfect the lien. Notice of a second event may be received 4108. The second event may programmatically be determined to be a lien releasing event 4110. A communication is generated and sent to the proper parties to release the lien 4112.

Figure 42:
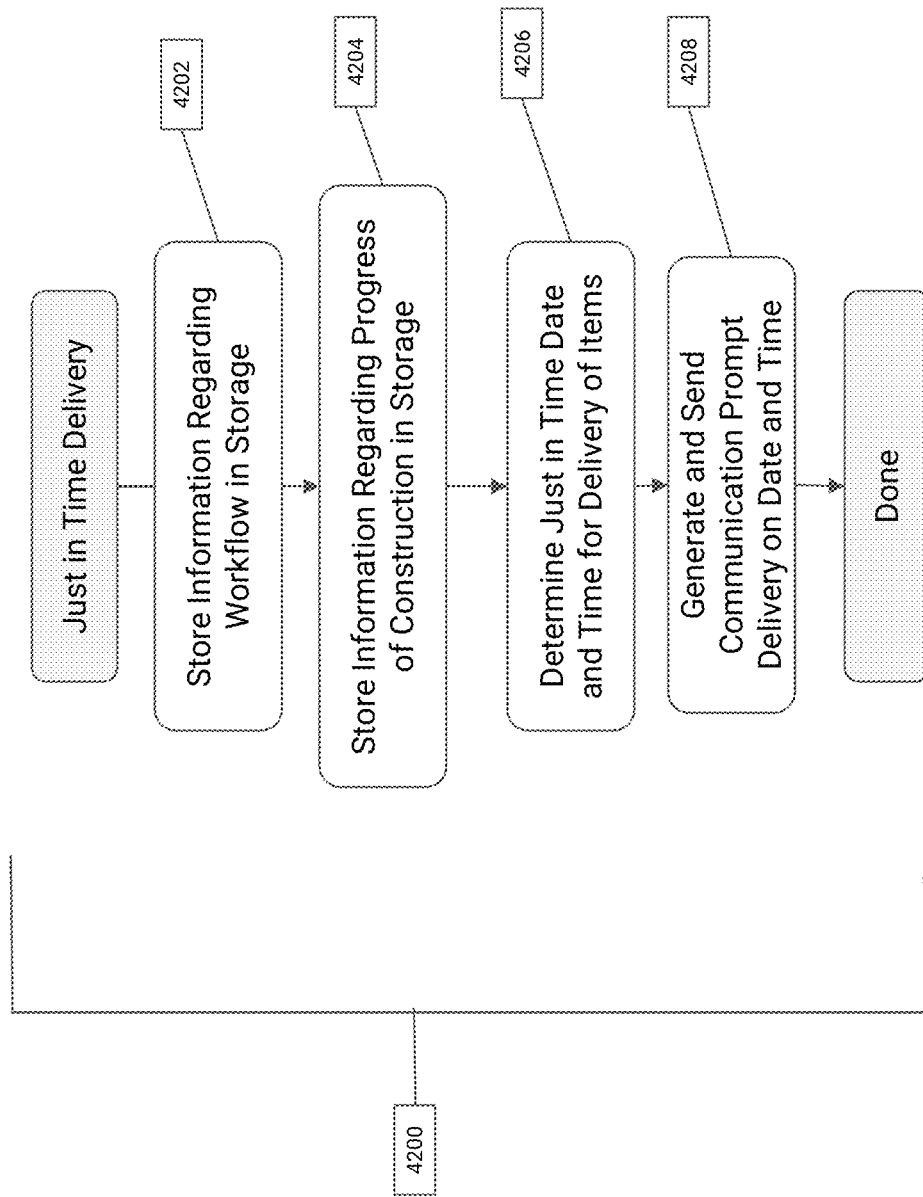
FIG. 42 depicts a flowchart of steps performed to provide JIT delivery of items to a construction site.

Because of the tracking of construction progress and the automated scheduling, exemplary embodiments may provide for just in time (JIT) delivery. JIT delivery ensures that items are delivered when needed and are not delivered late causing delays. Moreover, JIT delivery ensures that items are not delivered too early and thus unnecessarily exposed to the elements, be susceptible to theft or occupy needed storage space. FIG. 42 shows a flowchart 4200 of steps performed to realize such JIT delivery scheduling. As has been discussed above, information regarding workflow is stored in storage 4202. The workflow specifies what items are needed and when the items are needed. The exemplary embodiments keep track of how a project is progressing and stores information in storage regarding the progress 4204. Based on this information delivery of items can be scheduled just in time 4206. A communication is generated and sent to prompt the delivery to occur when scheduled 4208.

Figure 43:
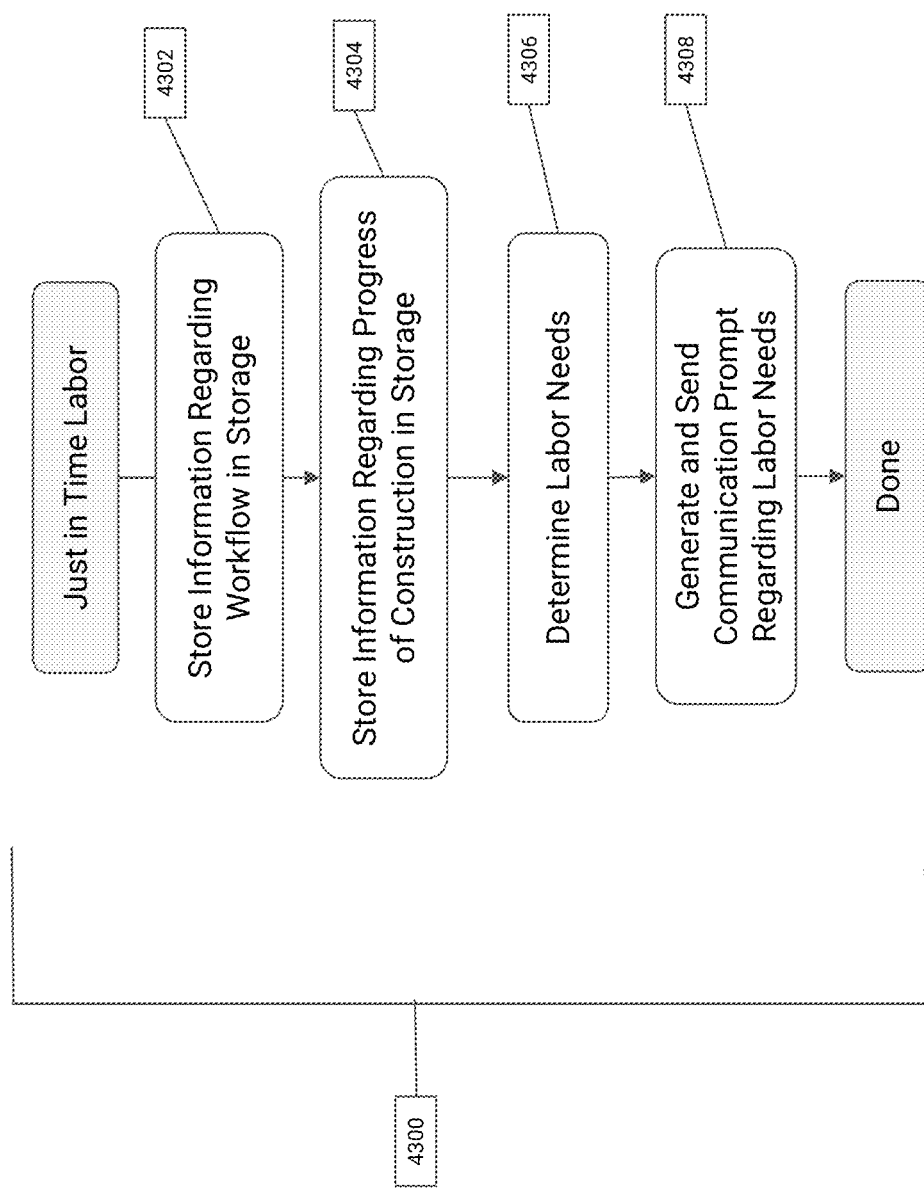
FIG. 43 depicts a flowchart of steps performed to provide JIT labor at a construction site.

The exemplary embodiments also support JIT labor where the labor arrives on site when they are needed. FIG. 43 shows a flowchart of steps that may be performed to realize JIT labor. The workflow for the project specifies what quantity of labor is needed and when the labor is needed. The workflow information is stored in storage 4302, as is information regarding the progress of the project 4304. Based on the stored workflow and progress information, labor needs are determined 4306. A communication is generated and sent to prompt the laborers to be scheduled for work on specified dates/times when they are needed 4308.

While the present invention has been described with reference to exemplary embodiments herein, those skilled in the art will note that various changes in form and detail may be made without departing from the intended scope of the present invention as defined in the appended claims.

The invention claimed is:

1. A computerized system for performing a smart contract according to materials verifiably delivered to a construction site comprising:
    a kiosk having a storage medium, affixed to the construction site, and uniquely associated with the construction site;
    a materials having a product identification affixed to the materials by the supply company prior to the delivery of the materials to the construction site wherein the materials and the product identification are associated with a smart contact;
    a distributed ledger in communications with the kiosk having a bill of materials including a first record having the materials and the product identification and wherein the smart contract is stored on the distributed ledger;
    an electronic device adapted to capture information representing materials actually delivered to the construction site;
    a set of non-transitory computer readable instructions included in the kiosk adapted for:
    retrieving the first record from the distributed ledger representing materials to be delivered to the construction site,
    obtaining information representing materials actually delivered to the construction site from the electronic device regarding items delivered to the construction site by the supply company, creating a second record representing the materials actually delivered to the construction site and storing the second record on the distributed ledger, verifying that the materials delivered to the construction site match the first record included in the bill of materials stored on the distributed ledger by the supply company, creating a third record representing a difference between the product information of the first record and the product information of the second record and storing the third record on the distributed ledger, retrieving a smart contract from the distributed ledger, referencing terms of the smart contract associated with the delivery of the materials, determining whether the delivery satisfies the terms of the smart contract and initiating electronic payment for the delivery to the supply company upon the determination that the delivery satisfies the smart contract.

2. The computerized system of claim 1, wherein the set of non-transitory computer readable instructions are adapted for determining that the first record is not sufficiently similar to the second record so that the delivery does not satisfy the smart contract and withholding payment to the supply company for the non-satisfactory delivery.

3. The computerized system of claim 1, wherein the distributed ledger is immutable.

4. The computerized system of claim 1, wherein the distributed ledger is blockchain based.

5. The computerized system of claim 1, wherein the electronic payment is realized through a crypto-currency.

6. The computerized system of claim 5, wherein the crypto-currency is a stable coin whose value is tied to a value of another entity.

7. The computerized system of claim 1, wherein the set of non-transitory computer readable instructions are adapted for sending an electronic communication to the supply company in response to receiving information indicating and confirming that the construction site is ready for the delivery of the materials.

8. The computerized system of claim 1, wherein a hash of the information obtained is stored on the distributed ledger.

9. The computerized system of claim 1 including:
a weather station included in the kiosk; and,
wherein the statistical information regarding weather conditions for the construction site at the time of the delivery of the materials is stored on the distributed ledger.

10. The computerized system of claim 1, wherein the set of non-transitory computer readable instructions are adapted for sending an alert to an insuring entity indicating that the delivery has been made subsequently representing the ability to increase insurance coverage amounts for the materials delivered to reflect the confirmed delivered materials.

11. The computerized system of claim 1, wherein the set of non-transitory computer readable instructions are adapted for tracking the delivery from supply source to the construction site; and storing tracking information obtained from the tracking on the distributed ledger.

12. The computerized system of claim 1 wherein the kiosk is physically and uniquely associated with the site address associated with the construction site.

13. The computerized system method of claim 2 wherein the non-transitory computer readable instructions are adapted for storing on the distributed ledger that the delivery was determined to not satisfy the smart contract.

14. A computerized system for performing a smart contract according to materials verifiably delivered to a construction site comprising:

a kiosk physically affixed to the construction site during a construction project and having a storage medium in electronic communications with a supply company;

a distributed ledger in communications with the kiosk having a first record representing the materials selected for use at the connection site by a design company;

a second record representing materials selected by the supply company and stored on the distributed ledger according to the first record wherein the materials include a product identification added to the materials by the supply company prior to being delivered to the connection site, an electronic device in communications with the kiosk and adapted to capture information representing materials;

a set of non-transitory computer readable instructions included in the kiosk adapted for:

obtaining information representing materials delivered to the construction site;

creating a third record representing materials actually delivered to the construction site and storing the third record on the distributed ledger, determining a difference between the first record and the third record representing whether the materials delivered to the construction site match the materials selected by the design company, and determining whether the delivery satisfies a smart contract retrieved from the distributed ledger according to the difference, and, initiating electronic payment for the delivery to the supply company; and whereby the distributed ledger includes a digital representation that the materials delivered to the construction site are verified to match the materials selected by the design company, the materials received at the construction site match the materials sent to the construction site by the design company, that the delivery of materials satisfies the smart contract and that the supply company has been paid.

* * * * *